(12) United States Patent
Burling

(10) Patent No.: US 12,275,470 B2
(45) Date of Patent: Apr. 15, 2025

(54) DEVICE FOR ENHANCING TRACTION OF A TRACKED VEHICLE

(71) Applicant: JB INNOVATIONS LIMITED, New Plymouth (NZ)

(72) Inventor: John Menzies Burling, Eltham (NZ)

(73) Assignee: JB INNOVATIONS LTD (NZ)

( * ) Notice: Subject to any disclaimer, the term of this patent is extended or adjusted under 35 U.S.C. 154(b) by 0 days.

(21) Appl. No.: 18/737,856

(22) Filed: Jun. 7, 2024

(65) Prior Publication Data

US 2024/0367735 A1  Nov. 7, 2024

Related U.S. Application Data

(63) Continuation of application No. PCT/NZ2023/050132, filed on Nov. 16, 2023.

(60) Provisional application No. 63/518,789, filed on Aug. 10, 2023, provisional application No. 63/483,124, filed on Feb. 3, 2023, provisional application No. 63/425,825, filed on Nov. 16, 2022.

(51) Int. Cl.
*B62D 55/28* (2006.01)

(52) U.S. Cl.
CPC .................... *B62D 55/28* (2013.01)

(58) Field of Classification Search
CPC .................. B62D 55/28; B62D 55/283
See application file for complete search history.

(56) References Cited

U.S. PATENT DOCUMENTS

| | | | |
|---|---|---|---|
| RE36,025 E | 1/1999 | Suzuki | |
| 6,299,265 B1 | 10/2001 | Hoffart | |
| 7,901,015 B1 * | 3/2011 | Anderson | B62D 55/28 |
| | | | 305/51 |
| 9,950,757 B2 * | 4/2018 | Tibbits | B62D 55/28 |
| 10,967,925 B2 * | 4/2021 | Wilson | B62D 55/286 |
| 11,390,341 B2 * | 7/2022 | Burling | B62D 55/28 |
| 11,932,331 B2 * | 3/2024 | Hamblin | B62D 55/28 |
| 2003/0184157 A1 | 10/2003 | McNutt et al. | |
| 2014/0115833 A1 | 5/2014 | Miszewski | |
| 2021/0253186 A1 | 8/2021 | White | |
| 2022/0017164 A1 * | 1/2022 | Burling | B62D 55/28 |
| 2022/0266932 A1 * | 8/2022 | Michael | B62D 55/28 |

FOREIGN PATENT DOCUMENTS

| | | |
|---|---|---|
| EP | 3708473 A1 | 9/2020 |
| JP | H1016836 A | 1/1998 |
| JP | 2001253375 | 9/2001 |
| JP | 2004058688 | 2/2004 |
| JP | 2009220759 A | 10/2009 |
| WO | 2000018638 | 4/2000 |

OTHER PUBLICATIONS

Int'l Search Report and Written Opinion Appln No. PCT/NZ2023/050132 mailed Feb. 8, 2024.

* cited by examiner

*Primary Examiner* — Jason R Bellinger
(74) *Attorney, Agent, or Firm* — McAndrews, Held & Malloy, Ltd.

(57) ABSTRACT

A device for use with a continuous track of a tracked vehicle to enhance the traction of the vehicle. The device uses brackets having an adjustor with an elongate member extending therebetween to increase traction of a tracked vehicle.

19 Claims, 54 Drawing Sheets

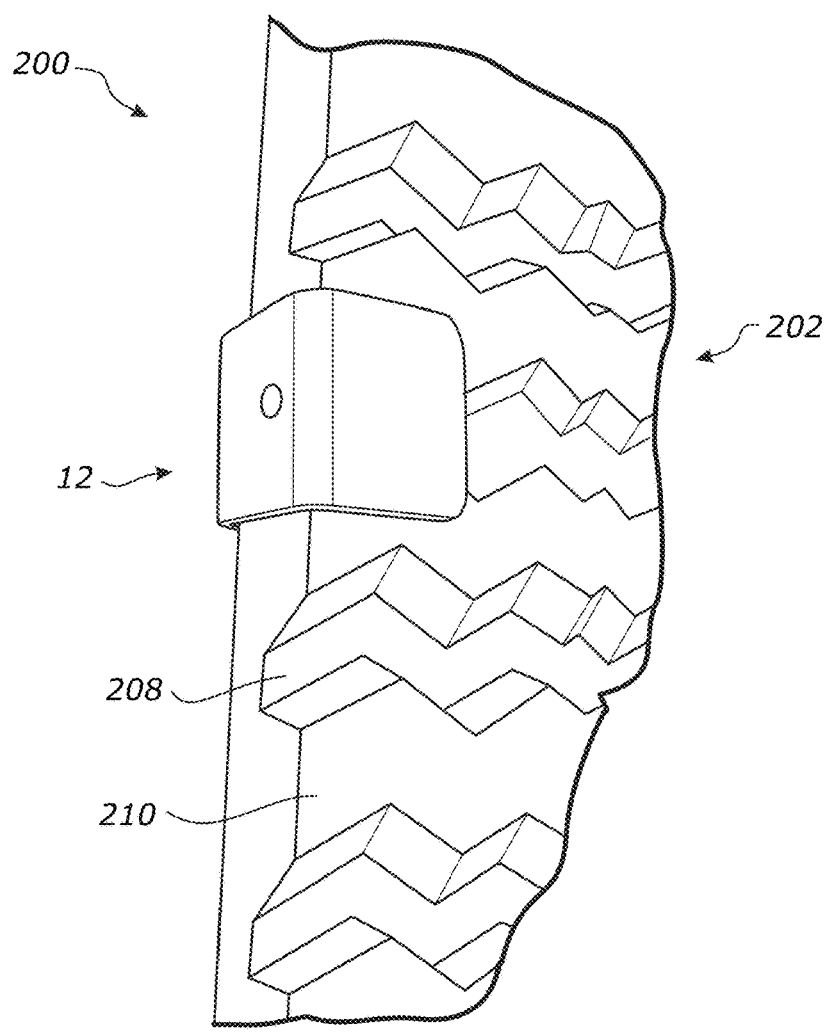
FIG. 12
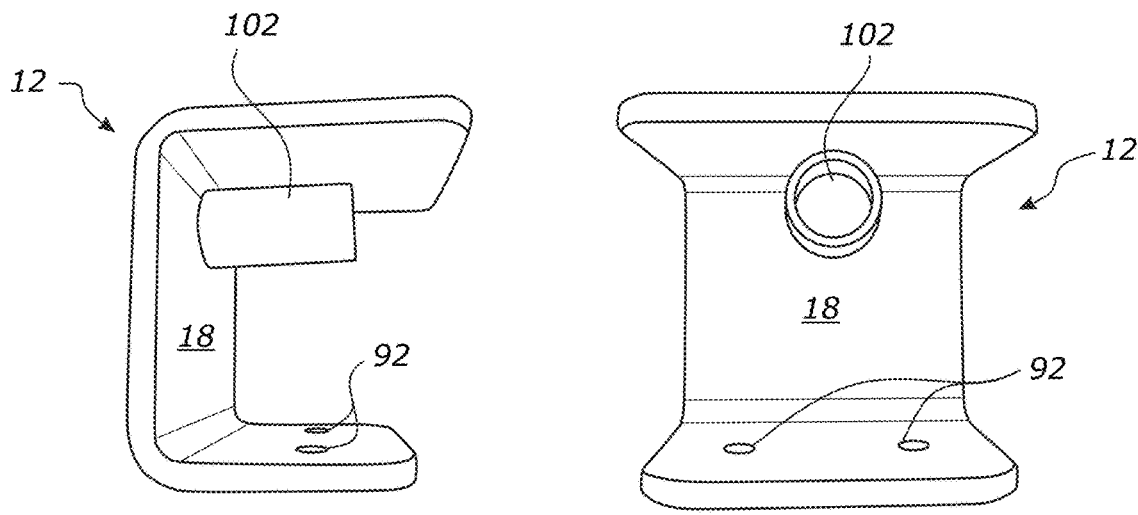
FIG. 13A  FIG. 13B

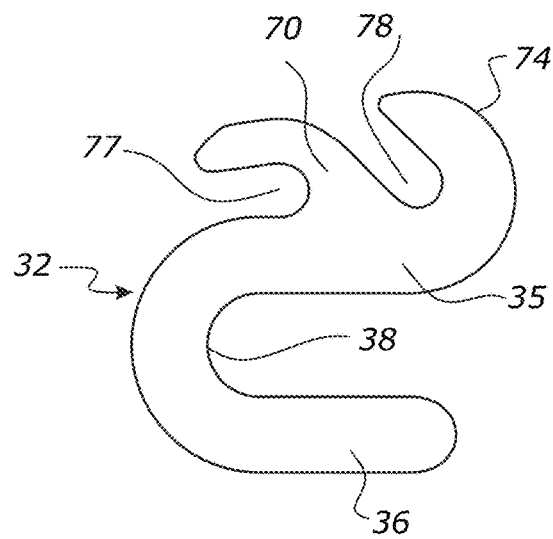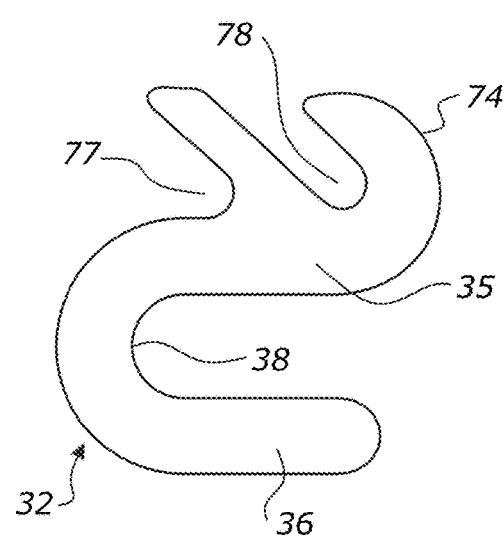
FIG. 29  FIG. 30
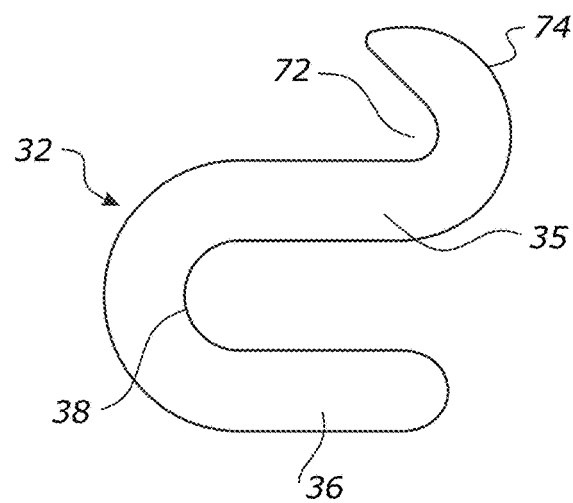
FIG. 31

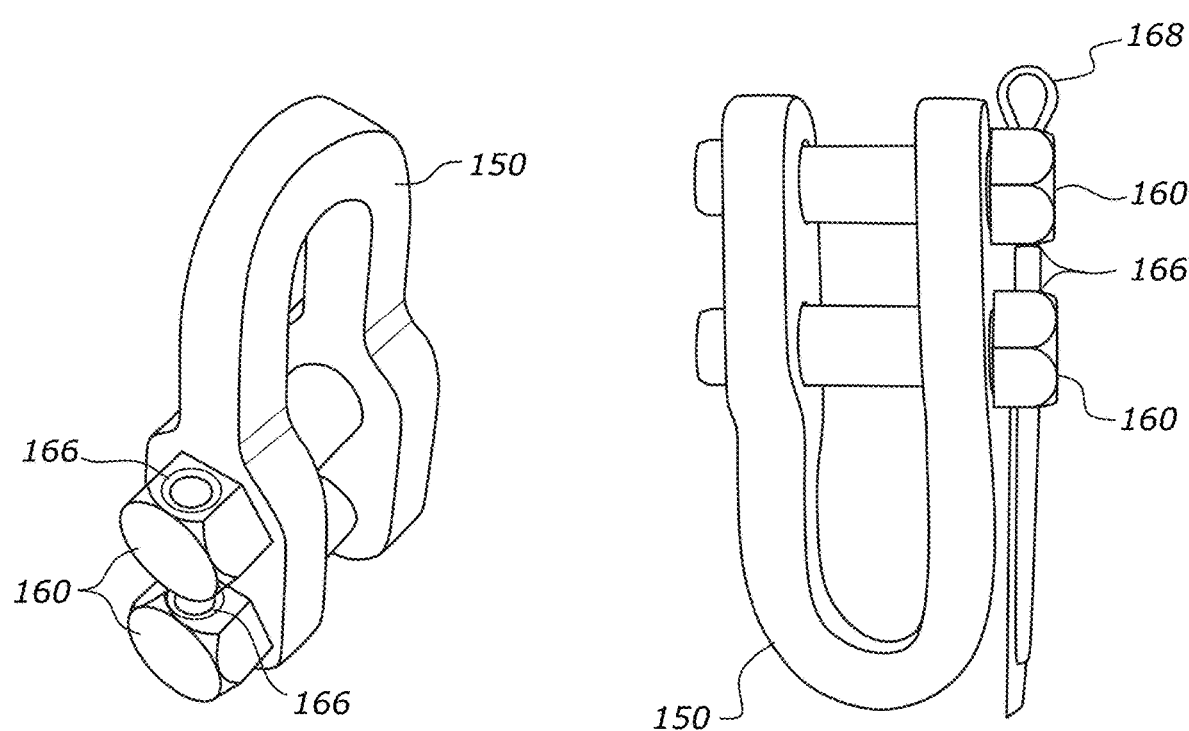
FIG. 72  FIG. 73
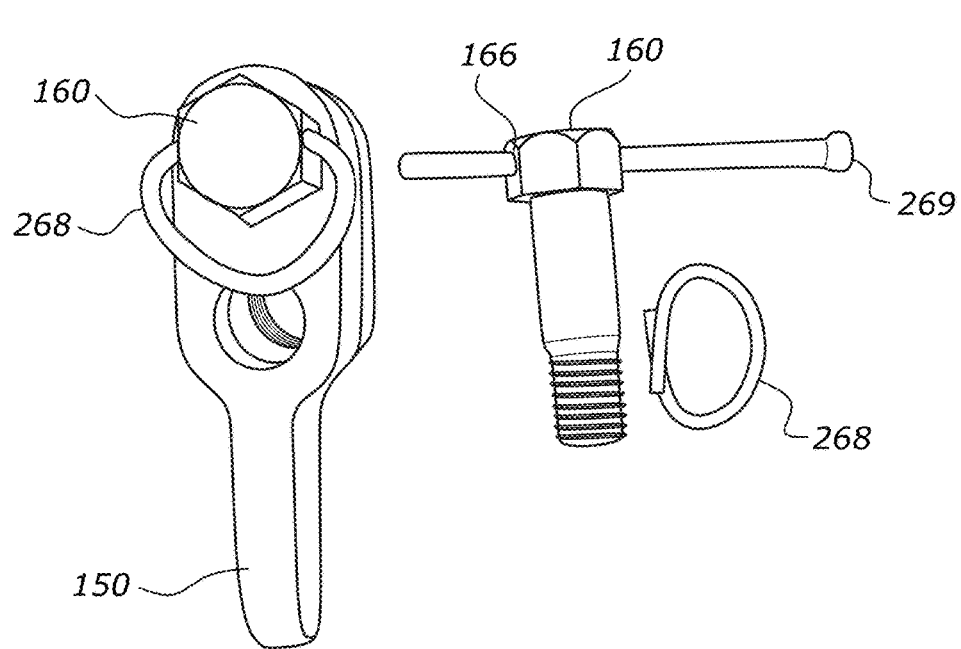
FIG. 74

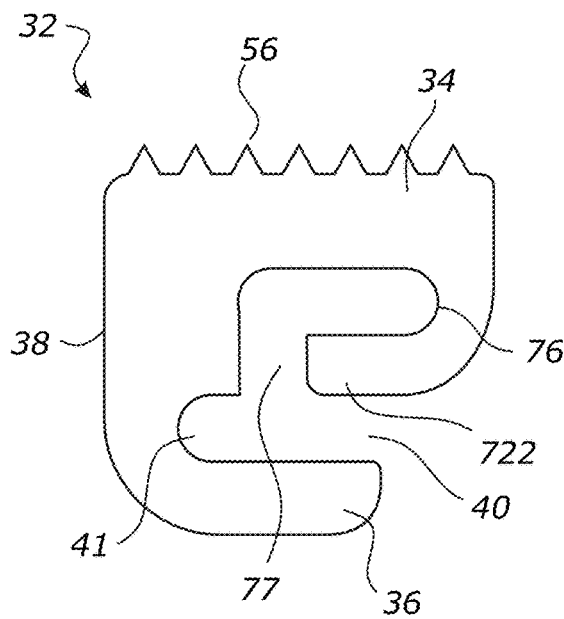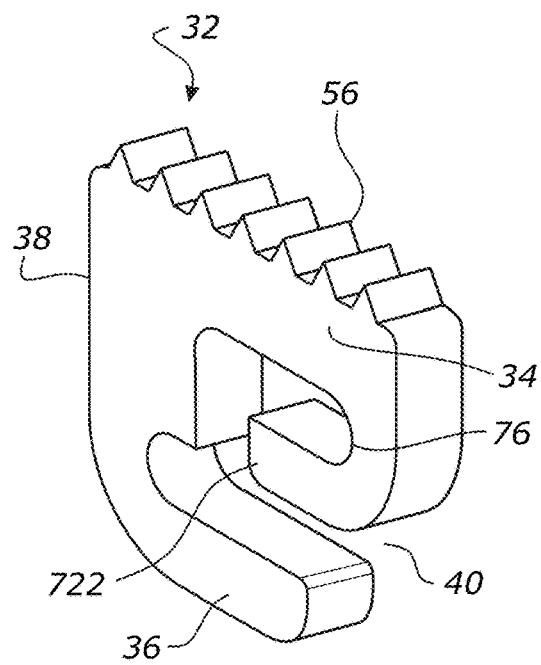
FIG. 82A  FIG. 82B
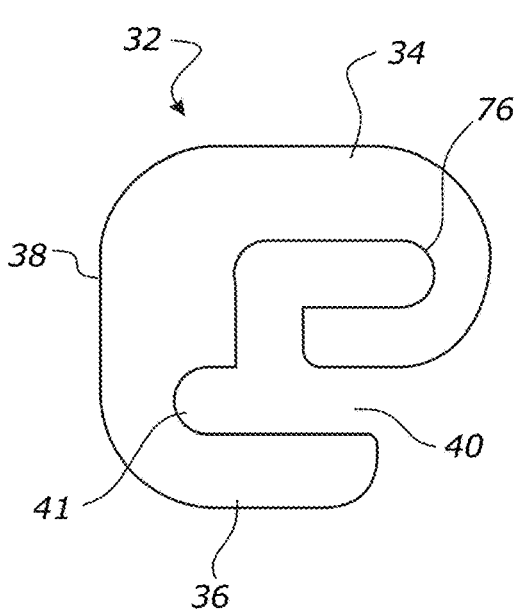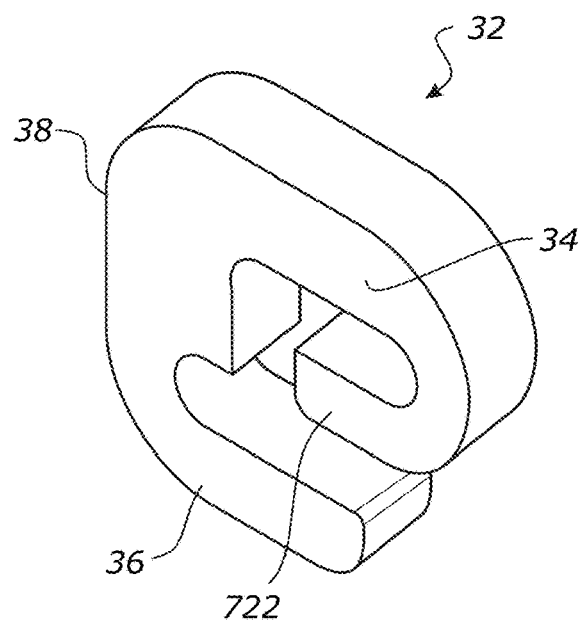
FIG. 82C  FIG. 82D

DEVICE FOR ENHANCING TRACTION OF A TRACKED VEHICLE

CROSS REFERENCE TO RELATED APPLICATIONS

This is a national stage continuation application based on international application PCT/NZ2023/050132 filed Nov. 16, 2023, which claims priority to U.S. Provisional Patent Application No. 63/425,825 filed Nov. 16, 2022, U.S. Provisional Patent Application No. 63/483,124 filed Feb. 3, 2023, and U.S. Provisional Patent Application No. 63/518,789 filed Aug. 10, 2023, all of which are entitled "Device For Enhancing Traction Of A Tracked Vehicle" and are herein incorporated by reference in their entirety.

FIELD OF THE INVENTION

This invention relates to a device for use with a continuous track of a tracked vehicle to enhance the traction of the vehicle.

BACKGROUND

Continuous tracks are often used on off-road vehicles to provide ground contact and traction for large vehicles. Standard continuous tracks are formed from a number of rigid shoes that are joined to each other by hinges. Another type of standard track is a continuous rubber track. Each track typically has one or more ground engaging features to provide traction. Standard continuous tracks provide traction in general situations. However, those standard tracks do not provide adequate traction on steeps slopes, or slopes that are slippery from mud, water or ice. In particular, those standard tracks do not provide adequate traction on steep or slippery slopes for larger, heavier vehicles.

Typically, to increase the traction of a tracked vehicle, additional traction devices are welded to the track. In the case of rubber tracks, bolts or the like are drilled through the track. However, removal of those traction devices can damage the track or device by being cut free or by leaving holes in the track itself.

The use of such traction increasing devices can also prevent the vehicles being usable on roads due to the damage that the modification could cause. Welding or connecting the traction devices to the track and cutting or removal of the devices free from the track can be difficult and time consuming.

There are a number of devices for use with the continuous track of a tracked vehicle. Examples of such devices are described in US Re 36,025 that describes a detachable elastic pad to protect a road surface from damage caused by a tracked vehicle; JP 20012533375A that describes a padded track for a track belt; and NZ 511373 that describes an elastic pad for a crawler track. The pads described in those documents are designed to reduce damage to the ground and would not provide good stability to a vehicle on a steep or slippery slope.

U.S. Pat. No. 6,540,310 describes a grouser structure that provides traction and shock absorption and JP 2004058688 describes a detachable grouser for a track. Both those documents describe using fasteners that extend through the track, which can be awkward to assemble if the track is already installed on a vehicle.

U.S. Pat. No. 6,299,265 describes a replaceable tyre gripping system for an endless track to extend the life of a track. The system described in this document would not enhance the traction of a tracked vehicle.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

It is an object of at least preferred embodiments of the present invention to provide a device to enhance the traction of a vehicle having a continuous track, and/or to at least provide the public with a useful choice.

SUMMARY OF THE INVENTION

In accordance with a first aspect, there is provided a device for use with a track of a continuous tracked vehicle for enhancing traction, the track having a width extending between a first edge and a second edge, the device comprising:
 a first bracket and a second bracket, each bracket comprising a body forming a mouth portion, the mouth portion of the first bracket being engageable with the first edge of the track and the mouth portion of the second bracket engageable with the second edge of the track; and a ground engaging feature comprising an elongate member, at least a portion of the elongate member extending between the first bracket and the second bracket,
 said device being low profile and said at least a portion of the elongate member having a height less than a height of the first bracket and the second bracket,
 a first end of said at least a portion of the elongate member being removably connected to the first bracket, and a second end of said at least a portion of the elongate member being connectable to the second bracket,
 the first bracket comprising an adjustment mechanism to adjust a distance between the first end of said at least a portion of the elongate member and the body of the first bracket.

In some configurations, the first bracket is engageable with the first edge of the track, the second bracket engageable with the second edge of the track for attaching the device to the continuous tracked vehicle.

In some configurations, the portion of the elongate member is configured to secure the device in position by tension between the first bracket and second bracket, the tension of the elongate member being adjustable by the adjustment mechanism.

In some configurations, the second bracket comprises a further adjustment mechanism to increase or decrease the distance between the second end and the second bracket.

In some configurations, the mouth portion comprises an inner base, the inner base being contactable with the edge of the track, wherein the mouth portion is arranged around the edge of the track.

In some configurations, the inner base is the inside surface or closed side of a web at a closed end of the bracket—as referred to below. In some configurations, the body of at least one of the first bracket and second bracket comprises a top flange and a bottom flange arrangeable proximal to a top surface and a bottom surface of a track respectively, the body further comprises a web extending between the top flange and the bottom flange.

In some configurations, the top flange, bottom flange and web form the mouth portion.

In some configurations, the inner base forms a side of the web, i.e. closed side of the mouth portion.

In some configurations, the first bracket, second bracket and elongate member are at substantially the same height.

In some configurations, the elongate member extends substantially straight with a substantially constant vertical height.

In some configurations, a profile of the top flange of the first bracket and second bracket is less than a profile of the elongate member when viewed from a side perspective.

In some configurations, the top flange of the first bracket and second bracket has a smaller profile in a direction normal to a surface of the track than the elongate member.

In some configurations, the elongate member is exclusively connected to the first bracket and the second bracket.

In some configurations, the elongate member is exclusively removably connected to the first bracket at the first end of the portion and to the second bracket at the second end of the portion.

In some configurations, at least one of the first bracket and second bracket are U-shaped.

In some configurations, an I-shape is also possible.

In some configurations, at least one of: the bottom flange is in contact with a bottom of a track; or the top flange is in contact with a top of the track.

In some configurations, the first bracket and second bracket are substantially the same shape.

In some configurations, a profile of the first bracket and second bracket is substantially the same.

In some configurations, the track comprises at least one recess on the first edge of the track, wherein the first bracket is configured to be positionable within the at least one recess.

In some configurations, the track comprises at least one recess on the second edge of the track, wherein the second bracket is configured to be positionable within the at least one recess.

In some configurations, the mouth portion further comprises at least one removeable internal packer to reduce the distance between the top flange and bottom flange relative to the web.

In some configurations, the packers are placed inside the mouth adjacent to an inside surface of at least one of the flanges.

In some configurations, the packer is held in place by a bolt.

In some configurations, the packer is held in position by any other suitable means, including a clip, sleeve or recess.

In some configurations, the packer is a plate that fills substantially an internal surface of the at least one flange.

In some configurations, the adjustment mechanism comprises a first connection member, the first connection member removably connecting the elongate member to the adjustment mechanism.

In some configurations, the adjustment mechanism is permanently connected to the elongate member.

In some configurations, the first connection member is arranged at the top flange of the first bracket.

In some configurations, the elongate member extends from the first and second brackets in the respective open edge directions.

In some configurations, the second bracket member comprises a second connection member, the second connection member for connecting the elongate member to the second bracket member.

In some configurations, the at least one of the first connection member or second connection member is positioned within the mouth portion.

In some configurations, the at least one of the first connection member or second connection member is positioned between the top flange and the bottom flange.

In some configurations, the at least one of the first connection member or second connection member forms a gap between the top flange and the bottom flange.

In some configurations, at least one of the first connection member and second connection member comprises at least one hook for engaging with the elongate member.

In some configurations, at least one of the first connection member and second connection member comprises fastening means, threaded attachments, hoops or sockets.

In some configurations, the at least one hook is angled so that a mouth of the hook is closer to the web of the mouth portion of the respective bracket.

In some configurations, at least one hook has a plurality of hooking portions.

In some configurations, the hooking portions are arranged to hook at different distances between the elongate member and the connection member.

In some configurations, the hooking portions are arranged along the hook from the web in the open edge direction.

In some configurations, the hook provides a variable distance by itself.

In some configurations, the mouths of the hooks are differently sized, or have different configurations.

In some configurations, the connection member has a hook and different type of connection members.

In some configurations, different elongate members are usable with the device.

In some configurations, the hooking portions are arranged on opposite sides of the at least one first or second connection members.

In some configurations, the second connection member is configured to house the hooking portions on the same side of at least one of the first or second connection members.

In some configurations, the at least one hook comprises a curved head to allow rotation of the elongate member.

In such a configuration, the rotation is relative to the first and second brackets.

In some configurations, the hook maintains a same thickness of the top flange of the first or second brackets.

In some configurations, the hooks are rotatable to maintain the same profile as the first or second brackets.

In some configurations, the second bracket comprises a through-hole for receiving the second connection member.

In some configurations, the second connection member is a shackle, the shackle being removably connectable to the elongate member and the through-hole.

In some configurations, part of the shackle pass through the through-hole for holding it in position.

In such configurations, the through-hole is referred to as a bracket through-hole to differentiate from the adjustment mechanism through-hole described below.

In some configurations, the adjustment mechanism comprises a receiving member for receiving the first connection member.

In some configurations, the receiving member is a through-hole.

In such a configuration, as the adjustment mechanism is part of the first bracket, therefore the through-hole is in the bracket itself.

In some configurations, the elongate member comprises a threaded bar connected to the first end of the portion of the elongate member.

In some configurations, the first connection member is connected to a threaded bar.

In some configurations, the first connection member comprises an internally threaded tube and is connected to the threaded bar by the threads.

In some configurations, the threaded bar is a threaded bolt.

In some configurations, the threaded bolt has a hex-head bolt head.

In some configurations, the bolt head or nut is positioned external to the web for enabling access to the bolt head or nut.

In some configurations, wherein the adjustment mechanism comprises a receiving member for receiving the threaded bar, the threaded bar being adjustable within the receiving member to increase or decrease the distance between the first end of a portion of the elongate member and the first bracket.

In some configurations, the receiving member is internally threaded, the threaded bar being rotatable within the internal thread to increase or decrease the distance between the first end of the portion of the elongate member and the first bracket.

In some configurations, the through-hole has a thread itself to provide the adjustment of the bar and thus distance by rotation.

In some configurations, the through-hole is a nut connected to the bracket, the nut being threaded.

In such a configuration, the variation of the distance may also be termed as being toward the open edge.

In some configurations, wherein a threaded nut is connected to the threaded bolt to retain the threaded bar in a location within the receiving member, the threaded nut being rotatable to increase or decrease the distance between the first end of the portion and the first bracket.

In some configurations, wherein the receiving member is a cylinder.

In some configurations, the cylinder protects the bar.

In some configurations, the cylinder has a smooth surface for the use of the device without causing damage to a road.

In some configurations, the receiving member or cylinder is positioned on the top flange on the external surface.

In such a configuration, the receiving member or cylinder is be positioned away from the surface of the track and gives elevation to the elongate member.

In some configurations, the receiving member or cylinder is positioned on the top flange on the internal surface.

In such a configuration, the receiving member or cylinder is positionable in a track recess.

In some configurations, the receiving member or cylinder is positioned extending through the web into the mouth of the bracket.

In some configurations, the receiving member or cylinder is apart from at least one of the top or bottom flange and extends from a closed edge to the open edge.

In some configurations, the receiving member or cylinder is positioned in the top flange.

In some configurations, the portion of the elongate member is in direct contact with the track throughout its length.

In some configurations, the portion of the elongate member is in direct contact with the road surface when in use.

In some configurations, the first end and second end of the portion has a range of rotational movement with respect to the respective connection member.

In some configurations, the connection member are shaped to prove the range of rotational movement.

In some configurations, the range of rotational movement of the first end or second end of the portion allows the portion to extend at an angle relative the respective first bracket or second bracket.

In some configurations, the angle of the range of rotational movement is between 0° and 45° from a line normal from the edge of the track extending across the track.

In some configurations, the angle of the range of rotational movement is between 0° and 45° from a line normal from the web or base of the respective bracket extending toward the open edge or open side of the respective bracket In some configurations, the angle of the range of rotational movement is between 0° and 70° from a line normal from the web or base of the respective bracket extending toward the open edge or open side of the respective bracket.

In some configurations, the angle of the range of rotational movement is between 0° and 70° from a line normal from the edge of the track extending across the track.

In some configurations, the adjustment mechanism is contained within a housing on the first bracket.

In some configurations, the receiving member is contained in the housing.

In some configurations, the housing has a flat exterior surface.

In some configurations, the first bracket has a cut-out portion to accommodate the connection member.

In some configurations the connection member is positioned in the bracket itself.

In some configurations, the cut-out portion extends between the open and closed edges of the bracket.

In some configurations, the first and/or second bracket has chamfered edges at its top flange.

In some configurations, chamfered edges are formed at the open edge of the bracket.

In some configurations, the elongate member is a chain, wherein the chain comprises at least one chain link.

In some configurations, t portion of the chain is connected by connecting to a link within the chain or the whole of the chain.

In some configurations, the elongate member is a wire.

In some configurations, a portion of the wire connects between the brackets.

In some configurations, the elongate member is a bar.

In some configurations, the bar is a rigid bar.

In some configurations the bar is connected at its ends or along a portion of the bar.

In some configurations the adjustment mechanism is a ratchet.

In some configurations, the device increases the traction of a tracked vehicle.

In some configurations, the tracked vehicle has rubber tracks.

In some configurations, the device is for use on rubber tracks.

In some configurations, the device is for use on metal or rigid tracks.

In some configurations, each part of the device is rigid, substantially rigid or having a rigid body.

In some configurations, at least one protrusion is provided extending from the top flange in a height direction opposite to the direction of the bottom flange.

In some configurations, at least two protrusions are provided positioned on either side of the top flange.

In some configurations, the at least one protrusion is positioned centrally on the top flange.

In some configurations, then thickness of at least one of the top flange, bottom flange or web of the brackets is between about 6 mm and 18 mm.

In some configurations, the thickness is between about 8 mm and 15 mm.

In some configurations, the thickness is between about 10 mm and 12 mm.

In some configurations, each part has a different thickness.

In some configurations, a thickness of the top flange of the first bracket and second bracket is less than that of the elongate member.

In some configurations, the device is releasably secured to the continuous track.

In some configurations, the brackets form a ground engaging feature(s).

In some configurations, the bracket is positioned at the end of the elongate member.

In some configurations, a single elongate member is provided between the first bracket and the second bracket.

In an alternative configuration, there is provided a device for use with a track of a continuous tracked vehicle for enhancing traction, the track having a width extending between first and second edges, the device comprising: at least a first and a second first bracket, each bracket comprising a body forming an open mouth portion, the open mouth portion being engageable with an edge of the track; and an elongate member, at least a portion of the elongate member extending between the first bracket and second bracket, a first end and second end of the portion removably connected to the first bracket and second bracket respectively, wherein, at least one of the first bracket or second bracket comprises an adjustment mechanism to increase or decrease the distance between the first end and the first bracket, wherein the adjustment mechanism is positioned in the open mouth portion.

In an alternative configuration, there is provided a device for use with a track of a continuous tracked vehicle for enhancing traction, the track having a width extending between a first edge and a second edge, the device comprising: a first bracket comprising a first edge engaging surface that is engageable with the first edge of the track, and an adjustor; a second bracket comprising a second edge engaging surface that is engageable with the second edge of the track, and a connector; and a ground engaging feature comprising an elongate member, the elongate member extending between the adjustor of the first bracket and the connector of the second bracket, said device being low profile and said elongate member having a height less than a height of at least one of the first bracket and the second bracket, wherein the adjustor is configured to adjust a distance between the elongate member and first edge engaging surface of the first bracket.

In some configurations, the elongate member is connected at a first connection location to the adjustor and at a second connection location to the connector.

In some configurations, the elongate member is configured to secure the device in position by tension between the first bracket and second bracket, the tension of the elongate member being adjustable by the adjustor.

In some configurations, at least one of the first bracket and second bracket comprise a bottom arm extending from the first edge engaging surface or second edge engaging surface respectively, the bottom arm arrangeable proximal to a bottom surface of the track, the first bracket and second bracket being hookable around the first edge or second edge of the track respectively.

In some configurations, the adjustor extends from the first edge engaging surface, the adjustor arrangeable proximal to a top surface of the track.

In some configurations, the connector extends from the second edge engaging surface, the connector arrangeable proximal to a top surface of the track.

In some configurations, the adjustor comprises a first connection member, the first connection member removably or irremovably connecting the elongate member to the adjustor.

In some configurations, the first connection member comprises at least one hook or ring for engaging with the first connection location of the elongate member.

In some configurations, the adjustor comprises a distance varying part connected between the first connection member and the first bracket.

In some configurations, the adjustor comprises a bush and/or the first bracket comprises a through-hole in the first edge engaging surface, the bush and/or through-hole for receiving the distance varying part therethrough.

In some configurations, the bush is connected to at least one of the first connection member, first bracket or first edge engaging surface.

In some configurations, the distance varying part is a threaded member and the bush is internally threaded, the threaded bar being rotatable within the bush to finely increase or decrease the distance between the first connection location of the elongate member and the first edge engaging surface.

In some configurations, a threaded nut is rotatably connected to the threaded member or the threaded member has a bolt head, the threaded nut or threaded member being rotatable to finely increase or decrease the distance between the first connection location of the elongate member and the first edge engaging surface.

In some configurations, the first bracket comprises a locking tab having a sleeve, wherein the threaded nut or bolt head sits in the sleeve of the locking tab, the sleeve forming a cavity having a shape corresponding to the shape of the threaded nut or bolt head, wherein the locking tab is releasably connected to the first bracket to prevent rotation thereof.

In some configurations, the connector is configured to adjust a distance between the second connection location and the second edge engaging surface of the second bracket.

In some configurations, the connector comprises a second connection member, the second connection member removably or irremovably connecting the elongate member to the connector.

In some configurations, the second connection member comprises at least one hook and/or ring for engaging with the second connection location of the elongate member.

In some configurations, the connection between the second connection location and the second connection member is adjustable between different hooks or rings to coarsely increase or decrease the distance between the second connection location of the elongate member and the second edge engaging surface.

In some configurations, the elongate member is a chain, wherein the chain comprises at least one chain link.

In some configurations, the elongate member is contactable with the track along its length when in use.

In some configurations, the top flange as described may be referred to as an adjustor or connector, the mouth portion may be an edge engaging surface, a first end may be a first connection location and a second end may be a second connection location.

In an alternative configuration, there is provided a bracket for a track of continuous tracked vehicle to enhance traction, the bracket being engageable with an edge of a track of a tracked vehicle, the device comprising: an upper bracket portion arrangeable proximal to an upper surface of the track, the upper bracket portion having at least two openings, the openings directly or indirectly connectable to a chain; wherein, when connected to the chain, the device is reconfigurable between at least three arrangements comprising: a D-shackle being securable to the bracket by a D-shackle pin receivable through one of the openings; a D-shackle being securable to the bracket by at least two pins of a single D-shackle each being receivable through respective openings simultaneously; and either: a D-shackle being securable to the bracket by a bow of the D-shackle receivable through one of the openings, or a traction chain being securable to the bracket by a chain link of the traction chain receivable through at least one of the openings.

In some configurations, at least one of the openings is a slot.

In some configurations, at least one of the openings is a through holes.

In some configurations, at least one of the openings extends through an edge of the bracket portion.

In some configurations, at least one of the openings has a bulbous portion.

In some configurations, the bracket comprises an edge engaging surface that is engageable with the edge of the track, the edge engaging surface extending from the upper bracket portion.

In some configurations, the bracket comprises a bottom bracket portion extending from the edge engaging surface, the bottom bracket portion arrangeable proximal to a bottom surface of the track, wherein the bracket being hookable around the edge of the track.

In an alternative configuration there is provided a shackle for connecting to a bracket for a track of tracked vehicle to enhance traction, the shackle comprising: a substantially U-shaped body having legs and a crown portion; and at least two pins for closing an open portion of the U-shaped body across the legs; and wherein the shackle is attachable to a chain link of a chain, the body or at least one of the pins being threaded through the chain link, and wherein the shackle is reconfigurable between at least three arrangements of connecting to a bracket having at least two openings, the arrangements comprising: the shackle being securable to the bracket by one shackle pin receivable through one of the openings; the shackle being securable to the bracket by the two pins of the shackle pin each receivable through respective openings simultaneously; and the shackle being securable to the bracket by the bow of the shackle receivable through one of the openings.

In some configurations, the substantially U-shaped body is bow-shaped at the crown In some configurations, the pins are partially or fully threaded bolts.

In some configurations, each of the legs have orifices for each respective pin to pass through.

In some configurations, the portion of the legs having the orifices has an increased dimension in comparison to than the remainder of the leg.

In some configurations, at least one of the orifices is threaded for receiving the threaded bolts.

In some configurations, the at least one of the orifices is countersunk for receiving a head of the threaded bolts.

In an alternative configuration there is provided the shackle as described above for connecting to a bracket as described above.

In an alternative configuration there is provided a bracket as described above for connecting to a shackle as described above.

In an alternative configuration there is provided a kit of parts comprising the bracket described above and the shackle described above, wherein the shackle and bracket are securable to one another through either of the following reconfigurable arrangements, wherein: the shackle is securable to the bracket by one shackle pin receivable through one of the bracket openings; the shackle is securable to the bracket by at least two pins of the shackle each receivable through respective openings simultaneously; and the shackle being securable to the bracket by a bow of the shackle receivable through one of the openings.

In some configurations, the kit of parts comprises a chain, the chain securable to at least one opening of the bracket, or to the shackle secured to the bracket.

In some configurations, the kit comprises a further bracket, the further bracket being engageable with an edge of a track of a tracked vehicle, the further bracket connectable to the chain.

In some configurations, the kit is for use with a track of a continuous tracked vehicle for enhancing traction, the track having a width extending between a first edge and a second edge, the kit comprising: the bracket that is engageable with the first edge of the track, the further bracket comprising a second edge engaging surface that is engageable with the second edge of the track, and an adjustor; and a ground engaging feature comprising an elongate member, the elongate member extending between the adjustor of the further bracket and the bracket, said elongate member being low profile and said elongate member having a height less than a height of at least one of the further bracket and the bracket, wherein the adjustor is configured to adjust a distance between the elongate member and first edge engaging surface of the further bracket.

In an alternative configuration, there is provided a bracket for use with a track of continuous tracked vehicle for enhancing traction, the track having a width extending between two edges of the track and the bracket being engageable with one of the edges of the track of the tracked vehicle, the bracket comprising: an outer bracket portion comprising a hooking member removably attachable directly or indirectly to a chain, the hooking member comprising an opening for receiving the chain; and an inner bracket portion, wherein the track is positionable between the outer bracket portion and inner bracket portion, and the opening is blockable by the track substantially preventing the attachment or removal of the chain from the bracket.

In some configurations, the track is the track is sandwiched between the outer bracket portion and inner bracket portion.

In some configurations, the bracket, when engaged, the opening and the outer bracket portion are each arranged proximal to an outer surface of the track.

In some configurations, the bracket comprises a web, the outer bracket portion and inner bracket portion extending from the web in a track width direction, wherein when the bracket is engaged with the track, the web is arranged proximal to the edge of the track.

In some configurations, the bracket opening is on an inner surface of the outer bracket portion facing the inner bracket portion.

In some configurations, the bracket hooking member further comprises a chain engaging section for receiving a chain link of the chain therearound, the chain engaging section being an open portion extending from the opening in the track width direction away from the web.

In some configurations, the bracket comprises a mouth portion arranged between the outer bracket portion and the inner bracket portion for receiving the track when the bracket is engaged with the track, In some configurations, the bracket opening is arranged to open into the mouth portion, wherein the chain is positionable through the mouth portion when being removably attachable to the hooking portion.

In some configurations, the bracket opening is positioned in the mouth portion, wherein the chain is positionable through the mouth portion when being removably attachable to the hooking portion.

In some configurations, the bracket mouth portion extends further in a web direction opposite to the track width direction than the opening.

In some configurations, the bracket is formed as a unitary member.

In some configurations, the bracket web extends further in an outwards direction than the outer bracket portion.

In some configurations, the bracket hooking member has a height as measured from an inner to outer direction than the web.

In some configurations, an outer surface of the web has a non-flat surface to enhance grip.

In some configurations, wherein an outer surface of the upper bracket portion has a non-flat surface to enhance grip.

In some configurations, wherein the non-flat surface is a spiked surface.

In some configurations, wherein the opening is formed as a through-hole in the hooking portion, In some configurations, the opening is formed on a surface of the hooking member perpendicular to a surface of the track.

In some configurations, the hooking portion is formed as a U-bolt extending from the web, the opening formed as the space defined by the U-bolt and the web.

In some configurations, the outer bracket portion further comprises at least one flange extending from the web and separated from the U-bolt.

In some configurations, wherein the flange comprises a through-hole.

In an alternative configuration there is provided a device for use with a track of a continuous tracked vehicle for enhancing traction, the track having a width extending between a first edge and a second edge, the device comprising, a bracket according to any above configuration, a chain having chains links, the chain removably attachable to the hooking member, wherein one of the chain links is positionable through the opening when not engaged.

In some configurations, the chain link is arranged relatively flush with a surface of the track.

More particularly, the open face of the chain link faces downwardly to face the track when engaged with the hooking portion.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

As used herein the term '(s)' following a noun means the plural and/or singular form of that noun.

As used herein the term 'and/or' means 'and' or 'or', or where the context allows both.

The term "comprising" as used in this specification and claims means "consisting at least in part of". When interpreting statements in this specification and claims that include the term "comprising", other features besides the features prefaced by this term in each statement can also be present. Related terms such as "comprise" and "comprised" are to be interpreted in similar manner.

The invention consists in the foregoing and also envisages constructions of which the following gives examples only.

BRIEF DESCRIPTION OF THE DRAWINGS

The present invention will now be described by way of example only and with reference to the accompanying drawings in which:

FIG. 12 is a perspective view of an embodiment of the device with alternate features of FIG. 1;

FIG. 13A is a side perspective view of a bracket of the device of FIG. 12;

FIG. 13B is a front perspective view of the bracket of FIG. 13A;

FIGS. 29 to 31 are side views of the bracket of FIG. 27;

FIG. 72 is a perspective view of the shackle of FIG. 71 in an alternative configuration.

FIG. 73 is a top view of the shackle and cotter pins of FIG. 71 in an alternative configuration.

FIG. 74 is an exploded side view of the shackle and alternative pins of FIG. 71 in an alternative configuration.

FIG. 82A is a side view of an alternative configuration of the bracket of the device.

FIG. 82B is a perspective view of the bracket of FIG. 82A.

FIG. 82C is a side view of an alternative configuration of the bracket of the device.

FIG. 82D is a perspective view of the bracket of FIG. 82C.

DETAILED DESCRIPTION OF EMBODIMENTS OF THE INVENTION

Figure 1:
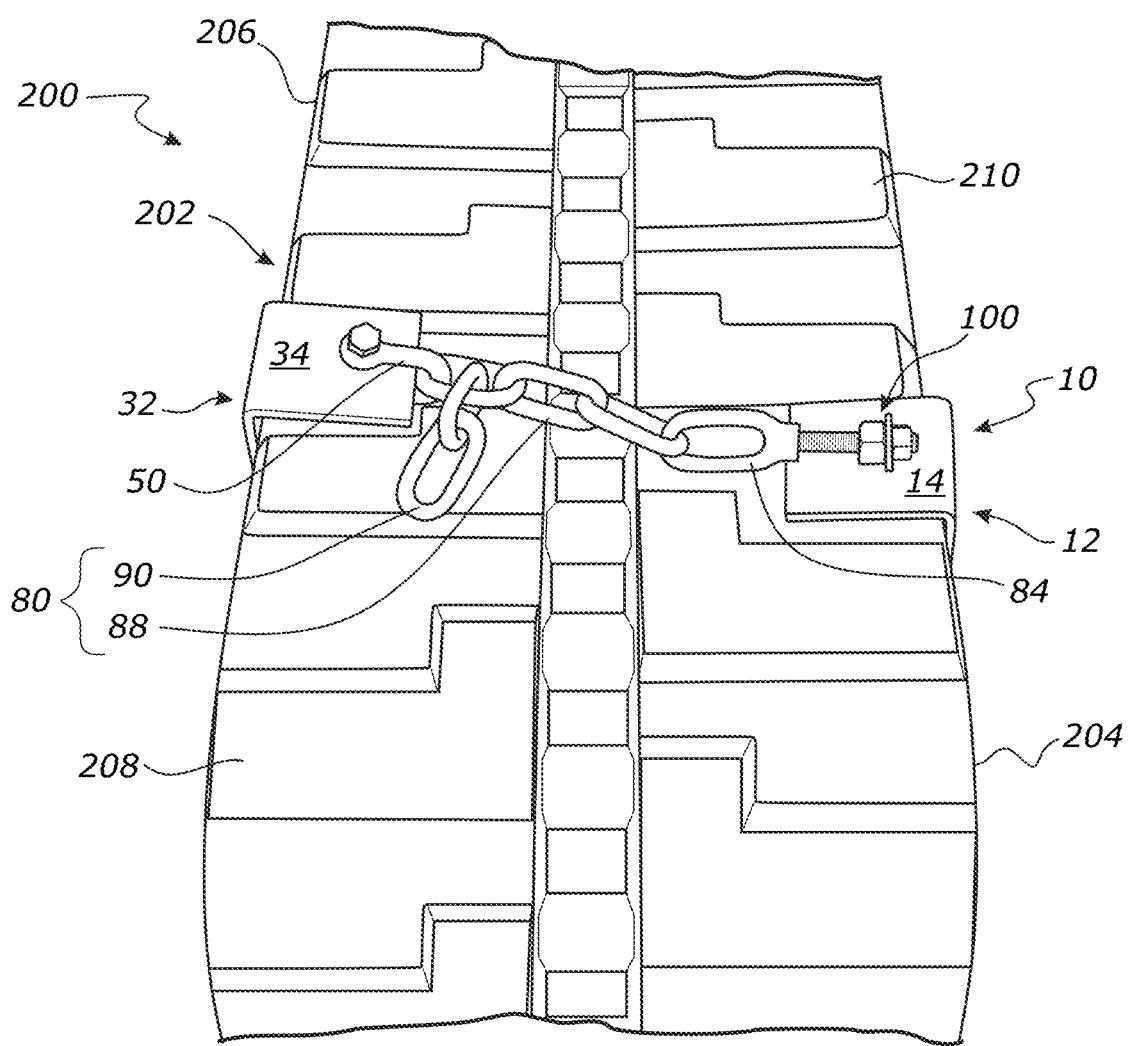
FIG. 1 is a perspective view of an embodiment of the device for use with a continuous track of a tracked vehicle.

With reference to FIG. 1, there is shown a traction device 10 in use on a tracked vehicle 200. A first arrangement is shown in FIGS. 1, 2 and 3 and is described below.

Unless otherwise specified, it should be appreciated that references to directions in the following description such as top, upper, bottom, lower are for reference only, and should not be considered limiting. Further, those directions refer to a device when it is in the position shown in FIG. 1, that is, on the top part of the track.

The device has a first bracket 12 and a second bracket 32. In use, the first bracket 12 and second bracket 32 are positionable on a track 202 of the tracked vehicle 200. The first bracket is positioned at a first edge 204 of the track 202, and the second bracket 32 is positioned at a second edge 206 of the track 202. The first edge 204 and second edge 206 are at opposite edges across a width of the track 202. Therefore, it will be appreciated that the first bracket 12 and second bracket 32 are placed substantially opposite to one another when the device 10 is in use.

Figure 2:
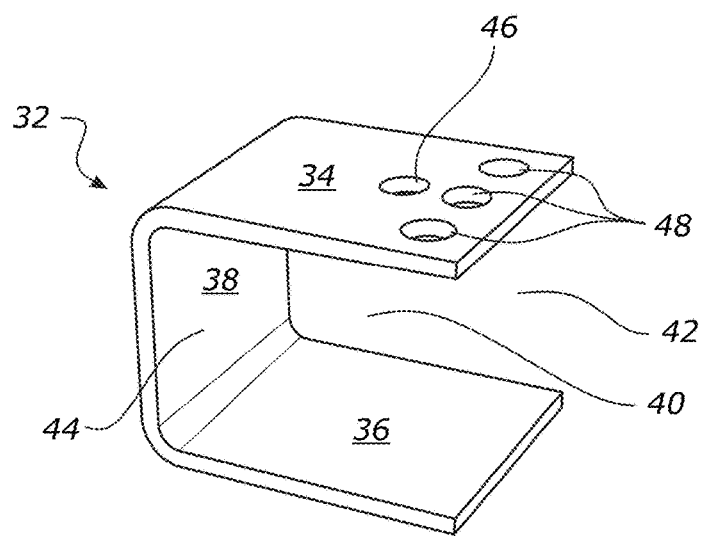
FIG. 2 is a perspective view of a bracket of the device of FIG. 1.
Figure 3:
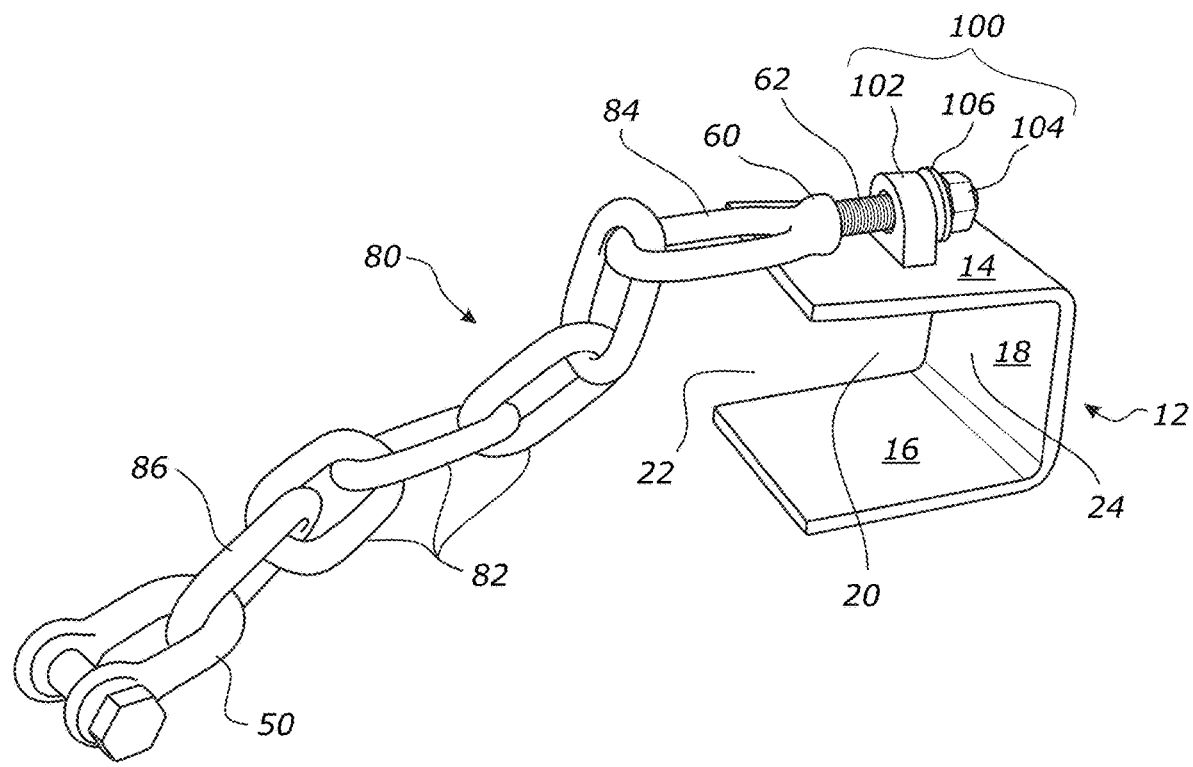
FIG. 3 is a perspective view of a further bracket and elongate member of the device of FIG. 1.

With reference to FIG. 2, the shape of the second bracket 32 is shown. The second bracket 32 has a top flange 34 and a bottom flange 36. The top flange 34 and bottom flange 36 are parallel arranged plates that are spaced apart. Extending between the top flange 34 and bottom flange 36 is a web 38. The second bracket 32 is shown as an extruded U-shape, where the web 38 forms the base of the U-shape and the top flange 34 and bottom flange 36 provide the sides of the U-shape. The distance between the top flange 34 and bottom flange 36 is such that the second bracket 32 fits around an edge 204, 206 of a track 202 of a tracked vehicle 200. Therefore, the length of the web 38 between the top flange 34 and bottom flange 36 determines this distance.

Referring to FIG. 3, a similar arrangement for the first bracket 12 is shown as described with reference to FIG. 2 above. Here the first bracket 12 has a top flange 14 and a bottom flange 16, these are parallel arranged plates that are spaced apart. Extending between the top flange 14 and bottom flange 16 is a web 18. It will be appreciated that the brackets 12, 32 have a width portion extending in a 3D direction substantially perpendicular to the web 18, 38 and the flanges 14, 34, 16, 36.

It will be appreciated that in some configurations the first bracket 12 and second bracket 32 have different shapes to that described above. Notably, the top flange 14, 34 and/or bottom flange 16, 36 could extend further than the web 18, 38 such that an I-shape is formed where both extend. Likewise, the web 18, 38 could extend beyond the top flange 14, 34 and/or bottom flange 16, 36 to form an F-shape where it extends in one direction. Multiple webs 18, 38 or multiple top flanges 14, 34 or bottom flanges 16, 36 are also options. Other shapes may also be used that provide a support at the edge of a track 202. The bottom flanges 16, 36 may also be referred to as arms 16, 36. The webs 18, 38 may also be referred to as edge engaging surfaces 18, 38.

Ideally, each bracket 12, 32 is in contact with at least two sides of an edge of a track 202 when in use.

The second bracket 32 defines a mouth portion 40 between the top flange 34 and the bottom flange 36 that receives the track 202 therein. The track edge 204, 206 sits within the mouth portion 40 and occludes against the web 38 when the device is in use. The mouth portion 40 therefore has a closed side 44 positioned toward the web 38 and an open side 42 positioned at an end opposite the web 38.

The closed side 44 is also referred to as a closed edge, likewise the open side 42 is also referred to as an open edge.

The first bracket 12 likewise defines similar features as shown with reference to FIG. 3. The first bracket 12 defines a mouth portion 20 between the top flange 14 and the bottom flange 16 that receives the track 202 therein. The track edge 204, 206 sits within the mouth portion 20 and occludes against the web 18 when in use. The mouth portion 20 therefore has a closed side 24 positioned toward the web 18 and an open side 22 positioned at an end opposite the web 18. When in use, the open side 22 of the first bracket 12 is at an opposite end of the width of the track 202 to the open side 42 of the second bracket 32 as they are installed on opposite edges of the track 202. Therefore, the first bracket 12 and second bracket 32 are positioned in a mirrored and/or facing manner when in use.

Therefore, the top flange 14, 34, bottom flange 16, 36 and web 18, 38 have internal surfaces that form the mouth portion 20, 40. The internal surfaces are those that are proximal to the track 202 (and sometimes in contact with the track 202) when the bracket 12, 32 is in use. The external surfaces are those that face away from the track 202 when the bracket 12, 32 is in use. Therefore, a top flange 14, 34 external surface is at the top of the bracket 12, 32.

The mouth portion 20, 40 has its opening between the top flange 14, 34 and bottom flange 16, 36 and is generally opposite to the web 18, 38. Therefore, the open edge or open side 22, 42 of the bracket 12, 32 refers to the side that is positioned around the track 202 and faces across the track 202 when in use. Conversely, the closed edge or closed side 24, 44 of the bracket 12, 32 refers to the side of the bracket 12, 32 that sits at the edge of the track 202 when the bracket 12, 32 is in use.

In use, the closed side 24, 44 (or inner base) is in contact at an edge of the track 202. The closed side 24, 44 transmits tension forces between the track 202 and elongate member 80 applied by the movement of the adjustment mechanism 100. Therefore, in use the web 18, 38 of the or each bracket 12, 32 is in contact with an edge 204, 206 of the track, such as when the adjustable mechanism 100 is tightened. The flanges 14, 16, 34, 36 extend into the width of the track 202 and helps hold it in position from a vertical perspective.

By being U-shaped, the brackets 12, 32 are positionable around an edge of a track 202.

The first bracket 12 and second bracket 32 are connected by an elongate member 80. The elongate member of FIG. 1 is a chain 80. The chain 80 connects to the first bracket 12 and second bracket 32 across the track 202 when the brackets 12, 32 are installed.

The first bracket 12 and second bracket 32 are each selectably releasably connected to the elongate member 80.

The chain 80 has a number of chain links 82. The ends of the chain 80 do not need to be the parts of the chain that connect to the first bracket 12 or second bracket 32. Instead, in some configurations, any chain link 82 connects to the respective brackets 12, 32. Therefore, a first end 84 of a portion of the chain 80 is connected to the first bracket 12 and a second end 86 of a portion of the chain 80 is connected to a second bracket 32. The chain between the first end 84 and second end 86 is a portion 88. As will be appreciated and is seen from FIGS. 1 and 3, the portion 88 is the whole length of the chain 80, or the portion 88 is a part of the chain 80. Where the portion 88 is shorter than the chain 80, a chain tail 90 will be hanging from at least one chain link 82. The chain tail 90 is connected at only one end but assists with traction.

Other elongate members 80 could be used, for instance a cable, rope or a bar could be used to connect the first bracket 12 and second bracket 32.

Figure 8A:
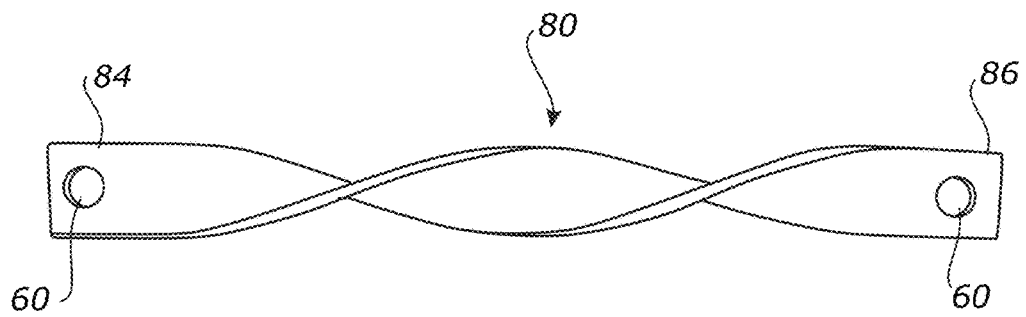
FIG. 8A is a perspective view of an alternative elongate member of FIG. 1.
Figure 8B:
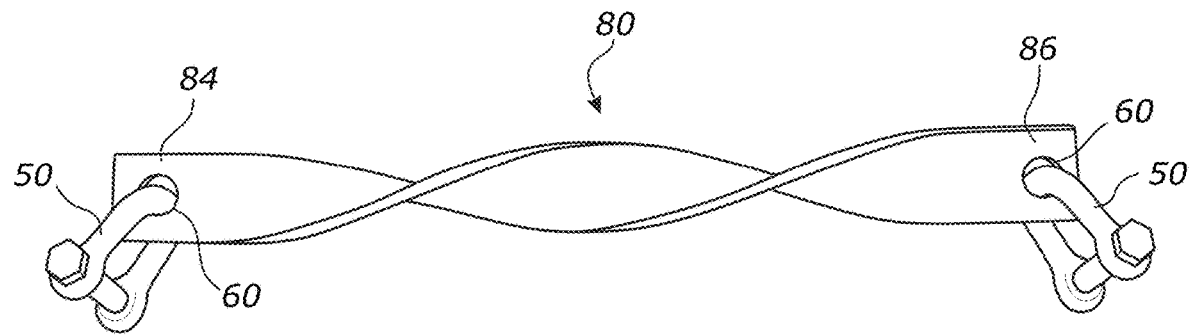
FIG. 8B is a perspective view of the elongate member of FIG. 8A in an alternative configuration.
Figure 9:
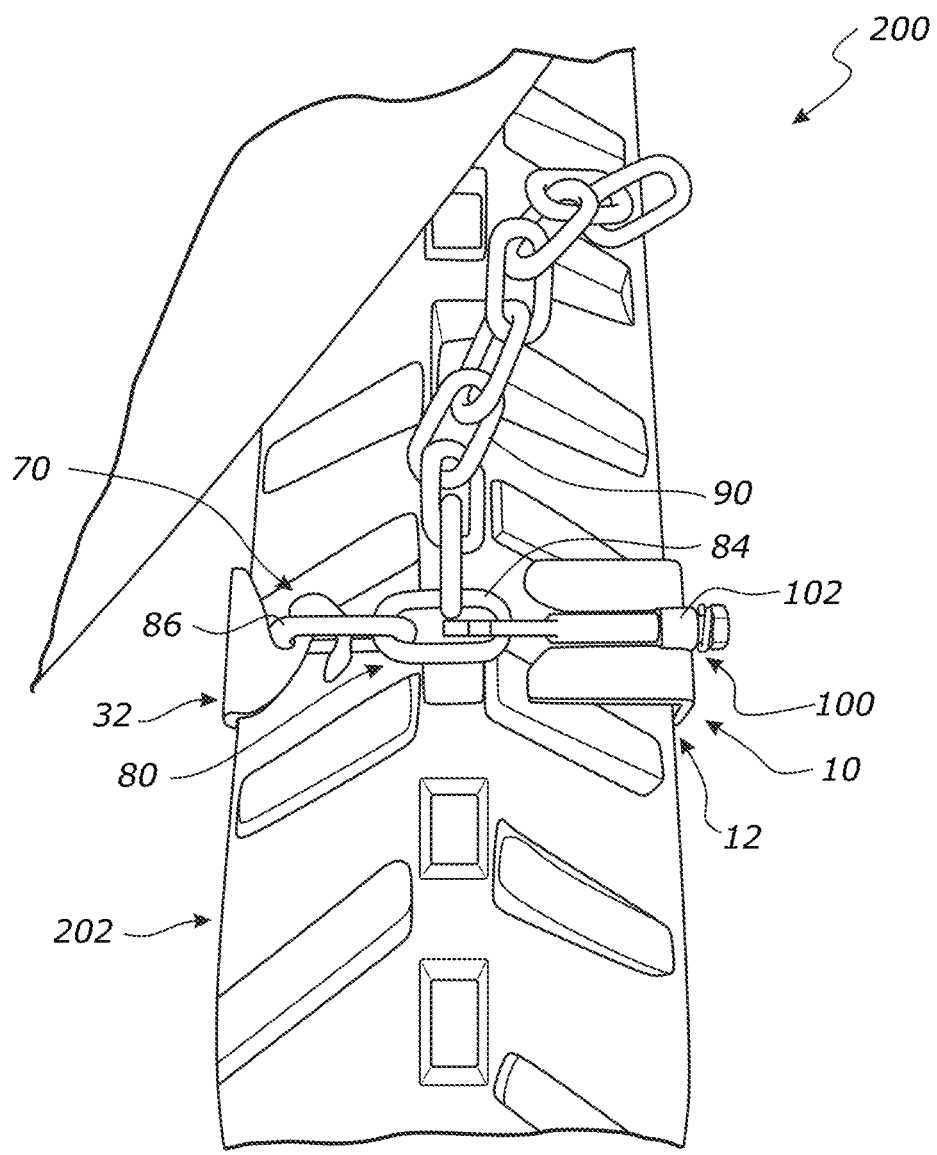
FIG. 9 is a perspective view of an embodiment of the device with alternate features of FIG. 1.

As shown in FIGS. 8A and 8B, where a bar 80 is used, in some configurations, this is a twisted bar 80 to provide additional strength. The bar 80 extends between a first end 84 and a second end 86 which are connectable to the brackets 12, 32. The bar 80 has an adapted portion 60 at its ends in the form of a through hole 60. The through hole 60 receives a shackle 50 for connecting to a corresponding connection member 70, 71 of the connected bracket 12, 32. A twisted bar 80 will provide resilience to bending. Other connection features are possible for connecting the bar 80 to the brackets 12, 32, such as those described elsewhere herein. Likewise, such connection members can be used on different elongate members 80.

In other options, the bar is circular (i.e. a rod) or is flat (i.e. a plate) or other suitable shapes. A chain tail 90 equivalent is also optionally present where a chain 80 is not used, such as with a cable or a rope.

The elongate member 80 provides traction by providing an additional surface with multiple dimensions where loose driving surface material, such as mud or snow, adheres, causing friction or otherwise interact with the elongate member 80 to increase traction. The brackets 12, 32 themselves also provide additional traction by their shape and various features described herein that also increase the varied surface that interacts with a driving surface.

In some configurations, the elongate member 80 has a curved edge that is exposed to the road, such as with chain links 82. The curved edge reduces damage to any hard surfaces, such as roads or sealed roads. However, where there is loose road material, such as mud or snow, the elongate member 80 provides traction by the loose road material adhering in and around the elongate member 80.

The elongate member 80, by being a chain or cable, rope or bar for instance, has a low profile and therefore reduces damage to road surfaces whilst maintaining improved traction by its shape.

Whilst in some configurations, a portion 88 of the elongate member 80 extends between the brackets 12, 32. It will be appreciated that unless the context requires, reference to the chain 80, elongate member 80 or portion 88 is a reference to either.

Whilst a single elongate member 80 is described extending between the brackets 12, 32. In some configurations, multiple elongate members 80 extend between the brackets 12, 32. However, a single elongate member 80 is preferred.

The low profile is achieved by the brackets 12, 32 and the elongate member 80 being limited in their height. The height of the elongate member 80 is less than the height of each of the brackets 12, 32. The height of the bracket being the distance from the top flange 14, 34 to the bottom flange 16, 36—and/or the height of the web 18, 38.

The top flanges 14, 34 of the first bracket 12 and the second bracket 32 are substantially the same height.

The bottom flange 16, 36 of the first bracket 12 and the second bracket 32 are also substantially the same height in some configurations.

The low profile is also achieved in some configurations by the height of the top flange 14 of the first bracket 12, top flange 34 of the second bracket 32 and elongate member 80 being substantially a same height. Therefore, they all extend a similar distance from the track 202, such as when viewed from the side. The low profile this is discussed in more detail with reference to FIG. 15 below.

In some configurations, the top flange 14, 34 of the brackets 12, 32 has a profile or thickness that is less than that of the elongate member 80. That is, when viewed from the side (i.e. along the surface of the track 202), the elongate member 80 extends further away from the track surface than the bracket 12, 32 (i.e. the top flanges 14, 34).

The elongate member 80 may have sections that have a smaller thickness or extend less far than the bracket 12, 32, such as with a chain that has links at different orientations or a bar that is twisted along its axis. However, the elongate member 80 has some portion that is thicker than that of the bracket 12, 32 (and namely the top flange 14, 34). This will be seen particularly when it is rotated between the two brackets 12, 32. This ensures that it is the elongate member 80 that is primarily in contact with the road surface. It also assists reducing damage to the brackets 12, 32 from the road surface.

A low profile of the bracket 12, 32 including the bottom flange 16, 36 and web 18, 38 also reduces the likelihood of fouling with the tracked machine 200 itself.

The thickness means the direction between the top flange 14, 34 and bottom flange 16, 36 of each bracket 12, 32. This is also referred to as a direction normal to a surface of the track 202.

The elongate member 80 has no further connections other than to the first bracket 12 and the second bracket 32. This ensures that it is the elongate member 80 that provides the traction and that damage to a road surface is minimised.

The first bracket 12 has an adjustment mechanism 100. The adjustment mechanism 100 is connectable to the first end 84 of the chain portion 88. The adjustment mechanism 100 allows movement of the first end 84 so that the chain 80 be tightened or loosened between the first bracket 12 and the second bracket 32 across the track 202. When the chain 80 is tightened between the first bracket 12 and second bracket 32 by the adjustment mechanism 100, a tension is formed in the chain 80. The tension holds the device 10 is position on the track 202.

The adjustment mechanism 100 varies the position of the first end 84 of the elongate member 80 (or end of the portion 88) connected to the first bracket 12 with reference to the first bracket 12 (or base of a mouth portion 20 of the first bracket 12). Therefore, the mouth 20, 40 of each bracket 12, 32 of the device 10 is tightenable around the edges of the track 202 to secure it in position and is held in position by the elongate member 80 therebetween.

When the adjustment mechanism 100 is moved to reduce the distance between the first bracket 12 and the elongate member 80, the track 202 applies an outward force. Therefore, the tension across the elongate member retains the brackets 12, 32 around the edges of the track 204, 206.

Referring to FIG. 1, the first bracket 12 is positioned offset to the second bracket 32 across the track 202. Therefore, the chain 80 extends diagonally across the track 202 with reference to the width of the track 202. The track 202 has recesses 208 in the tread. Therefore, the first bracket 12 and the second bracket 32 are positioned in the recesses 208. As the recesses are offset, the brackets 12, 32 and are likewise offset. The raised portions 210 of the track 202 are at the edges of the recesses 208 and hold the brackets 12, 32 in location on the track 202 to stop sliding along the track 202. It will be appreciated that where there are no recesses 208, or the recess are too small to accommodate a bracket 12, 32, the brackets 12, 32 do not need to be offset and the tension in chain 80 holds the brackets 12, 32 in position.

In addition to assisting preventing the brackets 12, 32 from sliding along an edge of the track 202, the recesses assist in the brackets 12, 32 having a low profile in track 202. This allows the use of the device 10 on particular terrain, such as roads, for instance. In some cases, the top flange 14, 34 is specifically sized to fit within a given recess 208.

The elongate member 80 is positioned straight or substantially straight between the two brackets 12, 32 when in use. Therefore, there is no additional feature on the tracks 202 to position the elongate member 80 other than the brackets 12, 32 and associated connecting devices discussed below. However, the elongate member 80 does not need to be in any particular orientation such as perpendicular to the track edges 204, 206 and crosses diagonally. This is the case if the brackets 12, 32 are positioned off-set.

The elongate member 80 being straight applies to the direction between the two brackets 12, 32. Therefore, the elongate member 80 is generally not curved away from the track 202 or along the track 202. This ensures that the same traction is provided across the track 202 and that tension is applied between the brackets 12, 32.

Referring to FIG. 3, a version of the adjustment mechanism 100 is shown. A receiving member 102 is provided on the top flange 14. The receiving member 102 is a ring, tube, cylinder, hollow structure or any other means through which an object may pass. The first end 84 of the chain portion 88 is connected to a threaded bar 62, where the threaded bar 62 passes through the receiving member ring 102. A securing nut 104 having an internal thread is screwed to the end of the threaded bar 62 to vary the length distance through the receiving member ring 102 that the threaded bar 62 passes. The securing nut 104 is also a threaded nut 104.

In this case, the threaded bar 62 is directly connected to the end of the elongate member 80, and specifically the first end 84 at an adapted portion 60. Therefore, the first end 84 of the portion 88 has a feature to connect to the adjustment mechanism 100. As the threaded bar 62 is fixed to the first end 84, this is used to vary the position of the chain portion 88 and thus the tension in the chain 80. A washer 106 is provided to ensure that the rotation of the securing nut 104 is possible once secured. The washer 106 is positionable on either side or both sides of the receiving member ring 102.

Figure 5:
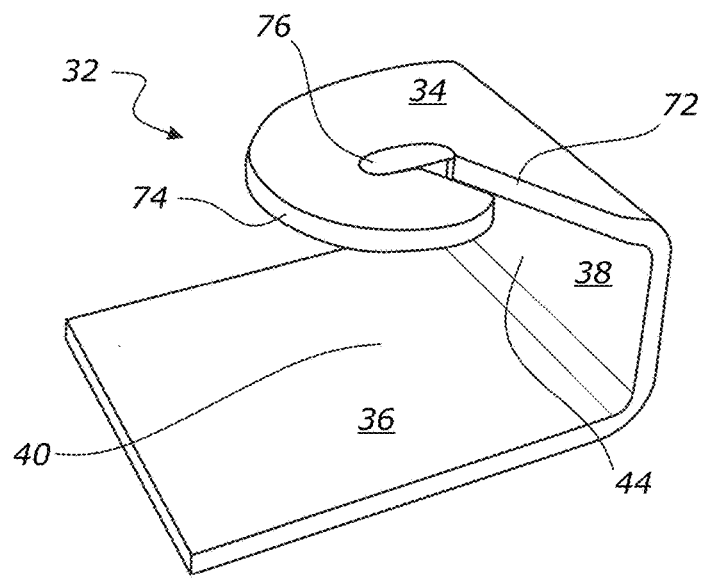
FIG. 5 is a perspective view of a bracket of FIG. 4.

The threaded bar 62 is connected to the first end 84 in a number of ways, for instance, in FIG. 3 it is directly connected at an adapted portion 60 to a chain link 82, such as by welding or other adhering techniques. However, in some configurations, the elongate member 80 is not adapted (i.e. it has a chain link 82 at its end) and is attached without an adapted portion 60. As will be appreciated the elongate member 80 is releasable from the first bracket 12 by the removal of the threaded bar 62 from the receiving member 102. In other arrangements, the chain 80 is removable from the threaded bar 62. The arrangement of connecting the elongate member 80 to the adjustment mechanism 100 may be referred to as a connection member 71 (FIG. 5). Likewise, the combined adjustment mechanism 100 along with threaded bar 62, connection member 71 may be referred to as the adjustor 15. The adjustor 15 is described in more detail elsewhere in this document.

Referring to FIGS. 1 and 3, the second bracket 32 is connected to the second end 86 of the portion 88 by a shackle 50. The shackle is connected on a chain link 82 and to the top flange 34 of the second bracket 32. A through-hole 46 (FIG. 2) is provided in the top flange 34 to allow the shackle 50 to connect to the second bracket 50. The through-hole 46 can be varied in location to alternative through-holes (FIG. 2: 48) to allow the shackle 50 more movement or to be arranged on a particular part of the top flange 34. The shackle 50 and through-hole 46 allow the chain 80 to have rotational movement with reference to the second bracket 32. However, the shackle 50 and thus second end 86 cannot move in the open side 42 or closed side 44 direction, instead that movement is controlled by the adjustment mechanism 100.

Whilst reference has been made to an adjustment mechanism 100 on the first bracket 12, optionally the second bracket 32 may also have an adjustment mechanism 100. Likewise, a first bracket 12 may have a shackle 50 arrangement as described above. The use of an adjustment mechanism 100 on either side of the track 202 such as using two first brackets 12 or a further adjustment mechanism associated with the second bracket 32 allows for easier access, provides more adjustment movement and/or provides redundancy. This also provides the advantage of simpler manufacturing by providing more identical parts.

The material used for the device 10 is any rigid material, such as steel. A rigid construction withstands forces that act on the device 10 when in use. In particular, the brackets 12, 32 are able to be formed of metal such as steel and likewise with the elongate member 80. Other components, such as the adjustment mechanism may utilize any material appropriate. Bolts and nuts are able to be made from metal. However, other materials can be used. Where a material is used that needs reinforcing, such as plastic, modifications to the brackets 12, 32 could be made to add additional strength webbing or to increase the thickness of some components.

Figure 4:
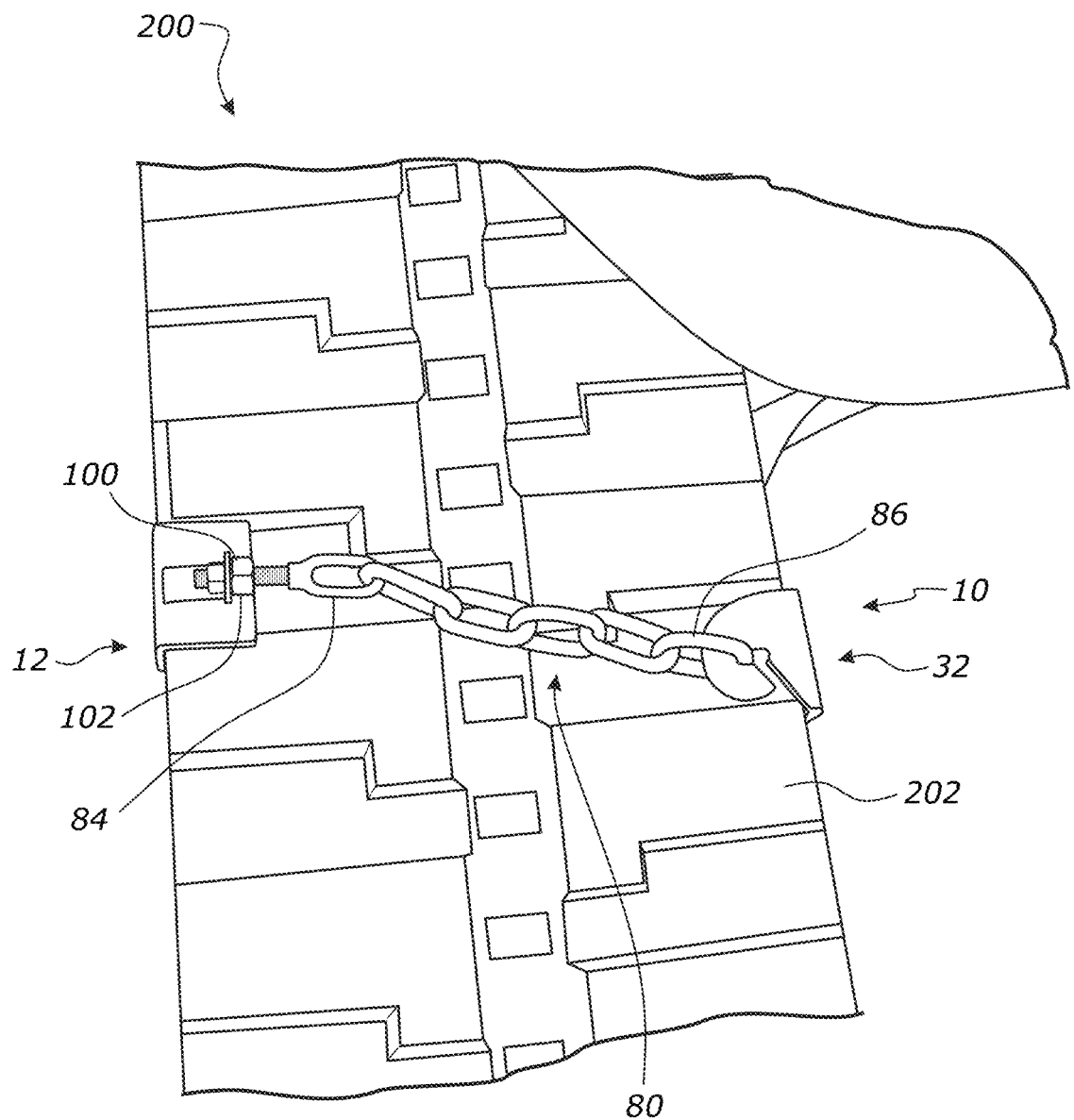
FIG. 4 is a perspective view of an embodiment of the device with alternate features of FIG. 1.
Figure 6:
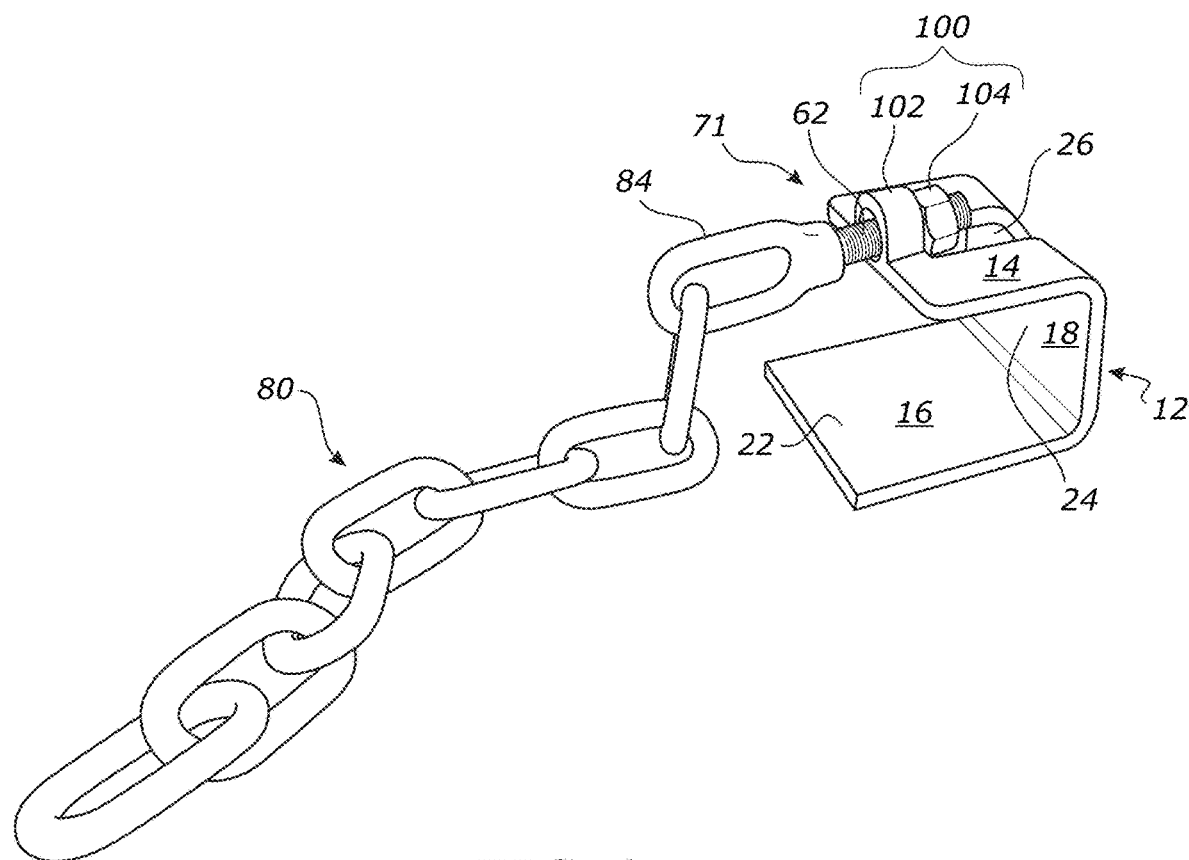
FIG. 6 is a perspective view of a further bracket and elongate member of FIG. 4.

Referring to FIGS. 4, 5 and 6, an alternative arrangement for the device 10 is shown for use with a tracked vehicle 200 having a track 202. The features are the same as those described elsewhere and have the same reference signs with the exceptions explicitly described below. It will be appreciated that the first bracket 12, second bracket 32 and elongate member 80 of this arrangement are interchangeable with the device 10 described elsewhere in the description. Therefore, likewise reference numerals will be used.

A chain 80 extends between the first bracket 12 and the second bracket 32 as seen before. The first bracket 12 has the adjustment mechanism 100 to vary the position of the first end 84 in the open side direction 22 or the closed side direction 24.

The second bracket 32 has a top flange 34, bottom flange 36 and web 38 as hereinbefore described. However, the top flange 34 is modified to have a (second bracket) connection member 70 for connecting to the chain 80. The connection member 70 has a hook 72 formed in the top flange 34. The material of the top flange 34 is removed to leave the shape of the hook 72. The mouth of the hook 72 is shaped to receive a chain link 82 of the second end 86. The mouth of the hook 72 is directed (at least partially) in the closed side 44 direction to prevent the second end 86 from releasing when engaged in the hook 72. The hook 72 has an elongate engaging section 76 extending in the open side 42 direction to limit the movement of the chain link 82 when engaged in the hook 72. These features are seen in FIG. 5.

The hook 72 has a radiused face 74 at the open side 42 to allow the rotation of the second end 86 with reference to the hook 72. This is in the same manner as the shackle 50. Likewise, the second end 84 is prevented from moving in a width direction of the second bracket 32 when engaged in hook 72 and under tension.

The hook 72 is formed to have the same thickness as the top flange 34. Therefore, the bracket 32 with the hook 72 has the same profile when viewed from the side perspective. Where the hook 202 is cut out from the top flange 34, this assists in forming the low profile.

The first bracket 12 has the adjustment mechanism 100 with the receiving member 102. The receiving member 102 is a nut in the case of FIG. 4 or a ring in the case of FIG. 6. The receiving member 102 is arranged on the top flange 14 at the open side 22 edge. Therefore, there is no part of the top flange 14 that will impact with the receiving member 102. The first end 84 of the chain 80 has the threaded bar 84 that passes through the receiving member 102. Where the receiving member 102 is a nut, this has an inner thread and the threaded bar 62 is to be screwed therethrough. Otherwise, a securing nut 104 is used to vary the distance through the receiving member 102 and thus the tension in the chain 80 when the device 10 is in use.

The first bracket 12 has an additional central cut-out 26 in the top flange 14 extending from the receiving member 102 in the closed side 24 direction and having a width similar to that of the receiving member 102. The central cut out 26 extends slightly into the web 18. The central cut-out 26 allows access to the securing nut 104 from the closed side 24. Such access may be required to use a spanner, screwdriver or socket on the adjustment mechanism to vary the position of the chain 80 relative to the first bracket 12. The central cut out 26 also allows rotation of the securing nut 104 without fouling on a top surface of the top flange 14.

The radiused face 74, use of a shackle 50, 66 or having an adapted portion 60 are all examples of how the elongate member 80 when connected to a bracket 12, 32 is able to rotate relative to the bracket so that is does not need to extend at a directly perpendicular direction to the web 18, 38. Therefore the connection members 70, 71 allow the rotation of the elongate member 80. This allows the elongate member 80 to extend at various angles from the brackets 12, 32 across the track 202 so that the position of the corresponding bracket 12, 32 is variable. This is useful for tracks 202 that have recesses 208, raised portions 210 or other features that prevent a bracket 12, 32 from sitting in a position directly opposite the corresponding bracket 12, 32. The various features allow for movement of at least 45° from a line directly across a track of the elongate member 80 relative to the bracket 12, 32. However, the angle is able to be much more than this whilst still being attached to the bracket 12, 32 (via the connecting portion). For instance, angles of up to 70° or even 90° are possible. This angle may be in any direction. However, it is most useful for a direction along the surface of the track 202 as opposed to a vertical direction. This is to maintain the low profile of the device 10.

Figure 7A:
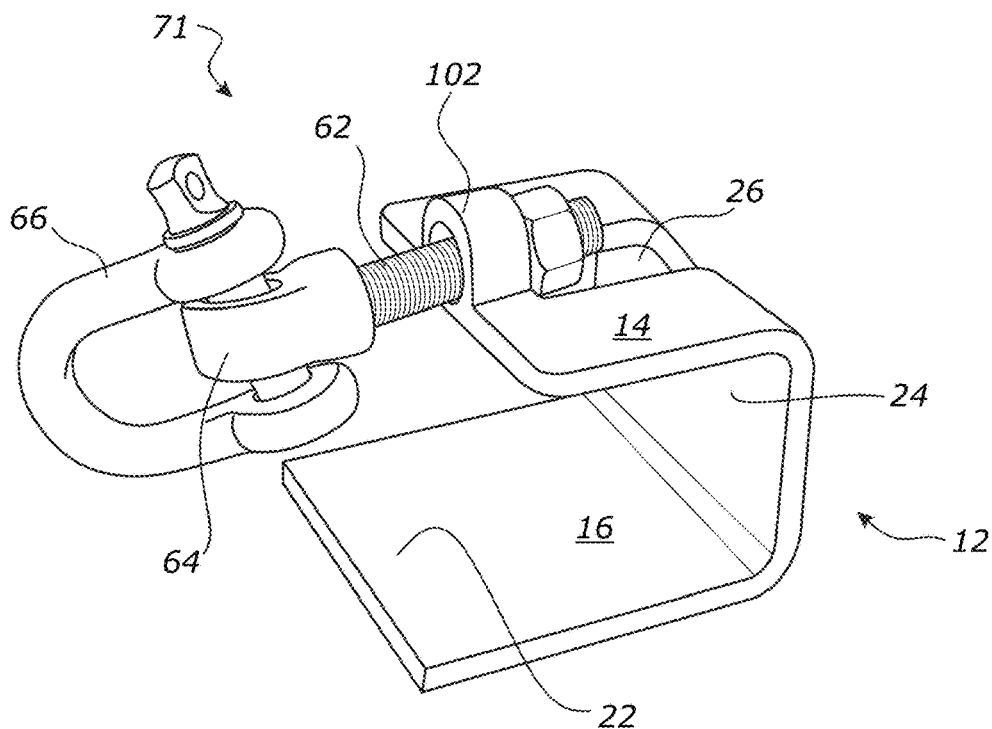
FIG. 7A is a perspective view of an alternative bracket of FIG. 1.
Figure 7B:
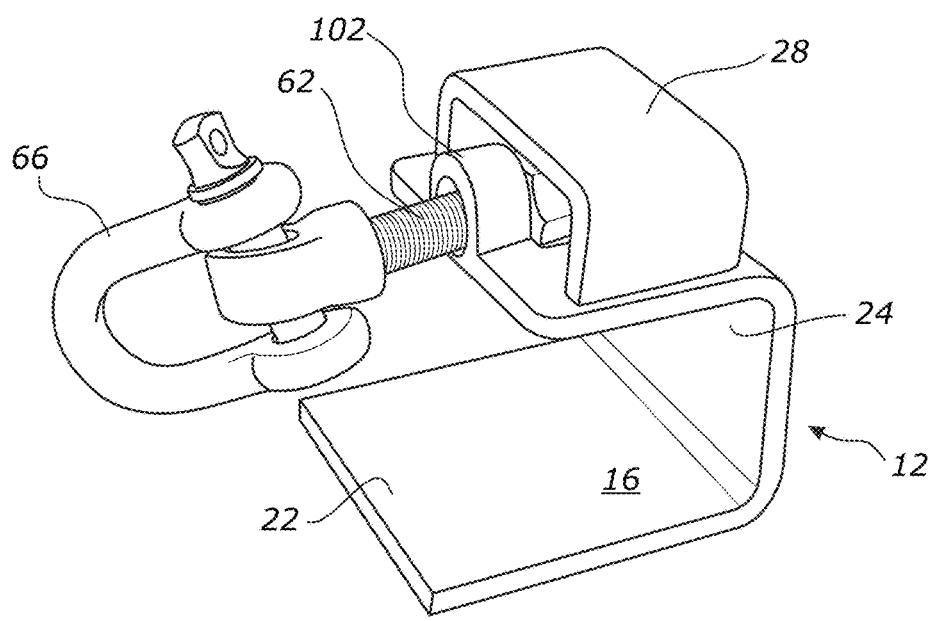
FIG. 7B is a perspective view of the bracket of FIG. 7A in use with a continuous track of the tracked vehicle.

Referring to FIGS. 7A and 7B, an alternative arrangement for the connection member 71 with the threaded bar 62 is shown. One end of the threaded bar 62 is releasably connected to the receiving member 102 as described above. Whilst a first bracket 12 having a central cut out 26 is shown, any first bracket 12 described herein is usable. The other end of the threaded bar 62 is connected to an eyelet 64 having an opening. The opening of the eyelet 64 receiving a further shackle 66 where the shackle connects the first end 84 and the eyelet 64. The eyelet 64 optionally has an internal thread to receive the threaded bar 62.

Referring to FIG. 7B, the first bracket 12 is shown where the bracket 12 has a housing 28 arranged on the surface of the top flange 14. The housing 28 covering at least part of the adjustment mechanism 100. The housing 28 being a plate that extends across the width of the top flange 14 and having open ends on the open side 22 and closed side 24 of the first bracket 12 to ensure that the adjustment mechanism 100 is adjustable to vary the relative length of the elongate member 80. It will be appreciated that the housing 28 is usable with any first bracket 12 or second bracket 32 herein described. The housing 28 protects connections of the brackets 12, 32 from dirt such as mud and from damage. Other housings 28 are possible, such as being incorporated into the brackets 12, 32.

An alternative arrangement for the device 10 is described with reference to FIGS. 9, 10A, 10B, 10C, 10D, 11A, 11B, 11C and 11D. Unless described below, the features are the same as those described elsewhere and have the same reference signs. Therefore, likewise reference numerals will be used. It will be appreciated that features of this device 10, such as the first bracket 12, second bracket 32 and elongate member 80, are interchangeable with the device 10 described elsewhere in the description.

As best seen in FIGS. 10A to 10D, the top flange 34 of the second bracket 32 has a connection member 70 for removably connecting to the chain 80. The connection member 70 has a hook 72 for engaging with a link 82 of the chain 80. The hook 72 has multiple engaging sections 76 for receiving a chain link 82. The engaging sections are also be referred to as hooking portions 76. The chain link 82 is selectively connected at either of the hooking portions 76. In the figures, there are two hooking portions 76. The first hooking portion 77 is located closer to the closed side 44 than a second hooking portion 78 that is located closer to the open side 42. Therefore, when a given length of chain 80 is connected at its second end 86 of a portion 88 at the first hooking portion 77, the second end 86 is closer to the closed side 44 than when a given length of chain 80 is connected at its second end 86 of a portion 88 at the second hooking portion 78.

The use of a first 77 and second 78 hooking portion allows for variability in the connection member 70 to allow for the chain 80 to be tightly connected before adjustment by the adjustment mechanism 100 to apply additional tension. Therefore, the adjustment required at the adjustment mechanism 100 is minimised. The first 77 and second 78 hooking portions are optionally also differently sized to received different sized chain links 82. A different connection means may optionally be used in at least one of the engaging sections 76 for attaching to a rigid bar, rope or a cable, for instance.

The mouths of the first 77 and second 78 hooking portions are arranged so they are further in the closed side 44 direction than the base of the first 77 and second 78 hooking portions. This ensures that a chain link 82 is held in position when a force is applied in the open side 42 direction.

The hook 72 has a radiused hook edge 74 facing the chain 80 when connected. Therefore, the radiused hook edge is opposite the closed end 44 side of the bracket 32. This radiused hook edge 74 allows the chain 80 to have a degree of rotation relative to the hook 72 that allows the chain 80 to extend away from the hook at an angle—as would be required when the brackets 12, 32 are positioned in recesses 208 of the track 202 that are offset.

The connection member 70 and associated hook 72, 77, 78 may be referred to as a connector 35. The connector 35 is described in more detail in this document.

Figure 10A:
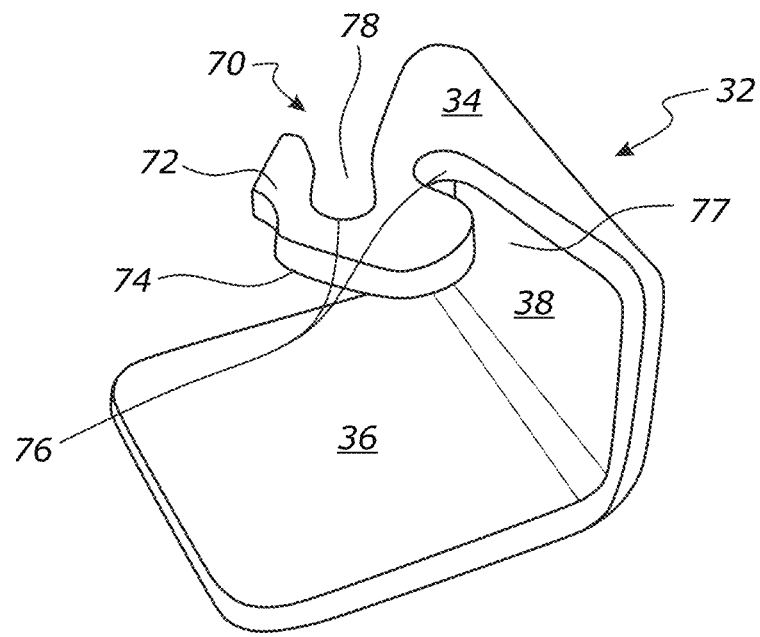
FIG. 10A is a perspective view of a bracket from the device of FIG. 9.
Figure 10B:
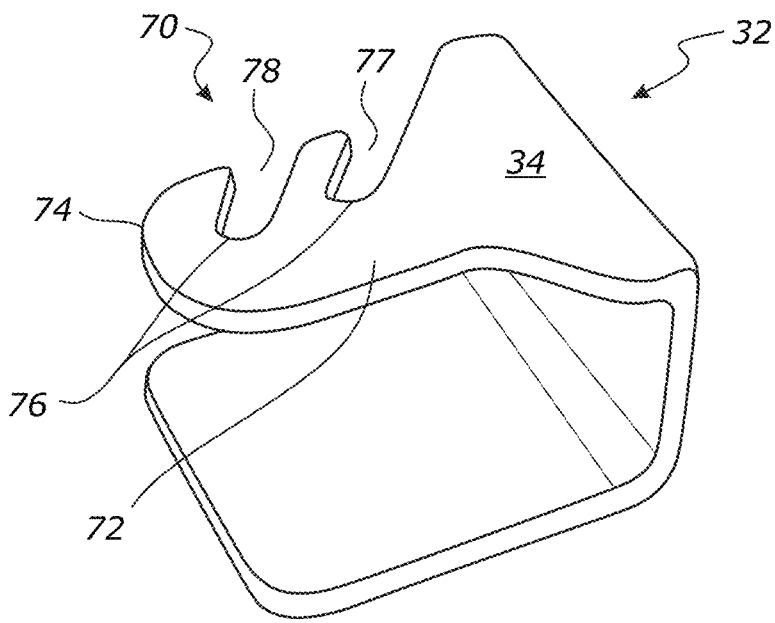
FIG. 10B is a perspective view of an alternative bracket of FIG. 10A.
Figure 10C:
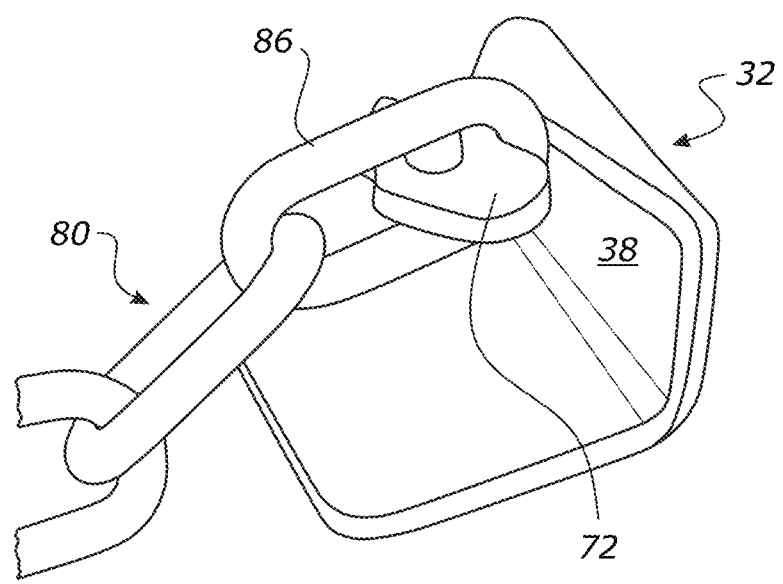
FIG. 10C is a further perspective view of the bracket of FIG. 10A with the elongate member.

As shown in FIGS. 10A and 10C, the first 77 and second 78 hooking portions are arranged at opposite sides of the connection member 70. Therefore, the mouths face in opposite directions across the width of the top flange 34. This provides a compact arrangement. Whilst two hooking portions 76 are shown, three or more hooking portions 76 could be provided in any configuration. Furthermore, a single hook 72 could accommodate multiple chains 80, such as connecting to a plurality of first brackets 12.

When used, the opposite sides refer to a direction transverse to extension between the open side 22, 42 and closed side 24, 44.

Figure 10D:
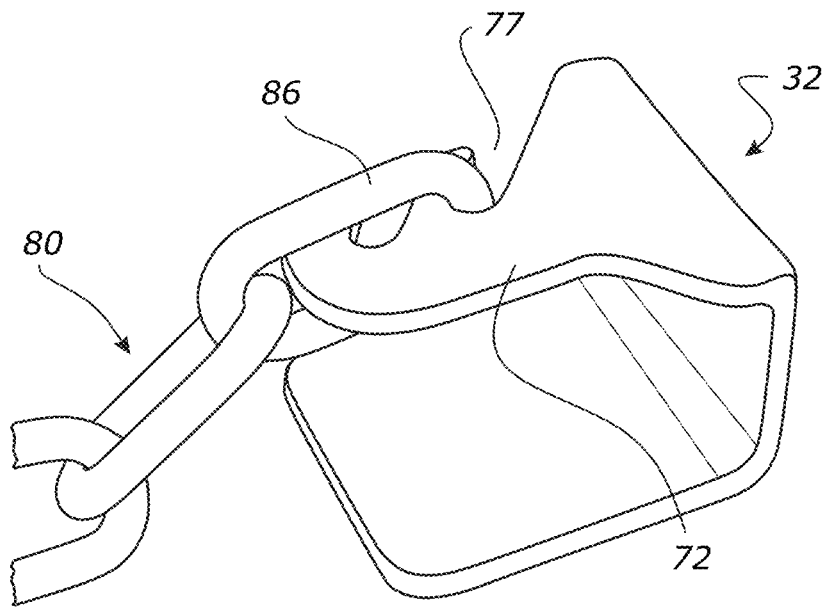
FIG. 10D is a further perspective view of the bracket of FIG. 10B with the elongate member.

As shown in FIGS. 10B and 10D, the first 77 and second 78 hooking portions arranged to be on the same side of the hook 72. The same sides refer to a direction transverse to extension between the open side 22, 42 and closed side 24, 44. Therefore, the first 77 and second 78 hooking portions have their mouths on the same side. This provides a strong arrangement and has the advantage of multiple hooks as discussed elsewhere. The hook 72 has a radiused front edge 74 to allow the chain link 82 to be able to rotate over a front edge of the hook 72 when engaged without fouling.

It will be appreciated that the connection member 70 described here is usable with any device 10 described.

The removeable attachment of the elongate member 80 to the brackets 12, 32, such as via the connection members 70, 71 allows the device 10 to be disassembled into separate parts or pieces. This also assists with manufacturing or with replacement of parts.

Referring to FIGS. 11A-D, a first bracket 12 has an adjustment mechanism 100. An alternative connection member 71 for connecting the adjustment mechanism 100 to the chain 80 is provided. The bracket 12 has a receiving member 102, the receiving member 102 is positioned in the top flange 14 and is at the closed side 24. The receiving member 102 is at the corner between the web 18 and the top flange 14. The receiving member 102 is tubular and receives a threaded bar 62. The threaded bar 62 is threaded bolt 62 and the bolt head 104 is the equivalent of the threaded nut 104 as previously described. The bolt head 104 is on the closed side 24 direction of the receiving member 102. As will be appreciated, a nut 104 is also possible. A washer 106 is also used between the bolt head 104 and the receiving member 102 to ensure that the threaded bolt 62 be easily tightened and loosened.

The open side 22 of the threaded bar 62 is received by a collar 79 of the connection member 71. The collar 79 is a cylindrical shape and internally threaded to rotatably connect with the threaded bar 62. The threaded bar 62 may be optionally connected by other alternatives, such as by a by welding to the connection member 71.

To receive the collar 79, the first bracket 12 has a central cut-out 26 in the top flange 14 extending from the receiving member 102 at the closed side 24 to the open side 22. Therefore, the collar 79 sits in the central cut-out 26. The side portions of the top flange 14 at either side of the central cut-out 26 remain to provide support. At the mouth of the central cut-out 26 at the open side 22, the edges are radiused to provide a radiused central edge 29 to transition between the central cut-out 26 and the front edge. This provide space for a similarly radiused connection member 71 to be positioned and rotate within that space.

Figure 11A:
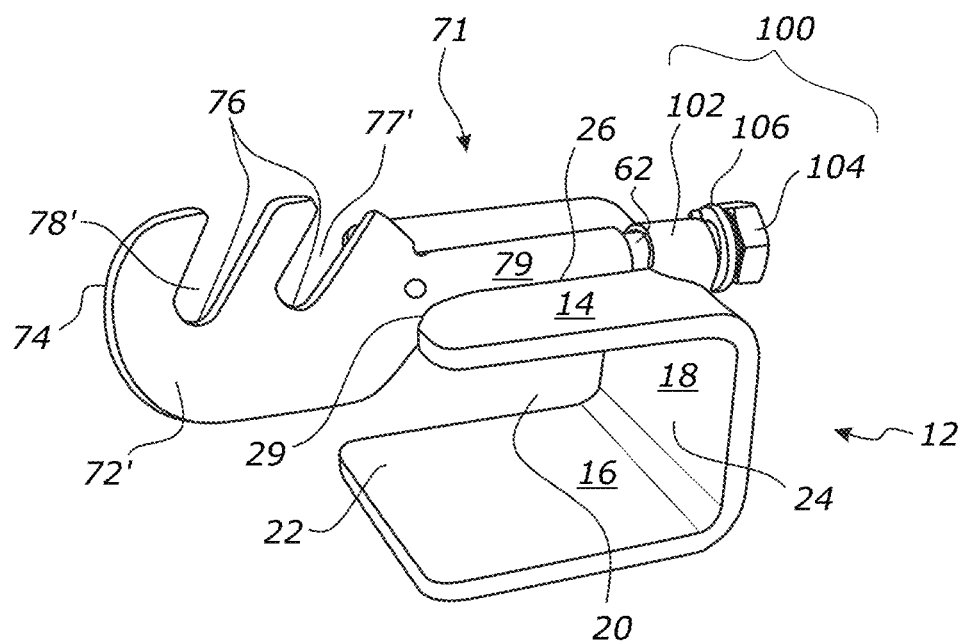
FIG. 11A is a perspective view of a further bracket and connection member of the device of FIG. 8.

As shown in FIG. 11A, the collar 79 is connected to a hook 72'. The hook 72' removably connects to the chain 80 in a same manner as described elsewhere herein with reference to the second bracket 32 hook 72. The hook 72' has a two engaging sections/hooking portions 76 for selectively receiving a chain link 82. The first hooking portion 77' is located closer to the closed side 24 than a second hooking portion 78' that is located closer to the open side 22. Therefore, when a given length of chain 80 is connected at its first end 84 of a portion 88 at the first hooking portion 77', the first end 84 is closer to the closed side 24 than when a given length of chain 80 is connected at its first end 84 of a portion 88 at the second hooking portion 78'.

As with the hooks 72 described elsewhere, the first 77' and second 78' hooking portions are also optionally differently sized to received different sized chain links 82 or different variations of elongate members 80.

The mouths of the first 77' and second 78' hooking portions are arranged so they are further in the closed side 24 direction than the base of the first 77' and second 78' hooking portions. This ensures that a chain link 82 is held in position when a force is applied in the open side 22 direction.

The first 77' and second 78' hooking portions arranged to be on the same side of the hook 72'. Therefore, the first 77' and second 78' hooking portions have their mouths on the same side. This provides a strong arrangement and reduces any need for rotation of the connection member 71 when swapping the connection of the chain 80 between the first 77' and second 78' hooking portions. The hook 72' has a radiused front edge 74 to allow the chain link 82 to be able to rotate over a front edge of the hook 72' when engaged. Likewise, the radiused central edge 29 allows for the back edge of the hook head to rotate within the central cut-out 26 without fouling.

The first 77' and second 78' hooking portions arranged to be on the same side of the hook 72' are also variations to be utilised in a second bracket 32 for the hook 72 used therein.

In addition to the first 77' and second 78' hooking portions allowing for positioning of the chain 80, the adjustment mechanism 100 allows for applying the tension to the chain 80 by the rotation of the hex head 104 to screw the threaded bar 102 along the collar 79 therefore moving the hook 72' toward or away from the bracket 12. Therefore, the connection member 71 and hook 72' is moved relative to the threaded bar 62. Therefore, tension is applied to portion 88 of a chain 80 that is restrained at its opposite edge, for instance by a second bracket 32 engaged by a track edge 206.

Alternatively, a threaded nut 104 is connected at the receiving member 102 end of the threaded bar 62 and the rotation of the nut 104 will move the threaded bar 62 and the collar 79 connected thereto relative to the receiving member 102.

When the hex head or threaded nut 104 is positioned on an outside of the web 18, 38, it allows easy access to the hex head or nut 104 to move vary the adjustment mechanism 100. A hex head or nut 104 is also operable by a spanner, which is more commonly carried than specialist screw drivers or allen keys.

Whilst a receiving member 102 has been described as being at the web 18 end of the first bracket 12, in some arrangements, the receiving member is a cylinder that extends some or all of the length of the top flange 14. This also removes the requirement for a housing 28 over the adjustment mechanism 100. However, both arrangements are combinable.

Figure 11B:
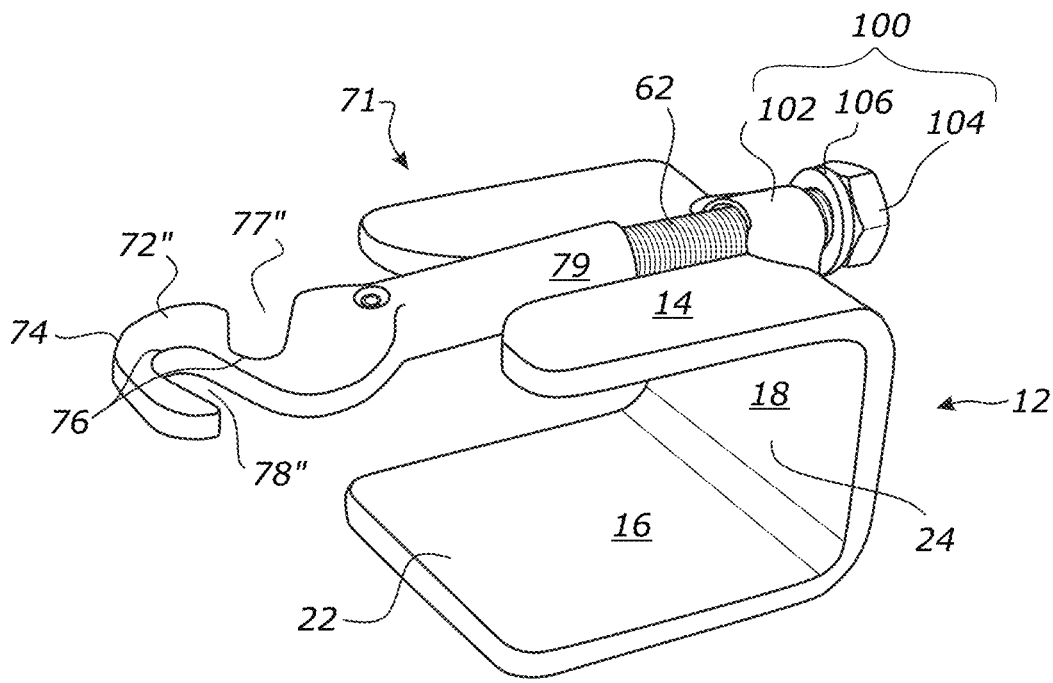
FIG. 11B is a perspective view of the further bracket of FIG. 11A with an alternative connection member.
Figure 11C:
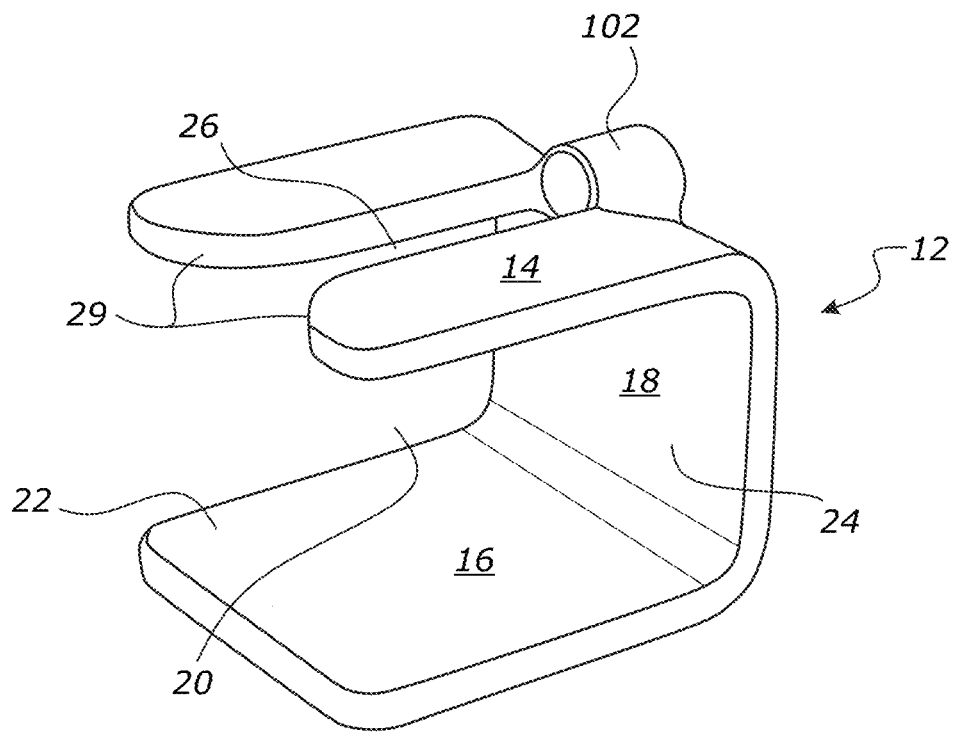
FIG. 11C is a perspective view of the further bracket of FIGS. 11A and 11B without the connection member.
Figure 11D:
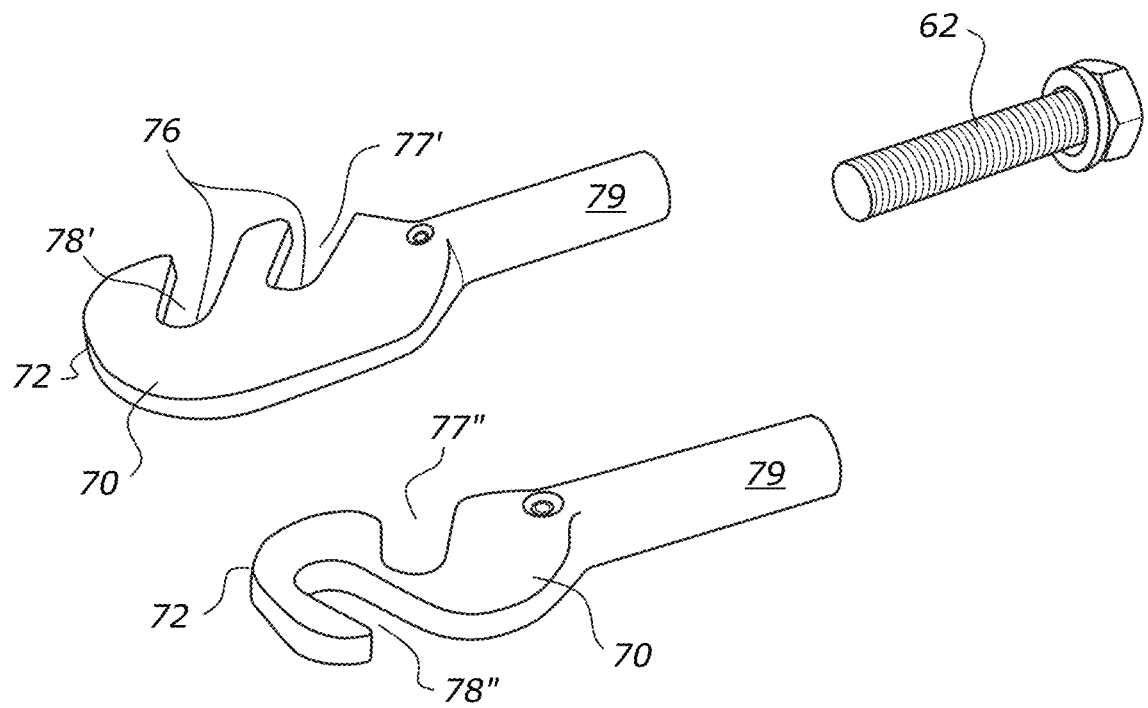
FIG. 11D is a perspective exploded view of the connection members of FIGS. 11A and 11B.

Referring to FIG. 11B, the same arrangement for the connection member 71 can be used wherein the hook 72" has two hooking portions 76 that are arranged on opposite sides of the hook 72". Therefore, a first 77" and a second 78" hooking portion are arranged to be on opposite sides of the hook 72" similar to that of the second bracket 32 described in an arrangement. Therefore, the first 77" and second 78" hooking portions have their mouths on opposite sides of the hook 72". This provides a compact arrangement.

The arrangement also allows for interchangeable hooks 72', 72", such as when different sizes are required, or to easily allow for replacements. Therefore, the adjustment mechanism 100 remains the same including the threaded bar 62 and it is the connection member 71 that is varied. This arrangement is also compatible with the second bracket 32. However, only one side needs to be adjustable and therefore, not all the components of the adjustment mechanism 100 need to be provided.

The hooks 72', 72" of the first bracket 12 are optionally formed to be the same thickness as the top flange 14. Therefore, the hooks 72', 72" or hook parts themselves have a profile, when rotated, that is the same as the bracket 12 and is smaller than that of the elongate member 80. As the hooks 72', 72" are rotatable within the collar 79, the collar 79 would be thicker than the thickness of the top flange 14 in some configurations. However, the collar 79 is still not as thick as the elongate member 80. It is noted that the elongate member 80 may have thinner portions, such as with a chain, but the thickness refers to the largest part of the elongate portion 80.

An alternative embodiment of a bracket 12, 32 for either a first bracket 12 or a second bracket 32 is described with reference to FIGS. 12, 13A, 13B, 16A and 16B. The features are the same as those described elsewhere with the exceptions as described below, and therefore, have the same reference signs for the same features. It will be appreciated that the features, such as the first bracket 12 and second bracket 32, are interchangeable with the device 10 described elsewhere herein.

Referring to FIG. 12, a tracked vehicle 200 has a track 202 with recesses 208 in the track 202, the recesses 208 extend across the width of the track 202. The raised portions 210 are positioned aside the recesses 208. The bracket 12, 32 is too big to sit within a recess 208 for this track 202 and instead straddles the raised portions 210.

With reference to FIGS. 13A and 13B, a receiving member 102 is provided in the bracket 12, 32 for receiving a threaded bar 62 as described above. However, the receiving member 102 is positioned below the top flange 14, 34 and in the mouth portion 20, 40 of the bracket 12, 32 itself. The receiving member 102 is a cylinder and penetrates the web 18, 38 and passes from the closed side 24, 44 to the open side 22, 42. The receiving member 102 is optionally in contact with an internal surface of the top flange 14, 34 or extends with no contact. The receiving member 102 in this position sits inside the recess 208 when the bracket 12, 32 is positioned on the track 202. The receiving member 102 is then connectable to a connection member 70, 71 for attaching to an elongate member 80.

The elongate member 80 passes through the recess 208 and provide additional traction within the recess itself. In addition to a compact arrangement and ensuring a low profile to reduce damage for roads, this also provides protection for the adjustment mechanism 100, connection member 70 for the second bracket 32 or connection member 71 for the first bracket 12 as appropriate.

As rubber tracks 202 deform, a wholly rigid device 10 could become loose in use. Therefore, the adjustment mechanism 100 ensures there is sufficient tension between the brackets 12, 32 to hold the device 10 in position at the edges of the track 202. In some cases, the tension additionally forms some deformation or deflection in the edge of the track 202 to hold the device 10 in position.

Whilst rubber tracks 202 have been discussed above, the device 10 can also be used with metal tracks 202, such as steel tracks 202. The lack of deformation in such a track will reduce the amount of adjustment required. The device 10 is also compatible with any other type of track 202, e.g. rigid or flexible.

The device 10 is usable as or with a track back device. A track back device is used to place a part of a track 202 into a sprocket of a tracked vehicle 200. This is useful when a part of the track, e.g. the track shoe that extends across the track 202 is detached from the track or vehicle. The device 10 is placed around a track shoe in the same manner as the device is placed at edges 204, 206 of the track 202. When a load is applied to the elongate member 80, such as by it being attached to a bucket of the tracked vehicle 200, the first and second edges 204, 206 will fully engage the corresponding brackets 12, 32. When a load is applied to the elongate member 80 in a generally vertical direction, a forces will be applied to the track 202 at the edges 204, 206. The forces applied to the track 202 by the first and second brackets 12, 32 will lift the track 202 relative to a sprocket. Therefore, the track 202 may be moved to the right position.

Figure 14A:
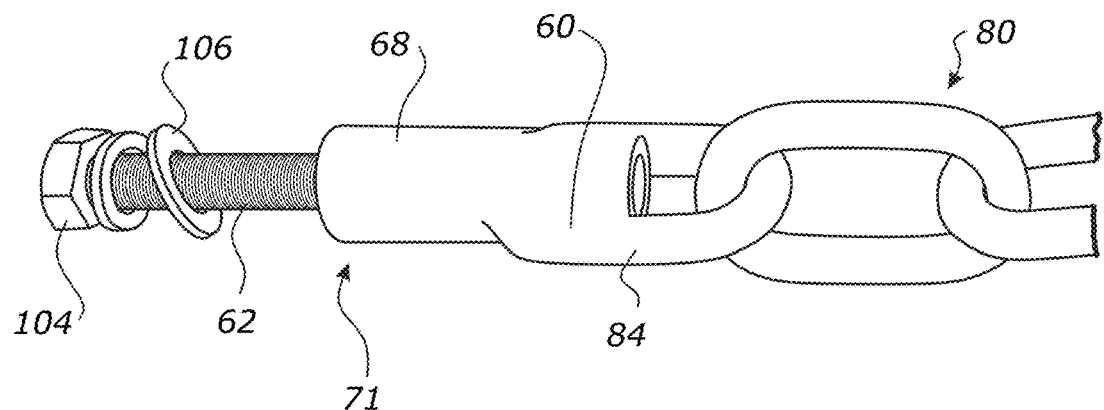
FIG. 14A is a perspective view of an elongate member with alternate features of FIG. 1.
Figure 14B:
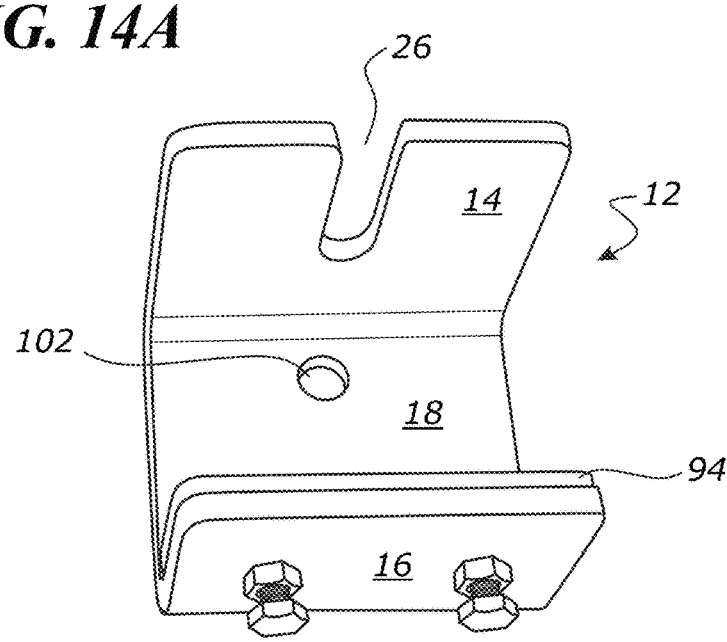
FIG. 14B is a perspective view of a bracket for use with the elongate member of FIG. 14A.
Figure 14C:
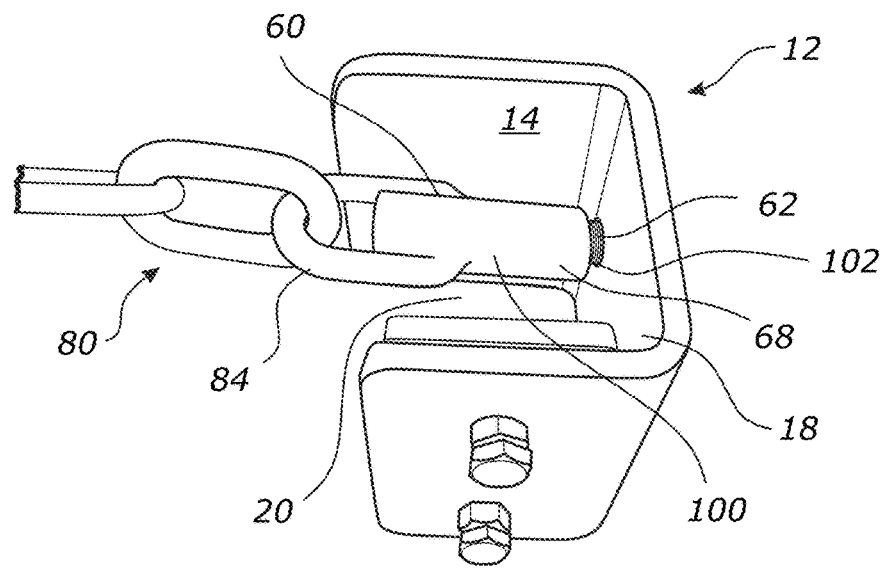
FIG. 14C is a perspective view of the combination of the elongate member and bracket of FIGS. 14A and 14B.

Referring to FIGS. 14A, 14B and 14C an alternative arrangement for the device 10 is described. Unless described below, the features are the same as those described elsewhere and have the same reference signs. Therefore, likewise reference numerals will be used. It will be appreciated that features of this device 10, such as the first bracket 12, second bracket 32 and elongate member 80, are interchangeable with the device 10 described elsewhere in the description.

The bracket 12, 32 herein described is able to be used at either side of a track 202 and is able to be used together. Therefore, reference to a particular first or second bracket 12, 32 or end of the elongate member 80 is interchangable.

Referring to FIG. 14A, an elongate member 80 has a first or second end 84, 86 for connecting to a first or second bracket 12, 32. As described elsewhere, the connection between the ends 84, 86 and the brackets 12, 32 are connection members 70, 71.

The first or second end 84, 86 has an adapted portion 60 where a tubular member 68 is attached to the first or second end 84, 86. Therefore, in one specific example, a chain link 82 is cut in half and a tubular member 68 is welded between the remaining arms of the chain link 82. However, a tubular member 68 will be connectable to any elongate member 80, such as a bar.

The tubular member 68 has an internal thread for receiving the threaded bar 62. The threaded bar 62 is rotatable by a nut or bolt head 104. Washers 106 are provided to assist with rotation. As the threaded bar 62 is rotatable, the tubular member 68 is moved along the threaded bar 62. Therefore, the adapted portion 60 with the tubular member 68 forms part of an adjustment mechanism 100.

In some embodiments, the threaded bar 62 may be replaced by any other distance varying part 62 to allow the distance between the bracket 12, 32 and the connection of the elongate member 80 to be varied by multiple integers. For instance, a ratchet may be used or a rack and pinion arrangement. Other embodiments may also include a friction held distance varying part 62 such as a channel with a tightening member. The distance varying part 62 may also be referred to as a threaded member 62. The distance varying part 62 allows the tensioning of the elongate member 80 between a first 12 and second 32 bracket and therefore has fine movement or the integers between movement is small to enable the tension to be applied.

Referring to FIG. 14B, a bracket 12, 32 similar to those previously described having a top flange 14, 34, bottom flange 16, 36 and web 18, 38 additionally has a receiving member 102 in the web 18, 38. The receiving member 102 is a through-hole.

A cut-out portion 26 is provided in the top flange 14, 34 and a packer plate 94 (described below with reference to FIGS. 16A and 16B) and associated attachments as described above are provided. However, these features are optional.

Referring to FIG. 14C, the threaded bar 62 is passable through the receiving member 102 such that the bolt head/nut 104 is present on one side of the web 18, 38 and the removably attached and distance adjustable tubular member 68 of the adapted portion 60 is on the other. Therefore, an adjustment mechanism 100 is formed wherein the connection member 70, 71 is positioned in the mouth portion 20, 40 of the bracket 12, 32.

The threaded bar 62 is rotatable to move the end 84, 86 of the elongate member 80 away or toward the bracket 12, 32 to vary the tension in the elongate member 80 when attached to a further bracket 12, 32 restrained on the other side of a track 202.

The connecting member 70, 71 is not in (direct) contact with the top flange 14, 34. Instead a gap is formed between the inside surface of the top flange 14, 34 and the connection member 70, 71. More specifically, the receiving member 102 is positioned at a height on the web 18, 38 such that the tubular member 68 of the adapted portion 60 cannot be in contact with any part of the bracket 12, 32 other than the web 18, 38.

As the connection member 70, 71 is positioned below the top flange 14, 34, the connection member 70, 71 sits in a recess 208 of the track 202 when the bracket 12, 32 is brought into position at an edge of the track 202. The receiving member 102 is positioned substantially centrally in the web 18, 38 in a depth direction, i.e. when viewed from an open side 22, 42, the receiving member 102 is horizontally central.

The depth central position allows straddling on raised portions 210 of a track with part of the top flange 14, 34 on either side of the recess 208.

The receiving member 102 is positioned closer to the top flange 14, 34 than the bottom flange 16, 36 in the web 18, 38, i.e. the vertical direction when viewed from a side perspective. The higher vertical positioning of the receiving member 102 allows the connection member 70, 71 to be positioned in a recess 208 whilst ensuring the bracket 12, 32 is still positionable around an edge of a track 202.

The optional cut-out 26 allows access to the connection member 70, 71 and particularly the first end or second end 84, 86 of the elongate member 80 from a top to enable the holding of the elongate member for adjustment. The optional cut-out 26 also allows space for the first end or second end 84, 86 of the adapted portion 60 to be positioned.

The arrangement may be used on either bracket 12, 32. Therefore, optionally, two adjustment mechanisms 100 are provided in a device 10. This allows for the same parts to be used on either side of the elongate member 80.

As with other configurations, the compact arrangement ensures that the connection members 70, 71 are protected whilst the elongate member 80 provides traction.

Figure 15:
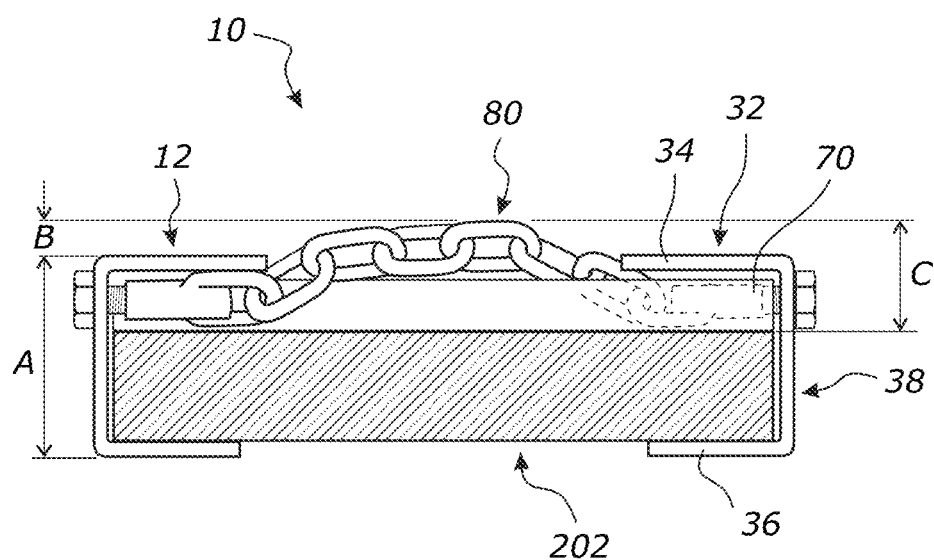
FIG. 15 is a cross-sectional partially sectional front view of a track with the device of FIGS. 14A to 14C

Referring to FIG. 15, the bracket of 12, 32 of FIGS. 14A-14C is shown in a cross-section view. However, it will be appreciated that the brackets 12, 32 described elsewhere are used. The bracket 12, 32 has a height A that is the same as the height of the web 18, 38. This height A allows the bracket 12, 32 to fit around a track 202. The elongate member 80 has a height C as it extends from the connection members 70, 71 to the it's maximum vertical height. The elongate member height C is always less than the bracket height B to provide a low profile. In the particular brackets 12, 32 of FIG. 15, the connection member 70, 71 (also adjustment mechanism 100) is positioned in the mouths of the brackets 12, 32. Therefore, the height of the device 10 is further reduced. Part of the elongate portion extends a height B above the maximum height of the bracket 12, 32. This elongate portion height B represents the thickest part of the elongate portion 80. This elongate portion height B is smaller than the height of the bracket A. Furthermore, the thickness of a top flange 14, 34 of the bracket 12, 32 is less than the elongate portion 80.

The low profile is achieved by the brackets 12, 32 and the elongate member 80 being limited in their height. The height of the elongate member B, C is less than the height of each of the brackets A. The low profile is also achieved in some configurations by the height of the top flange 14 of the first bracket 12, top flange 34 of the second bracket 32 and elongate member 80 substantially extending to a similar maximum height. This is especially the case where the connection member 70, 71 is arrange on a top of a top flange 14, 34.

In FIG. 15, the brackets 12, 32 are shown to be staggered, i.e. they are in separate recesses 208 of the track 202 and therefore, the elongate member 80 extends diagonally across the width of the track 202. Therefore, the elongate member 80 goes across the raised portion 10 of the track 202. However, in some configurations where there is provided a recess 208 across the width of the track 202, the elongate portion 80 is positioned wholly within the recess 208. Therefore the elongate member height C is the same as the portion of the elongate member height C.

Figure 16A:
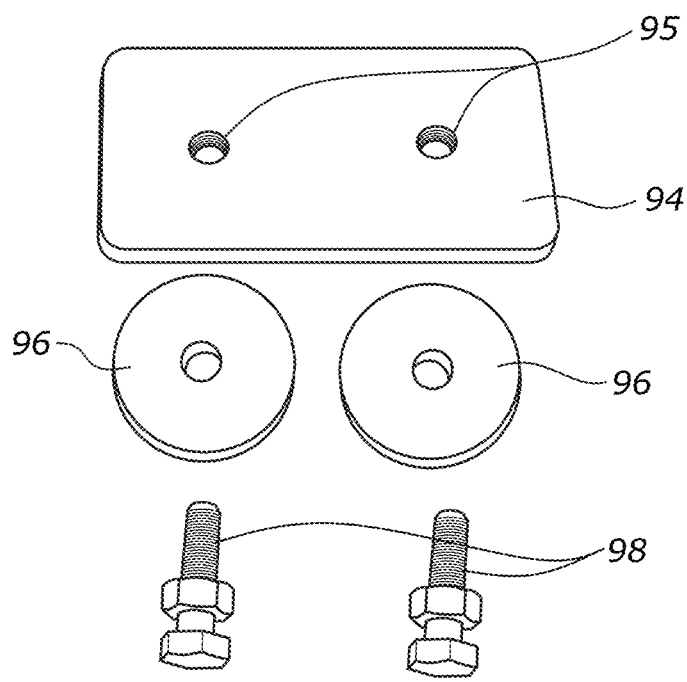
FIG. 16A is a perspective exploded view of the packer features for the bracket of FIGS. 11, 12A and 12B.
Figure 16B:
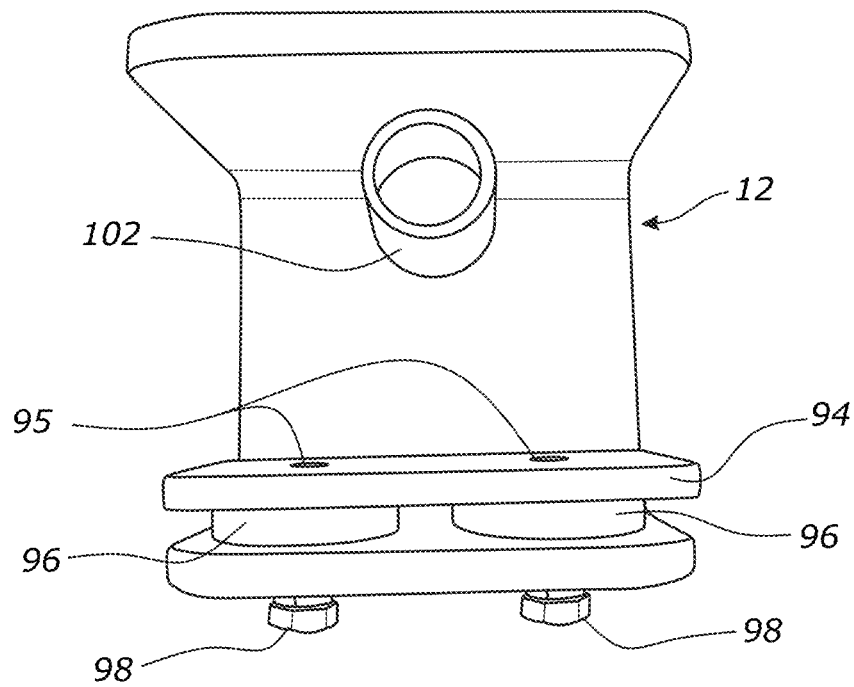
FIG. 16B is a perspective front view of the bracket and packer features of FIGS. 11, 12A, 12B and 16A.

Referring to FIGS. 16A and 16B, a packer arrangement is described that is compatible with any first bracket 12 or second bracket 32 herein described.

The bracket 12, 32 fits any track 202 having a thickness than is smaller than the height mouth 20, 40, i.e. the distance between the top flange 14, 34 and the bottom flange 16, 36. However, the brackets 12, 32 are ideally fitted in a flush arrangement around the edges 204, 206 of the track 202 to minimise the space between the track and the inner surfaces of the top flange 12, 34 and the bottom flange 16, 36. However, tracks thickness may vary and wear on rubber tracks may reduce the thickness.

A packer plate 94 is optionally positionable within the mouth 20, 40 to reduce the size of the distance between the top flange 14, 34 and the bottom flange 16, 36. The packer plate 94 is shaped to be a similar size to an inside surface of the bottom flange 16, 36. Therefore, the packer plate 94 is rectangular. The packer plate 94 has a thickness to reduce the opening of the mouth 20, 40.

A packer disk 96 is also optionally positionable within the mouth 20, 40 to reduce the size of the distance between the top flange 14, 34 and the bottom flange 16, 36. The packer disk 96 is shaped to be smaller than the inside surface of the bottom flange 16, 36. Two packer disks 96 are placed side by side on the bottom flange 16, 36. The packer disks 96 have a thickness and therefore reduce the size of the mouth 20, 40.

The packer disks 96 and packer plate 94 are compatible with each other. The disks 96 are like washers to reduce the size of the mouth 20, 40 and the packer plate 94 provides a surface to face the bottom of the track 202. Therefore, the packer disks 96 are arranged between the inner surface of the bottom flange 16, 36 and the packer plate 94. Multiple packer disks 96 or packer plates 94 are used for varying thicknesses for different track sizes 202. However, this allows the same brackets 12, 32 to be used.

The bottom flange 16, 36 has bolt holes 92 arranged therein to allow a bolt or screw or rod to pass from the outside to the inside of the bottom flange 16, 36. The packer disks 96 likewise have through-holes, arranged centrally, and the packer disks 96 are arranged to these holes are aligned with each the bolt holes 92. Threaded bolts 98 are used to hold the packer disks 96 in position by passing through the bolt hole 92 and the holes in the packer disks 96. The head of the bolt is positioned on the outside of the bottom flange 16, 36. To hole the bolts 98 in position, the packer plate 94 has threaded bolt holes 95. These threaded bolt holes 95 are arranged to align with the bottom flange bolt holes 92 when the packer plate 94 is in position in the mouth 20, 40. The bolts 98 pass through the bolt holes 92 through the holes in the packer disks 96 and screw into the threaded bolt holes 95 of the packer plate 94.

The bolts 98 are adjustable as to finish flush with the top surface of the packer plate 94 by having a nut on the bolts 98 that is the same thickness as the packer disks 96. Therefore, the nuts are added or removed as packer disks 96 are removed or added, i.e. in a compensatory manner.

Different shaped disks 96 or plates 94 are used as required. Likewise, the holding features of the bolts 98 are optionally used. Additional bolt holes 92 or fewer bolts holes 92 are utilized depending on requirements. The packer arrangement is also positionable on a top flange 14, 34 in some situations.

Figure 17A:
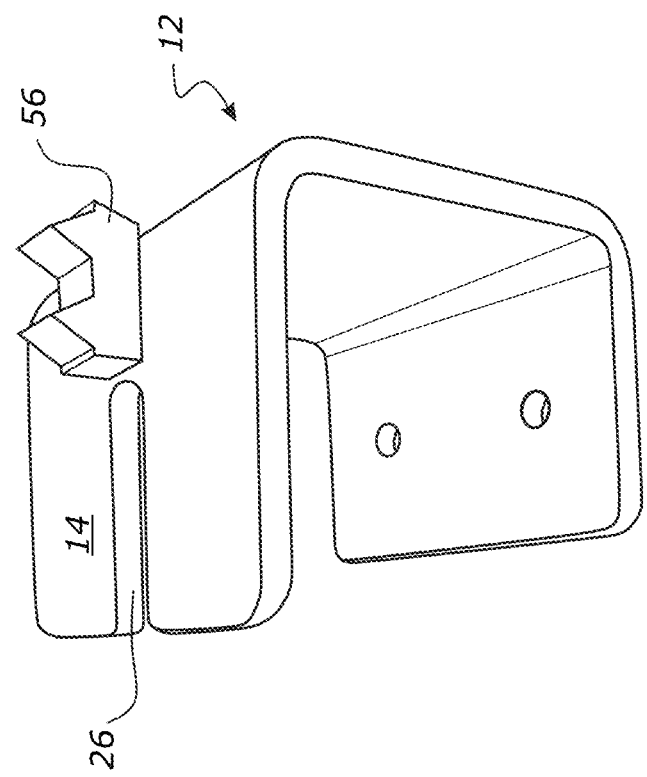
FIGS. 17A and 17B are alternative brackets of FIG. 1.
Figure 17B:
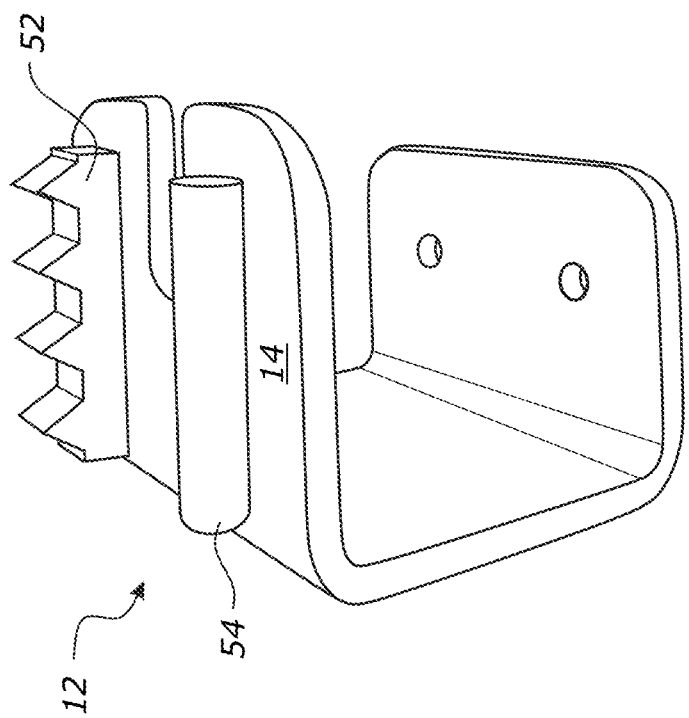

Referring to FIGS. 17A and 17B, an enhanced traction arrangement is described that is compatible with any first bracket 12 or second bracket 32 herein described.

With reference to FIG. 17A, a protrusion 52, 54 is attached on an upper side of the top flange 14, 34, where the protrusion 52, 54 is used to enhance traction or grip. In one configuration, the protrusion 52, 54 is shaped to have a jagged profile, such as jagged teeth, when viewed from the side. The jagged grip 52 is positioned running from an open side 22, 42 to closed side 24, 44 direction and is on one side of the top flange 14, 34, that is to say that where there is a cut-out 26, the jagged grip 52 is on one side of it, i.e. parallel but off-set. On the other side is one of the protrusions 54 shaped as a cylinder. This cylinder grip 54 likewise runs from an open side 22, 42 to closed side 24, 44 direction and is on the other side of the top flange 14, 34 to the jagged grip 52, that is to say that where there is a cut-out 26, the cylinder grip 54 is on one side of it. The cylinder has a smooth surface so is also a smooth grip 54. With the two types of jagged and smooth side grips 52, 54, traction will be enhanced. This is useful where the connection member 70, 71 is positioned below the top flange 14, 34 and thus the part of traction given by the elongate member 80 is reduced in this part.

With reference to FIG. 17B, a protrusion 56 is attached on an upper side of the top flange 14, 34. The protrusion 56 is shaped to have a jagged profile such as jagged teeth, when viewed from the side. The jagged grip 56 is positioned running from an open side 22, 42 to closed side 24, 44 direction and is positioned centrally on the top flange 14, 34, that is to say that where there is a cut-out 26, the jagged grip 56 is parallel and on the same line. Therefore, the jagged grip 56 is positioned in the portions where the cut-out 26 finishes. This means that such a central jagged grip 56 is generally shorter in length than the other two types of jagged and smooth side grips 52, 54. However, traction is still enhanced.

As will be appreciated, the grips 52, 54, 56 are interchangeable and different profiles or shapes may be used.

The grips 52, 54, 56 extend no further in a height direction, i.e. normal to the surface of the track 202, than the elongate member 80. Therefore, there is a similar level of traction provided.

In use of the device 10, the mouth 20 of the first bracket 12 is positioned around the edge 204 of the track 202. The mouth 40 of the second bracket 32 is positioned around an opposing edge 206 of the track 202. If there are recesses 208 in the track, the brackets 12, 32 are able to be placed in those. An elongate member 80 is connected to each bracket 12, 32. The second bracket 32 is connected to the elongate member by the connection member 70. This will be a number of options as described, such as shackle 50 or a hook 72. It does not need to be the end of the elongate member 80 that is connected to the second bracket 32 but rather the second end 86 of a portion 88 of the elongate member 80—which may also be the end of the elongate member 80. The other end 84 of the elongate member 80 (or portion 88) is connected to the first bracket 12. The connection is via any of the features described above, such as a shackle 66, a threaded bar attached 62 to a first end 84 of a portion 88 of the elongate member 80 or by a connection member 71 having a hook 72', 72". The elongate member 80 is positioned according to various hook portions 77, 78 and/or chain links to provide a relatively tight fit across the width of the track 202. The connection of the first bracket 12 is to an adjustment mechanism 100 that allows for further tightening of the elongate member 80. The adjustment mechanism 100 is used to vary the distance between the first end 84 of the elongate member 80 and the bracket 12 therefore the elongate member 80 is tightened to increase the tension in the elongate member 80 and therefore on the brackets 12, 32 acting on the edges of the track 202. The adjustment is made by rotation of the threaded bolt 62 or threaded bar 62 either by a nut 104 or a head 104 of the bolt 62 that screws the bolt 62 thereby varying the distance and thus tension in the elongate member 80. The device 10 therefore provides additional traction for the tracked vehicle 200 by the elongate member 80 being arranged across the width of the track 202 and being held rigidly by the tension exerted thereon by the brackets 12, 32.

Figure 18:
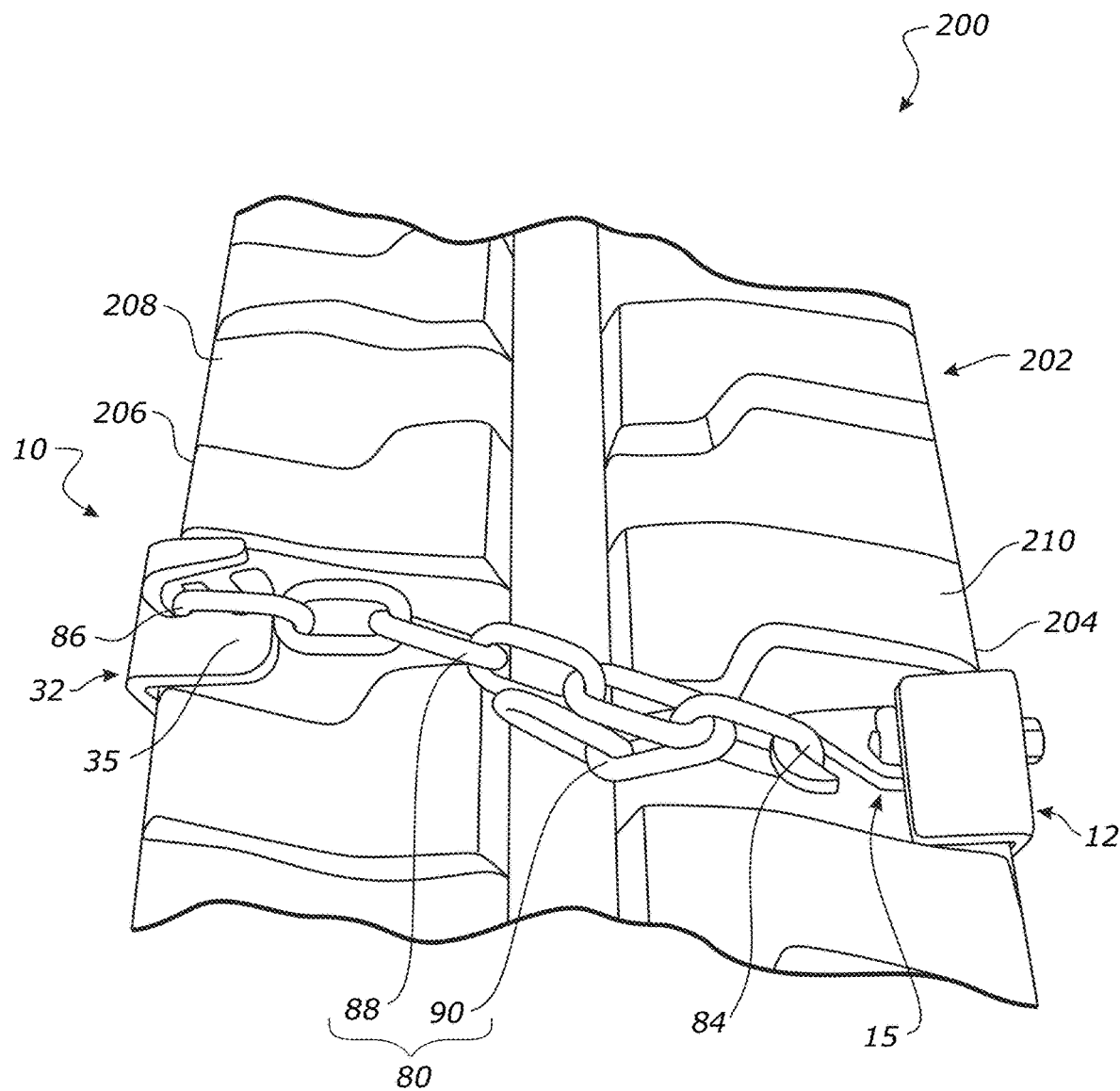
FIG. 18 is a perspective view of a further embodiment of the device for use with a continuous track of a tracked vehicle.

With reference to FIG. 18, there is shown an embodiment of a traction device 10 in use on a tracked vehicle 200. Unless described below, the features, functionality, and alternatives are the same as for the device 10 and brackets of FIGS. 1 to 17, and like reference numerals are used to indicate like parts.

As shown in FIG. 18, the device 10 has a first bracket 12 and a second bracket 32 connected by an elongate member 80 extending therebetween. The elongate member 80 is connected at a first connection location 84 to the first bracket 12 by an adjustor 15. The elongate member is connected at a second connection location 86 to the second bracket 32 by a connector 35. The first connection location 84 and second connection location 86 are at opposite ends of the elongate member 80. However, in some configurations the first connection location 84 and second connection location 86 define a portion of the elongate member 80.

As hereinbefore described, in use the first bracket 12 is positioned at a first edge 204 of the track 202 of the tracked vehicle 200, and the second bracket 32 is positioned at a second edge 206 of the track 202 of the tracked vehicle 200. The first edge 204 of the track 202 is engaged by a first edge engaging surface 18 of the first bracket 12. The second edge 206 of the track 202 is engaged with a second edge engaging surface 38 of the second bracket 32. The first edge engaging surface 18 and second edge engaging surface 38 may be the webs 18, 38 as previously described with reference to earlier embodiments.

The first bracket 12 and second bracket 32 are positioned in recesses 208 of the track 202, where the recesses are formed between raised portions 210 in the track 202. In some embodiments, the track 202 does not have recesses 208 and raised portions 210 for receiving the brackets 12, 32.

Figure 19:
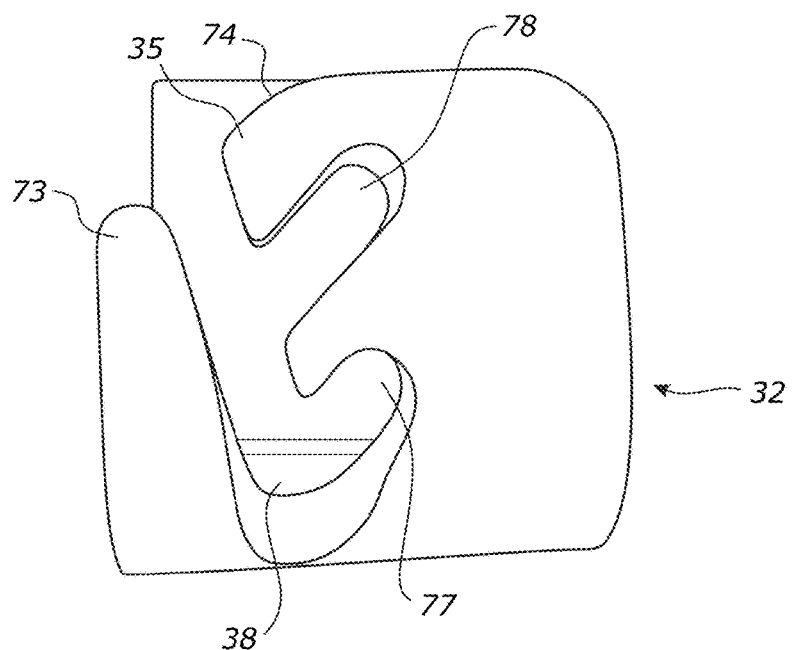
FIGS. 19 to 21 are plan views of a bracket of FIG. 18.
Figure 20:
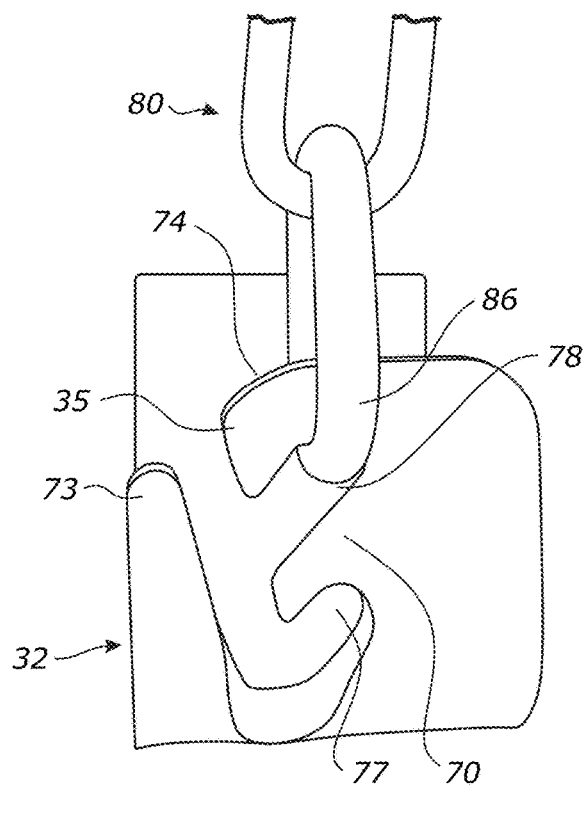
Figure 21:
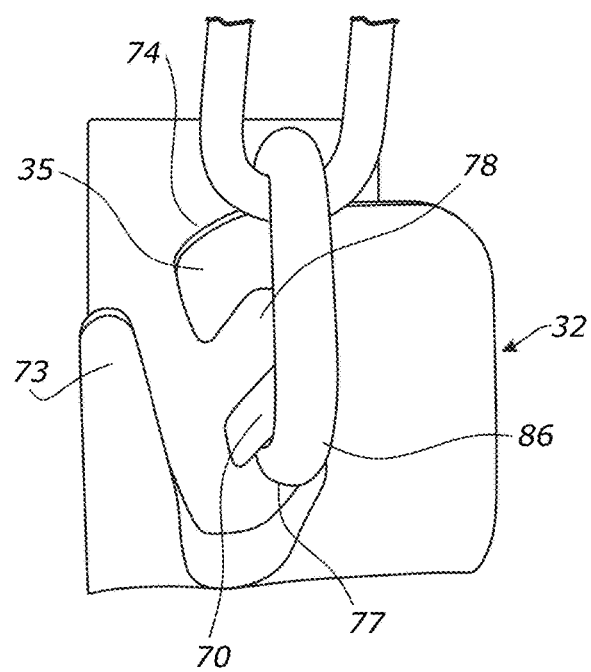

Referring to FIGS. 19 to 21, an embodiment of the second bracket 32 of FIG. 18 is shown. The second bracket 32 connects to the elongate member 80 via a connector 35 that engages with the second connection location 86 of the elongate member 80. The connector 35 may be formed in the top flange 34 of the second bracket 32 as hereinbefore described or it may be formed separately.

The connector 35 has a connection member 70 that is the interface between the connector 35 and the second connection location 86. The connection member 70 is formed of hooks 77, 78 to engage with the second connection location 86. A first hook 77 and second hook 78 provides connections to the second connection location 86 that differ in distance from the second edge engaging surface 38. Therefore, a coarse variation in the location of the elongate member 80 is provided depending on which hook 77, 78 is used. This is beneficial to ensure that the elongate member 80 is easily positionable between the first bracket 12 and second bracket 32 whilst reducing any slack. The adjustor 15 is then usable to take up remaining slack and apply tension to the elongate member 80.

The first hook 77 is closer to the second edge engaging surface 38 than the second hook 78. Therefore, as shown in the FIG. 21, when the second connection location 86 is engaged in this first hook 77 position, the distance between a first bracket 12 and a second bracket 32 for a given elongate member 80 length is shorter than when engaged with the second hook 78. FIG. 20 shows the engagement between the second connection location 86 and the second first hook 78. In this configuration, the distance between a first bracket 12 and a second bracket 32 for a given elongate member 80 length is longer than when engaged with the first hook 77. The hooks 77, 78 are positioned and sized to allow the elongate member 80 to be able to engage the first hook 77 over the second hook 78. In the case of a chain 80 for the elongate member 80, as previously described, an individual chain link 82 may extend over the second hook 78 in such a configuration.

A radiused hook edge 74 is provided on the face of the second hook 78 that faces the elongate member 80 and the opposing first bracket 12. The radius allows the elongate member 80 to pivot as the brackets 12, 32 may not be parallel across a width of a track 202 and therefore, the elongate member 80 may extend at a relative angle from the second bracket 32 toward the first bracket 12.

The mouths of the hooks 77, 78 face away from the direction of the elongate member 80. This direction is substantially toward the second engaging surface 38, or at an angle between the direction toward the second engaging surface 38 and perpendicular to this direction (i.e. along the length of the track 202 when engaged). This ensures that the tension applied to the second bracket 32 is in a direction away from the mouths of the hooks 77, 78 to hold the second connection location 86 in position within the hooks 77, 78.

The second connection member 70 also has a retaining arm 73 that extends across the mouths of each hook 77, 78. The retaining arm 73 extends from the second engaging surface 38 and reduces the size of the mouth of the hooks 77, 78 through which the second connection location 86 passes. This not only provides strength to the connector 35, but also reduces any accidental disengagement of the second connection location 86 and the hooks 77, 78. The retaining arm 73 may be sized to only allow the second connection location 86 to be oriented in a certain manner for engagement with the hooks 77, 78. This feature is described in more detail with reference to FIG. 36.

Figure 22:
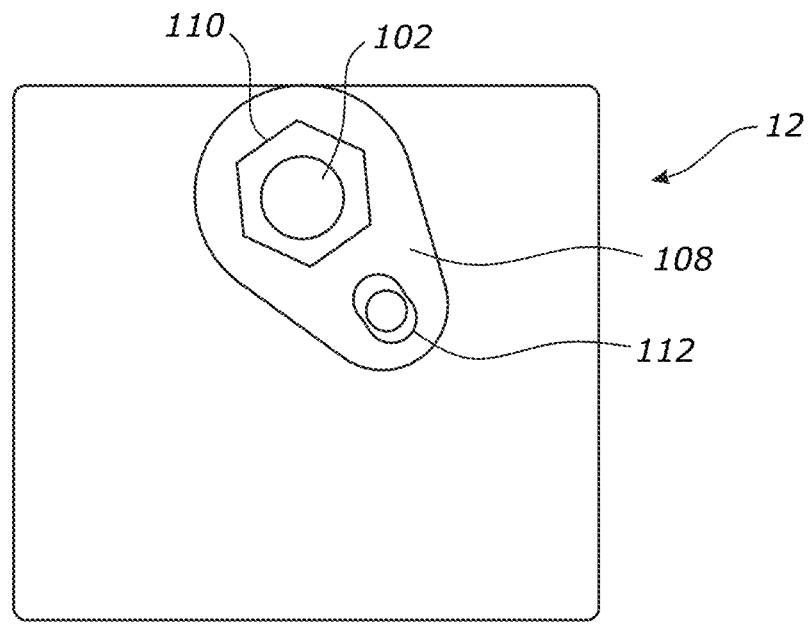
FIGS. 22 and 23 are end-on views of a bracket of FIG. 18.
Figure 23:
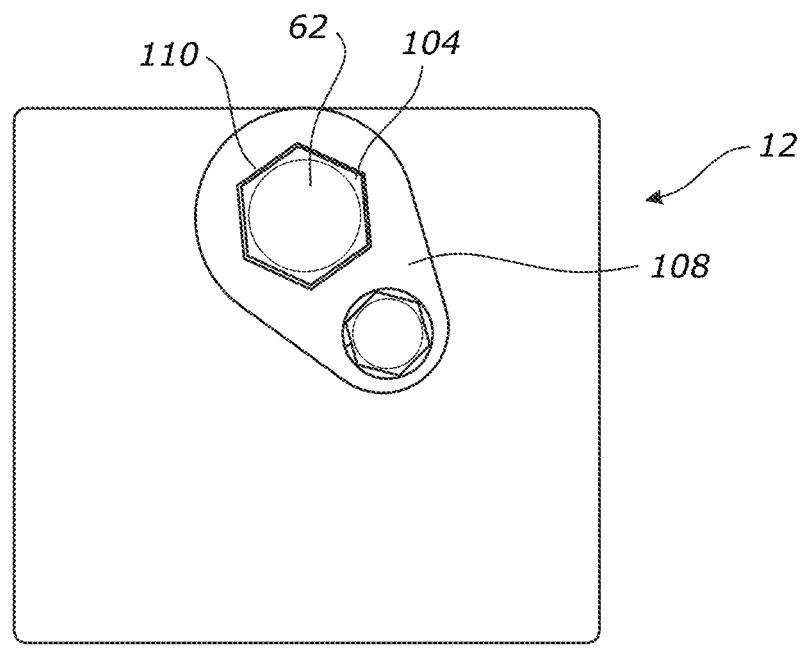

Referring to FIGS. 22 and 23, a first bracket 12 is shown. The first bracket 12 is engageable with a distance varying part 62, such as a threaded bar or member 62 as described in reference to earlier embodiments such as those shown in FIGS. 14A, 14B and 14C. The bracket 12 has a receiving member 102 formed through the first edge engaging surface 18 (or web 18) to allow the threaded member 62 to pass therethrough. A bolt head 104 or threaded nut 104 is attached or attachable to the end of the threaded member 62 to allow the rotation or securing of the threaded member 62 to adjust the distance between the first bracket 12 and the elongate member 80.

A locking tab 108 is provided to prevent rotation of the bolt head 104 or threaded nut 104 when engaged. The locking tab 108 has thickness and a sleeve 110 formed therethrough as a through-hole to allow a threaded member 62 and the associated bolt head 104 or threaded nut 104 to pass through. The sleeve 110 is shaped to correspond to the shape of the bolt head 104 or threaded nut 104 such that the bolt head 104 or threaded nut 104 will only pass through in one orientation. For instance, a hex head bolt or nut 104 will have a similar hexagonal shaped sleeve 110 formed as a hole in the locking tab 108. Therefore, the rotation of the bolt head 104 or threaded nut 104 when engaged in the sleeve 110 of the locking tab 108 will likewise require the rotation of the locking tab 108. The locking tab 108 is secured in position on the bracket 12 to prevent rotation. Therefore, when engaged, the bolt head 104 or threaded nut 104 is prevented from rotation by the secured locking tab 108. This prevents the loosening of the bolt head 104 or threaded nut 104 when in use, such as through vibrations in the tracked vehicle 200. The locking tab 108 also allows the locking of the bolt head 104 or threaded nut 104 in position without the damaging or welding of the bolt head 104 or threaded nut 104. This allows adjustment of the threaded member 62 at a later time.

The locking tab 108 is secured in position by an anti-rotation cut-out 112 formed in the locking tab 108. The anti-rotation cut-out 112 is positioned adjacent to the sleeve 110 and aligns with a hole (which may be threaded) in the first bracket 12. When aligned, a screw or other locking member is placed through the aligned anti-rotation cut-out 112 and stops the locking tab 108 from rotating due to it being restrained at two points on the bracket 12.

In use the device 10 is adjusted by rotating the threaded member 62 via the bolt head 104 or threaded nut 104. The locking tab 108 is then placed over the bolt head 104 or threaded nut 104 by aligning the corresponding shapes of the sleeve 110. The locking tab 108 is ideally placed so that the anti-rotation cut-out 112 of the locking tab 108 is closely aligned with a corresponding hole in the bracket 12. Minor further rotation of the bolt head 104 or threaded nut 104 and thus locking tab 108 may be required to align the anti-rotation cut-out 112. A bolt is then placed through the anti-rotation cut-out 112 into the hole in the bracket 12, to lock the locking tab 108 to prevent rotation.

The locking tab 108 may be positioned on the inside of the bracket 12, i.e., on the first edge engaging surface 18 or, as shown in FIGS. 22 and 23, on the outer side of the bracket 12 on the opposing surface to the first edge engaging surface 18 (i.e. the other side of the web). By positioning the locking tab 108 on the outer surface, it is easier to access for locking the bolt head 104 or threaded nut 104.

Whilst the locking tab 108 has been described with reference to the first bracket 12, a locking tab 108 may be used with a second bracket 32 or a connector 35.

Figure 24:
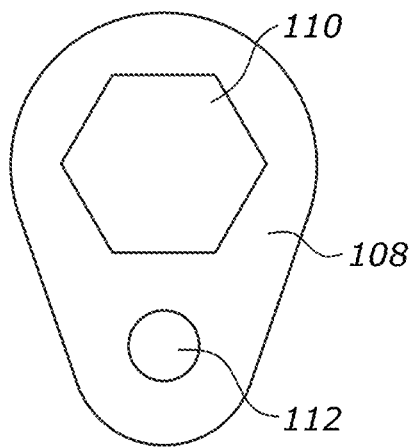
FIGS. 24 to 26 are plan views of locking sleeves of the brackets of FIGS. 22 and 23.
Figure 25:
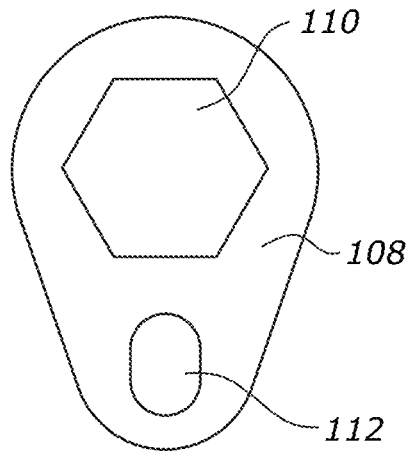
Figure 26:
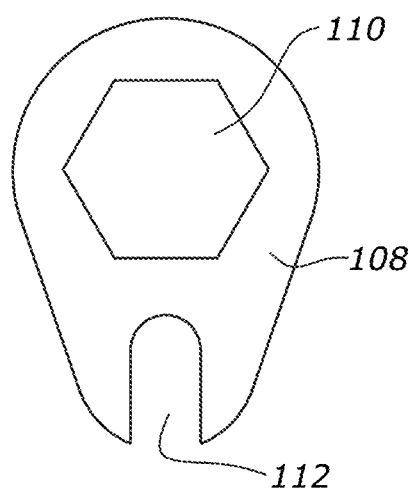

FIGS. 24 to 26 show variations in the of the anti-rotation cut-out 112 in the locking tab 108. In FIG. 24, the anti-rotation cut-out 112 is a through hole that is circular. Therefore, the anti-rotation cut-out 112 is required to align concentrically with the hole in the bracket 12. Alternatively, the anti-rotation cut-out 112 may be sized larger than the hole in the bracket 12 to assist with alignment. However, it is preferred to limit the movement of the locking tab 108 when installed to minimise rotation and vibration.

FIG. 25 shows an anti-rotation cut-out 112 that is a through-hole elongate in a direction along a line aligned with the centre of the sleeve 110. The elongate anti-rotation cut-out 112 provides a tolerance for alignment along its length. Therefore, variations in hole position in the bracket 12 are compensated for, or variations in the location of the receiving member 102 for the threaded member 62 are compensated for. The shape ensures that rotation of the locking tab 108 when installed is minimised whilst still providing the flexibility.

FIG. 26 shows an anti-rotation cut-out 112 where the anti-rotation cut-out 112 passes through a perimeter of the locking tab 108. Therefore, the anti-rotation cut-out 112 is not enclosed. The direction of the cut-out in the perimeter of the locking tab 108 is the same as the direction of the elongate anti-rotation cut-out 112 described with reference to FIG. 25. Therefore, the cut-out in the perimeter extends along a line passing through the centres of both the sleeve 110 and anti-rotation cut-out 112. The anti-rotation cut-out 112 is elongate in this manner also.

The shape of the locking tab 108 in each of FIGS. 24 to 26 is cam or substantially egg shaped, i.e. such that there is a circular perimeter around the sleeve 110 and having and extended portion forming a smaller radiused circular perimeter around the anti-rotation cut-out 112.

Figure 27:
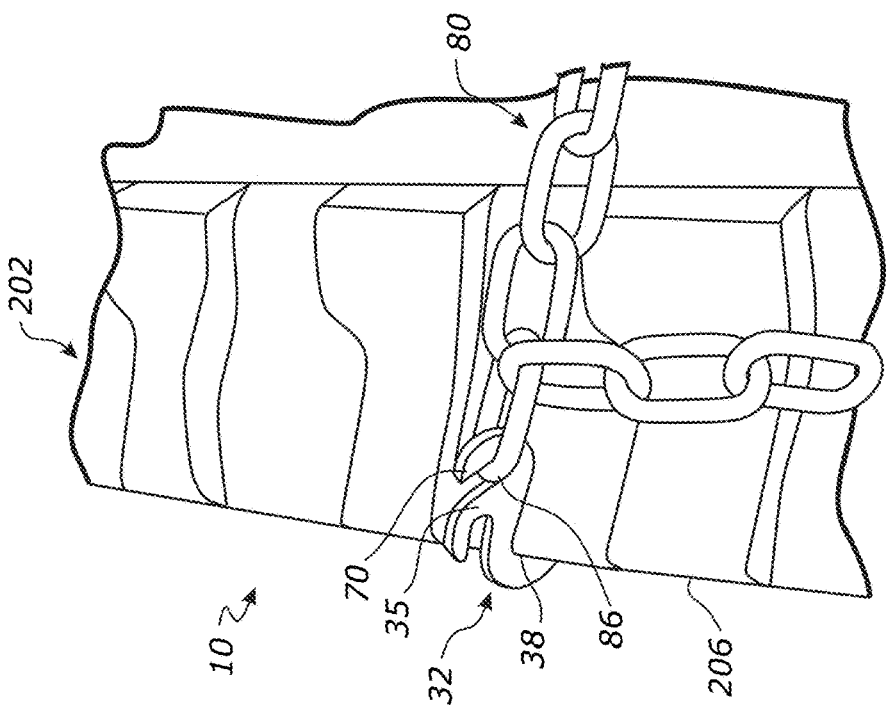
FIG. 27 is a perspective segmented view of an embodiment of the device with alternative bracket from FIGS. 1 to 26.

Referring to FIG. 27, there is shown an embodiment of a traction device 10 in use on a track 202. In this view, the second edge 206 is shown and the first edge 204 is omitted. However, the elongate member 80 may be connected to any first bracket 12 as described throughout this document.

The second bracket 32 of the device 10 engages with the second edge 206 of the track 202 at its second edge engaging surface 38. The connector 35 comprises a connection member 70 for removably engaging with the second connection location 86 of the elongate member 80. The second bracket 32 of this embodiment is further described with reference to FIGS. 29 to 31 as follows.

When viewed from the side, a bottom arm 36 extends from the second edge engaging surface 38 in the direction of the track 202, i.e. perpendicular to the vertically extending second edge engaging surface 38 such that the bottom arm 36 is positioned adjacent to a bottom surface of the track 202. The bottom arm 36 is similar to the bottom flange 36 as described elsewhere and the terms may be used interchangeably. The connector 35 of the second bracket 32 likewise extends from the second edge engaging surface 38 in the direction of the track 202, i.e. perpendicular to the vertically extending second edge engaging surface 38 such that the connector 35 is positioned adjacent to a top surface of the track 202. In this manner, the connector 35 may form a similar function to the top flange 34 as described elsewhere and the terms may be used interchangeably where the functions are the same. Therefore, the bottom arm, 36, second edge engaging surface 38 and connector 35 form an engaging arrangement around the bottom, second edge 206 and top surface of the track 202 respectively. The engaging arrangement may also be a mouth portion 40 as described elsewhere.

In some embodiments a connector 35 and a top flange 34 are both present.

The connector 35 of the second bracket 32 comprises the connection member 70 for connecting to the elongate member 80. Whilst hooks 77, 78 are used as described elsewhere, the bodies of the hooks 77, 78 are arranged to extend vertically (when the bracket 32 is viewed from the side) instead of being in the plane of the top flange 34. Therefore, the connection member 70 (and hooks 77, 78) is formed in the same plane as the bottom arm 36 and connector 35.

The arrangement of vertically extending hooks 77, 78 allows the second bracket 32 to be formed from a plate material and the profile cut in a plan view on the plate. Therefore, there is no cutting required in the depth direction of the plate of the second bracket 32 and the depth direction is defined by the thickness of the plate only.

The second bracket 32 of FIG. 29 has the first hook 77 arranged to position the elongate member 80 closer to the second edge engaging surface 38 when engaged than the second hook 78. The first hook 77 has its opening in a direction extending away from the track 202, i.e. toward the second edge engaging surface 38. The second hook 78 has its opening in a direction between the rearward direction (like that of the first hook 77) and the vertical direction. More specifically, the second hook is arranged at an angle of approximately 45 degrees from the horizontal. This allows an elongate member 80 to be connected over the hooks 77, 78 from a vertical direction. As described elsewhere, the front of the body of the second hook 78 that faces across the track 202 when in use has a radiused hook edge 74 to allow: the installation of the elongate member 80; the movement of the elongate member 80; and the use of the first hook 77, all whilst the elongate member spans over the second hook 78.

The second bracket 32 of FIG. 30 has a similar arrangement for the second hook 78 as the bracket of FIG. 29. However, the first hook 77 has a wider mouth opening with one border extending in the same direction as the opening of the second hook 78 and the second border extending in a direction away from the track 202, i.e. toward the second edge engaging surface 38. Therefore, the first hook 77 has a mouth opening effectively spanning an approximate 45 degree angle vertically from the horizontal (when viewed from the side). This provides a shape that is easier to form and is relatively strong as the hook portion is thicker.

The second hook 78 has its opening in a direction between the rearward direction (like that of the first hook 77) and the vertical direction. More specifically, the second hook is arranged at an angle of approximately 45 degrees from the horizontal. This allows an elongate member 80 to be connected over the hooks 77, 78 from a vertical direction. As described elsewhere, the front of the body of the second hook 78 that faces across the track 202 when in use has a radiused hook edge 74 to allow the installation of the elongate member 80, the movement of the elongate member 80 and the use of the first hook 77 whilst the elongate member spans over the second hook 78.

The second bracket 32 of FIG. 31 has a similar arrangement for the second hook 78 as the bracket of FIG. 29 or FIG. 30. However, the first hook 77 is not present. Therefore, the second bracket has a single hook 72 that extends vertically. As there is no first hook 77, the mouth of the single hook 72 is wider as the body of the first hook 77 is not present to provide a channel of the mouth of the individual hook 72. The individual hook 72 has a mouth opening with one border extending in the same direction as the opening of the second hook 78 as described above and the second border extending in a direction away from the track 202, i.e. toward the second edge engaging surface 38. Therefore, the individual hook 72 has a mouth opening effectively spanning an approximate 45 degree angle vertically from the horizontal (when viewed from the side). This results in the second bracket 32 having an effective backwards 'S' shape when viewed from the side. This provides a shape that is easier to form. It also allows the depth of the second bracket 32 to be extended as the part may be formed from a plate and bent along lines extending in the depth direction.

In the embodiment of FIGS. 27, 29, 30 and 31, the second bracket 32 is formed as a unitary piece from a single piece of material. Generally, the material is metal, such as steel, that is either cut into shape or bent into shape depending on the required shape. However, in some embodiments, multiple parts may be used to form the second bracket 32 and are joined by welding, sintering or other mental joining techniques, or may be fastened together by fasteners, such as screws.

Figure 28:
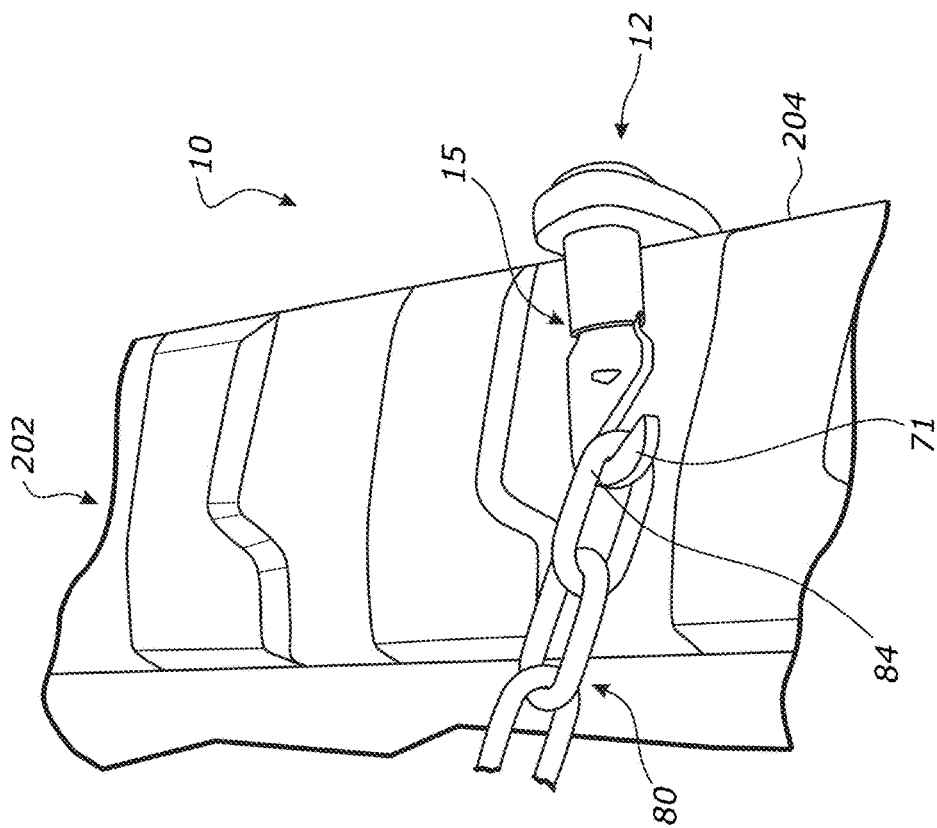
FIG. 28 is a perspective segmented view of an embodiment of the device with alternative bracket from FIGS. 1 to 27.

Referring to FIG. 28, there is shown an embodiment of a traction device 10 in use on a track 202. In this view, the first edge 204 is shown and the second edge 206 is omitted. However, the omitted part of the elongate member 80 is connected to any second bracket 32 as described throughout this document.

The first bracket 12 of the device 10 engages with the first edge 204 of the track 202 at its first edge engaging surface 18. The adjustor 15 comprises a connection member 71 for removably engaging with the first connection location 84 of the elongate member 80. The first bracket 12 of this embodiment is further described with reference to FIGS. 32 and 33 as follows.

When viewed from the side, a bottom arm 16 extends from the first edge engaging surface 18 in the direction of the track 202, i.e. perpendicular to the vertically extending first edge engaging surface 18 such that the bottom arm 16 is positioned adjacent to a bottom surface of the track 202. The bottom arm 16 is similar to the bottom flange 16 as described elsewhere and the terms may be used interchangeably. The adjustor 15 of the first bracket 12 likewise extends from the first edge engaging surface 18 in the direction of the track 202, i.e. perpendicular to the vertically extending first edge engaging surface 18 such that the adjustor 15 is positioned adjacent to a top surface of the track 202. The adjustor 15 may provide a similar function to the top flange 14 as described elsewhere and the terms may be used interchangeably where the functions are the same. Alternatively, a top flange 14 may additionally be provided above the adjustor 15 or below the adjustor 15. However, in the embodiment of FIGS. 28, 32 and 33, the bottom arm 16, first edge engaging surface 18 and adjustor 15 form an engaging arrangement around the bottom, first edge 204 and top surface of the track 202 respectively. The engaging arrangement may also be a mouth portion 20 as described elsewhere.

Figure 32:
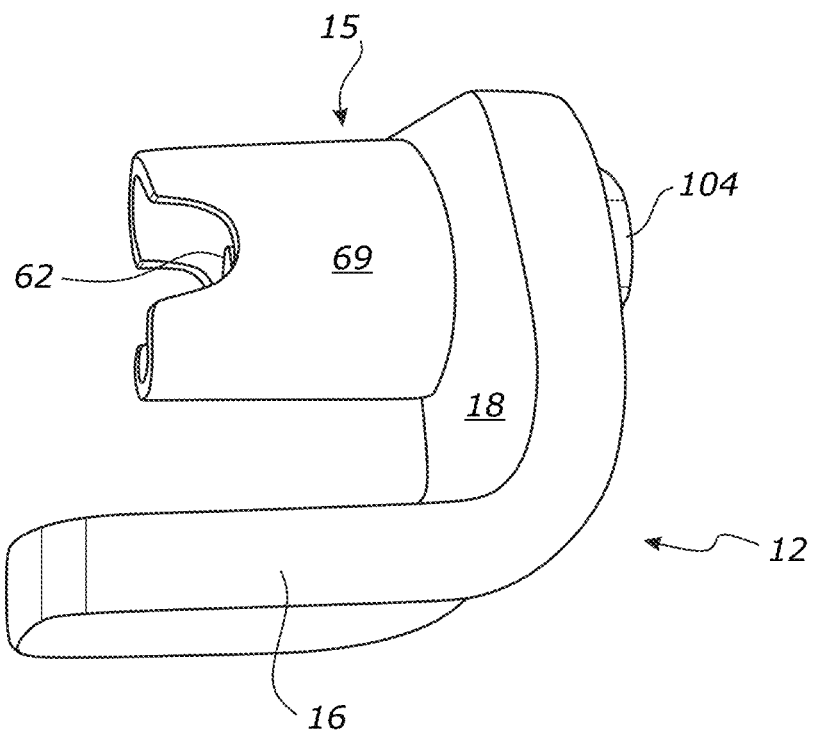
FIG. 32 is a perspective side view of the bracket of FIG. 28.

The adjustor 15 of FIG. 32 has a threaded member 62 that extends through the receiving member 102 in the first edge engaging surface 18—the receiving member 102 is a through-hole in the first edge engaging surface 18 in this embodiment. The bolt head or threaded nut 104 is positioned on the other side of the receiving member 102. The threaded member 62 is surrounded by a bush 69 that is a cylinder that extends from first edge engaging surface 18 in the same direction as the threaded member 62. The bush 69 and the threaded member 62 are coaxial. The bush 69 surrounds the threaded member 62 and provides protection for the member 62. The bush 69 internal diameter is larger than the outer diameter of the threaded member 62 such that there is a concentric space around the threaded member 62 when positioned within the bush 69. The concentric space may be used for accommodating a corresponding collar 79 of a connection member 70, 71 as described elsewhere in this document.

The bush 69 provides a similar function to the receiving member 102 as described in earlier embodiments, such as FIG. 16B. Therefore, the terms may be used interchangeably. However, in the embodiment of FIGS. 28 and 32 the bush 69 and receiving member 102 are formed separated and the bush 69 surrounds the receiving member 102 hole formed in the first edge engaging surface 18.

Figure 33:
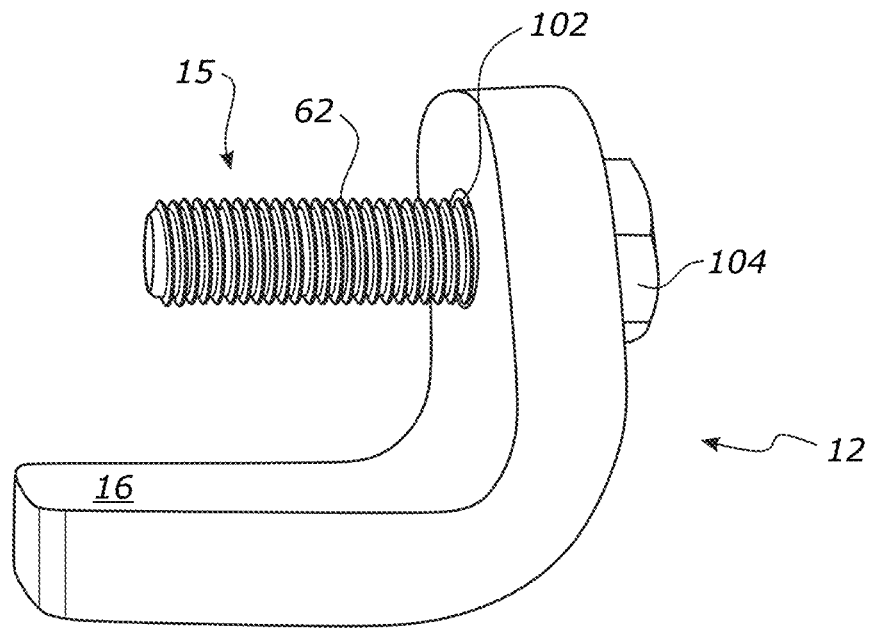
FIG. 33 is a perspective side view of the bracket of FIG. 32, or an alternative bracket to FIG. 32.

Referring to FIG. 33, a first bracket 12 as described with reference to FIG. 32 is shown. However, the bush 69 is not present in this embodiment. Instead, the threaded member 62 is effectively exposed. The threaded member 62 may be received in a collar 79 of a connection member 70, 71 in use as described elsewhere.

In the embodiment of FIGS. 28, 32 and 33, the bottom arm 16 and first edge engaging surface 18 are formed as a unitary part. Therefore, they form an effective 'L' shape. They may be formed from a single plate and bent into shape. Alternatively, separate parts may be joined together by fastening or joining techniques. The adjustor 15, either with the bush 69 or without, extends from the first edge engaging surface 18 to form the top surface for engaging with the track 202. The first bracket 12 is generally formed from a rigid material, such as metal. Various types of metals are available, such as an alloy, e.g. steel, or a pure metal such as aluminium or iron. The bush 69 is connected to the first edge engaging surface 18 by welding or by other mental joinery techniques that would be known in the art. Alternatively, the bush 69 may be loose and is held in position by other components of the adjustor 15 such as the connecting member 70, 71.

Figure 34:
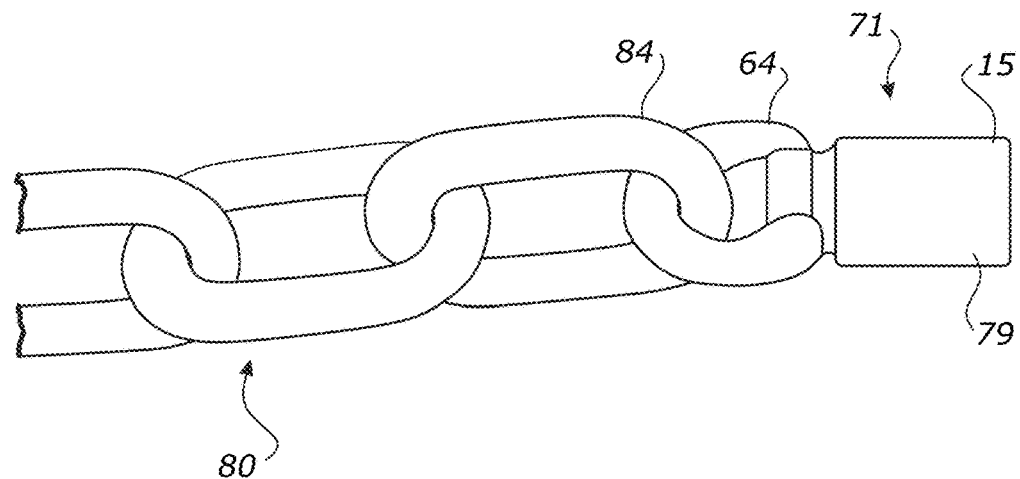
FIG. 34 is a side view of the elongate member for use with the device of the Figures in some configurations.

Referring to FIG. 34, there is shown an embodiment the elongate member 80. When describing the elongate member 80 in this embodiment, the first connection location 84 or second connection location 86 may be referred to. However, for the purposes of explanation only, reference is only to the first connection location and the first bracket 12.

The elongate member 80 connects to an adjustor 15 of a first bracket 12 at its first connection location 84. In the case of a chain for an elongate member 80, the first (and second) connection location 84 refers to the last intact chain link. The connection member 71 of the adjustor 15 comprises a collar 79 connected to a ring 64. The first connection location 84 is connected to the ring 64. In the case of a chain 80, the chain link is linked to the ring 64. The collar 79 is connectable to the first bracket 12 in a number of ways. One such example is by having a thread inside the collar 79 wherein the threaded member 62 is screwed into the collar 79.

Alternatively, the collar 79 may be joined to the bracket, such as in the case of a second bracket 32 that does not require any adjustable mechanism.

In FIG. 34, the ring 64 is permanently connected to the first connection location 84. However, in some embodiments, a removeable eyelet 64 may be utilized to allow removal of the connection member 71 from the elongate member 80. This may be useful to allow the elongate member 80 to attach to different types of brackets 12, 32.

Figure 35:
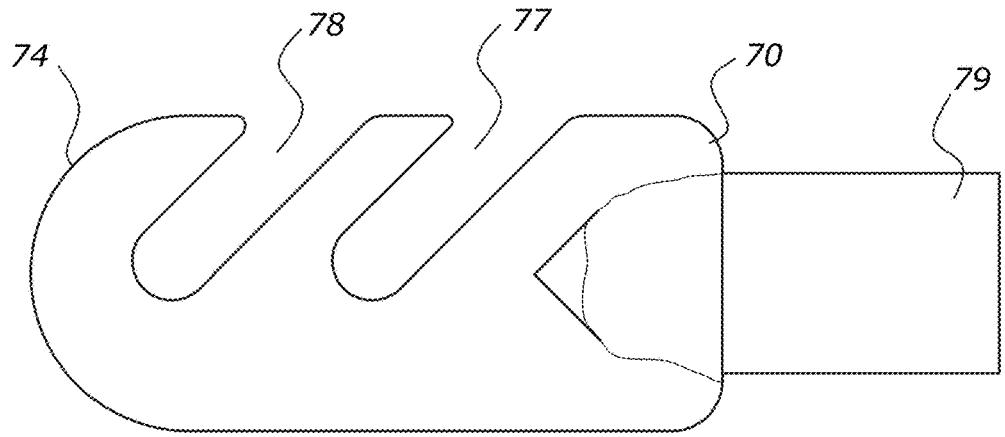
FIG. 35 is a side view of a connecting member for use with the device of the Figures in some configurations.

In FIG. 35, an embodiment of a connection member 70, 71 is shown. The connection member 70, 71 may be for an adjustor 15 or connector 35. However, for the purposes of explanation, reference will be made to the connector 35 for the second bracket 32.

The connection member 70 has first and second hooks 77, 78 similar to those as described with reference to FIG. 11A. The collar 79 is connected to the hook part of the connection member 70. The collar 79 allows for connection to a threaded member 62 or connected directed to a bracket 12, 32. The collar 79 is connected to the body of the connection member 70 by welding. However, other methods of joinery may be used.

Figure 36:
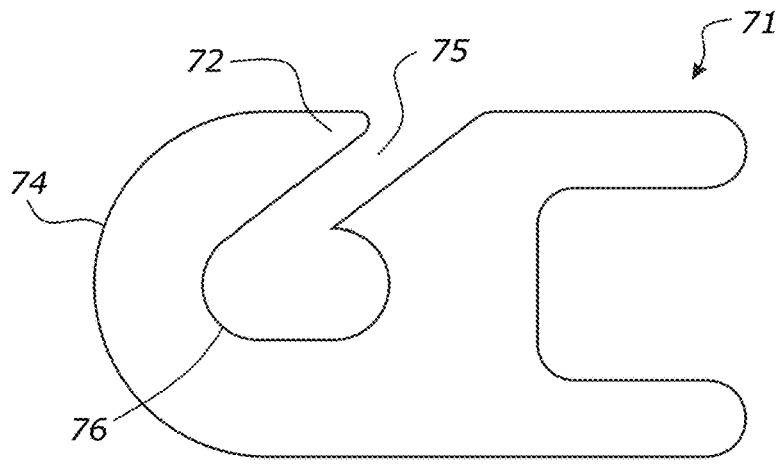
FIG. 36 is a side view of a connecting member for use with the device of the Figures in some configurations.

Referring to FIG. 36 an alternative body of a connection member 70, 71 is shown. As with the embodiment shown in FIG. 35, for instance, this is connectable to a collar 79, such as via welding, for connection to a connector 35 or adjustor 15 as appropriate. The connection member 70, 71 has a single hook 72. The hook 72 has a mouth portion 75 for allowing an elongate member 80 to removably attach into the engaging section 76 where the elongate member 80 is positioned when engaged. The mouth portion 75 is angled in a direction opposite to the force of the elongate member 80 when engaged. Therefore, the mouth portion 75 is an opening to form a hook at approximately a 45 degree angle from the horizontal in the bracket 12, 32 direction to which it is directly connected.

The mouth portion 75 is narrower than the engaging section 76 for the connection member 70, 71. Therefore, the connecting location 84, 86 of the elongate member 80 must be oriented in a particular direction to allow entry through the mouth portion 75 which is a different orientation that when the elongate member 80 is engaged across a track 202. This reduces the likelihood of the elongate member 80 accidentally being disengaged from the hook 72. When the elongate member 80 is a chain, a cross section of a body of a chain link is narrower in a width direction than a height direction. Therefore, the mouth portion 75 is sized to only allow the chain link to pass through in the narrower width direction, with the height direction being too large for the mouth portion 75 channel. Once the chain link is through the mouth portion 75 into the engaging section 76, the chain link is able to move more freely as the engaging section 76 is formed as an elongate opening larger than the height and width of a chain link body cross section.

Other embodiments of elongate members 80 may be used with such a narrower mouth portion 75. For instance, the elongate member 80 of FIG. 8A formed as a twisted bar has a narrower thickness to other dimensions that may correspond to the width of the mouth portion 75 to allow it only to pass through the mouth portion 75 when oriented in the thickness direction.

Figure 37:
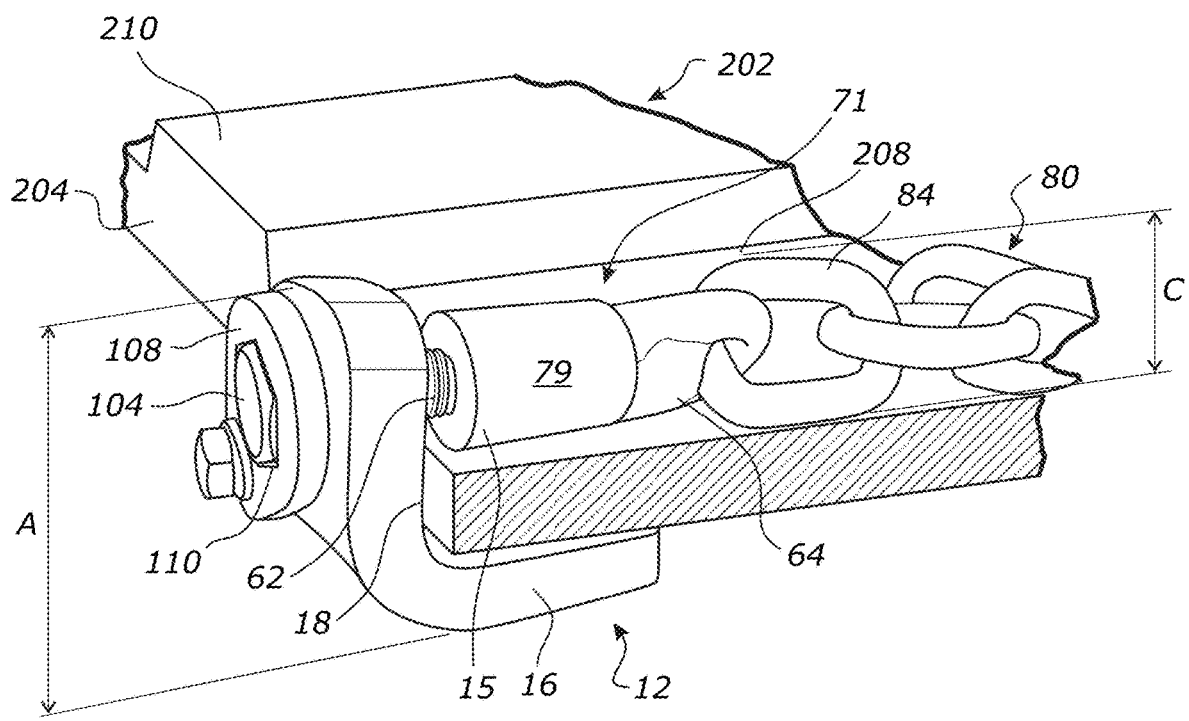
FIG. 37 is a perspective sectioned view of an embodiment of the device using the elongate member of FIG. 34.
Figure 38:
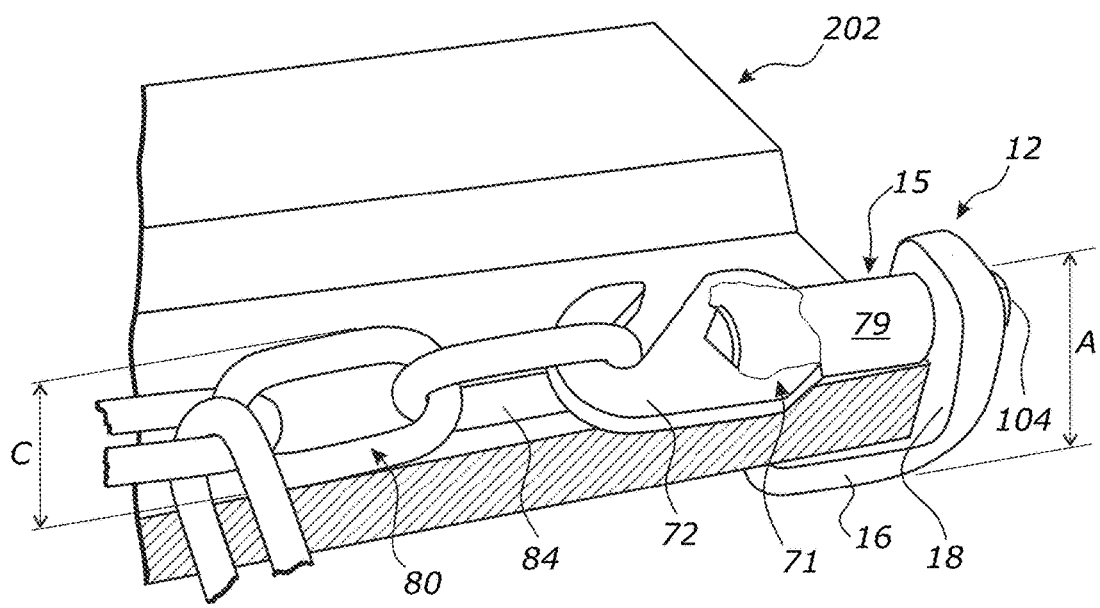
FIG. 38 is a perspective sectioned view of an embodiment of the device using the connection member of FIG. 35.

Referring to FIGS. 37 and 38, a perspective view of a section through a track 202 is shown for the bracket 12 of FIG. 33 with adjustors 15 having connection members 70, 71 of FIG. 34 or FIG. 35.

Referring firstly to FIG. 37, the first bracket 12 is arranged on a first edge 204 of a track 202 where the first edge engaging surface 18 is engaged with the first edge 204. The bottom arm 16 of the bracket 12 is likewise engaged with a bottom of the track 202 and the adjustor 15 is engaged with the top of the track 202. The bottom arm 16 and adjustor 15 do not need to be engaged with the respective track surfaces at all times. Furthermore, spacers may be used (as described with reference to FIGS. 16A and 16B), with the bracket 12 of this embodiment.

The elongate member 80 is connected to the adjustor 15 and thus bracket 12 through the connection member 71 of FIG. 34. Therefore, the first connection location 84 of the elongate member 80 attaches to a ring 64 of the connection member 71 that is connected to the collar 79 having an internal thread for engagement with the threaded member 62. The threaded member 62 being rotatable to adjust the distance between the first connection location 84 and the first edge engaging surface 18 of the first bracket 12 to apply tension to the elongate member 80 when the device is positioned on a track 202 for use.

Once in position, the threaded member 62 is locked in position to prevent rotation and thus adjustment of the distance between the first connection location 84 and the first edge engaging surface 18 by the locking tab 108 engaging with the bolt head or threaded nut 104 of the threaded member 62.

When in use, the total height A of the bracket 12, such as the height of the first edge engaging surface 18 and the bottom arm 16 when viewed from the side (along the track 202) is greater than the height C of the elongate member 80. Any chain tail 90 is not considered for the height. Therefore, the device 10 is low profile on a track 202 of a tracked vehicle 200.

Referring to FIG. 38, the first bracket 12 is arranged on a first edge 204 of a track 202 where the first edge engaging surface 18 is engaged with the first edge 204. The bottom arm 16 of the bracket 12 is likewise engaged with a bottom of the track 202 and the adjustor 15 is engaged with the top of the track 202. The bottom arm 16 and adjustor 15 do not need to be engaged with the respective track surfaces at all times. Furthermore, spacers may be used (as described with reference to FIGS. 16A and 16B), with the bracket 12 of this embodiment.

The elongate member 80 is connected to the adjustor 15 and thus bracket 12 through the connection member 70 of FIG. 35. However, the connection member 70 has a single hook 72 in the embodiment of FIG. 38 as described with reference to other embodiments. Therefore, the first connection location 84 of the elongate member 80 attaches to the hook 72 of the connection member 70 that is connected to the collar 79 having an internal thread for engagement with the threaded member 62. The threaded member 62 being rotatable to adjust the distance between the first connection location 84 and the first edge engaging surface 18 of the first bracket 12 to apply tension to the elongate member 80 when the device is positioned on a track 202 for use.

As with previously described embodiments, when in use, the total height A of the bracket 12, such as the height of the first edge engaging surface 18 and the bottom arm 16 when viewed from the side (along the track 202) is greater than the height C of the elongate member 80. Any chain tail 90 is not considered for the height C. Therefore, the device 10 is low profile on a track 202 of a tracked vehicle 200.

The first bracket 12 described with reference to FIGS. 37 and 38 may also be used as second brackets 32 or with any first bracket 12 or second bracket 32 described throughout this document.

In accordance with FIGS. 39 to 44, there is provided an alternative embodiment of a traction device 10. Unless specified, the traction device 10 described includes the features described elsewhere herein, such as with reference to FIGS. 1 to 38.

Figure 39:
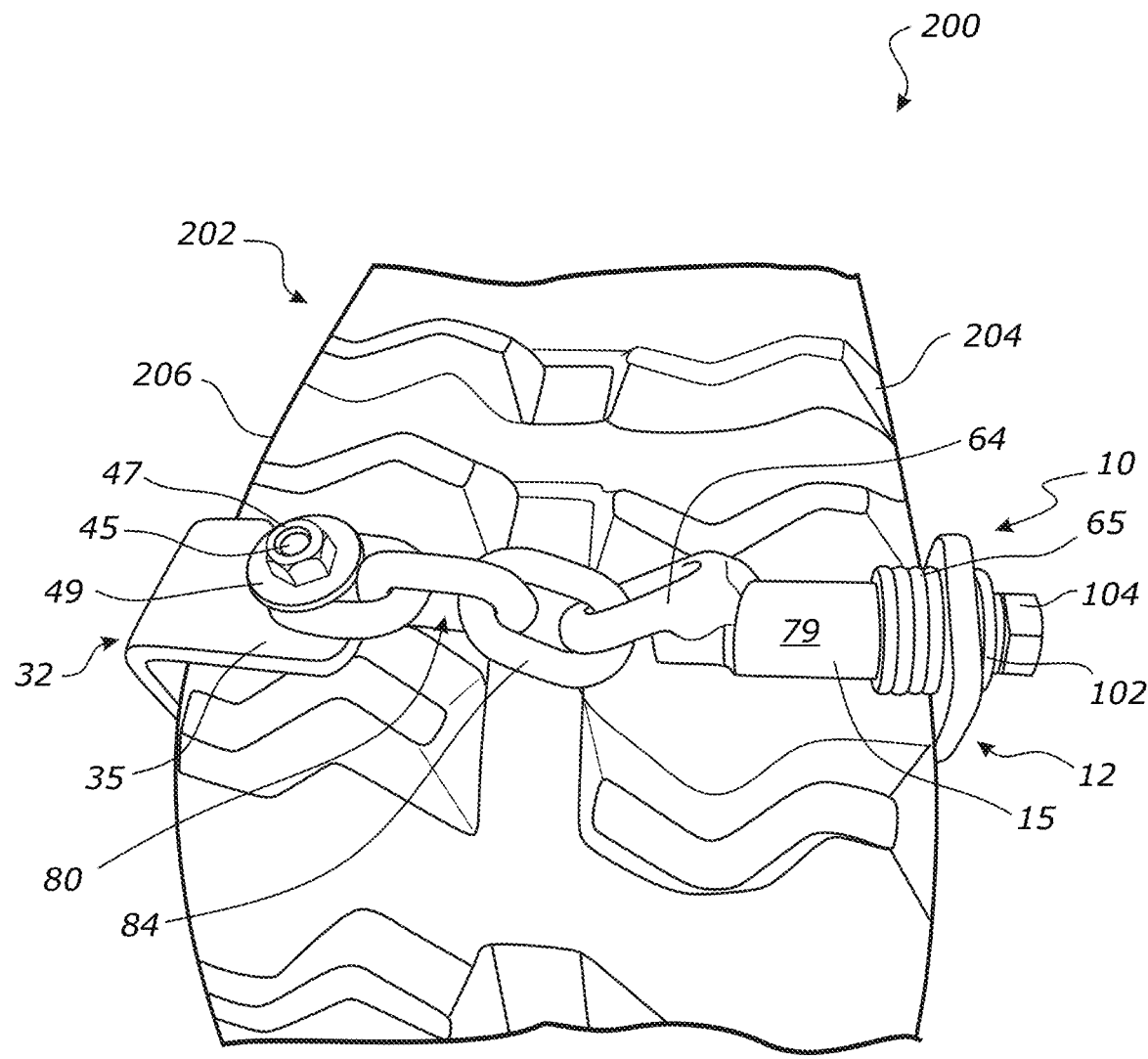
FIG. 39 is a perspective view of an alternative configuration of the device for use with a continuous track of a tracked vehicle.

FIG. 39 shows the first bracket 12. For purposes of description, this first bracket 12 is similar to the bracket 12 of the embodiment shown in FIG. 28, wherein, when viewed from the side, a bottom arm 16 and an adjustor 15 extend from the first edge engaging surface 18. Therefore, the adjustor 15 is positioned adjacent to a top surface of the track 202. The adjustor 15 may provide a similar function to the top flange 14 as described elsewhere and the terms may be used interchangeably where the functions are the same. Alternatively, a top flange 14 may additionally be provided above the adjustor 15 or below the adjustor 15. However, in the embodiment of FIGS. 39 to 44, the bottom arm 16, first edge engaging surface 18 and adjustor 15 form an engaging arrangement around the bottom, first edge 204 and top surface of the track 202, respectively. The engaging arrangement may also be a mouth portion 20 as described elsewhere.

The adjustor 15 comprises the adjustment mechanism 100 of a threaded member 62 passing through a receiving member 102 in the form of a through-hole in the edge engaging portion 18. The threaded member 62 is a bolt having a bolt head 102 positioned on an outer edge (non-track edge facing portion) of the edge engaging portion 18.

As with other embodiments, this allows the adjustment of the threaded member 62 when the traction device 10 is attached to the track 202. This is assisted by providing easy access to the bolt head 102 as it sits on an outer portion of the track 202. As described elsewhere, in some embodiments a bolt nut 104 and threaded bar 62 may be provided.

Similar to FIG. 34, in FIG. 39 the adjustor 15 is for connecting to the elongate member 80. More specifically, the adjustor comprises a collar 79 that adjustably attaches to the threaded bar 62. This can be seen in FIG. 40 where the threaded bar 62 is shown between the edge engaging portion/web 18 and the collar 79. The collar 79 may be threaded to allow the threaded bar 62 to engage therewith.

In use, the collar 79 is positioned adjacent to the top surface of the track. The collar 79 is connected to a link or ring 64 that is formed as part of the adjustor 15.

The first connection location 84 is connected to the ring 64. In the case of a chain 80, the first connection location is a chain link 84 of the chain 80 that is linked to the ring 64.

Figure 40:
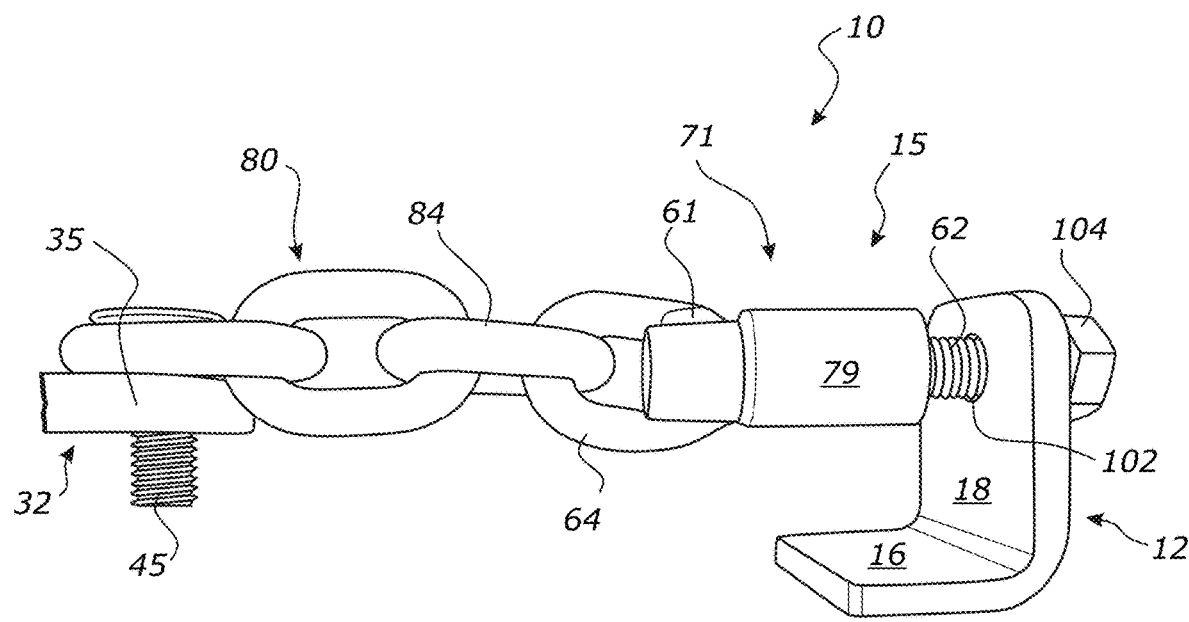
FIG. 40 is a side view of the device of FIG. 39.
Figure 41:
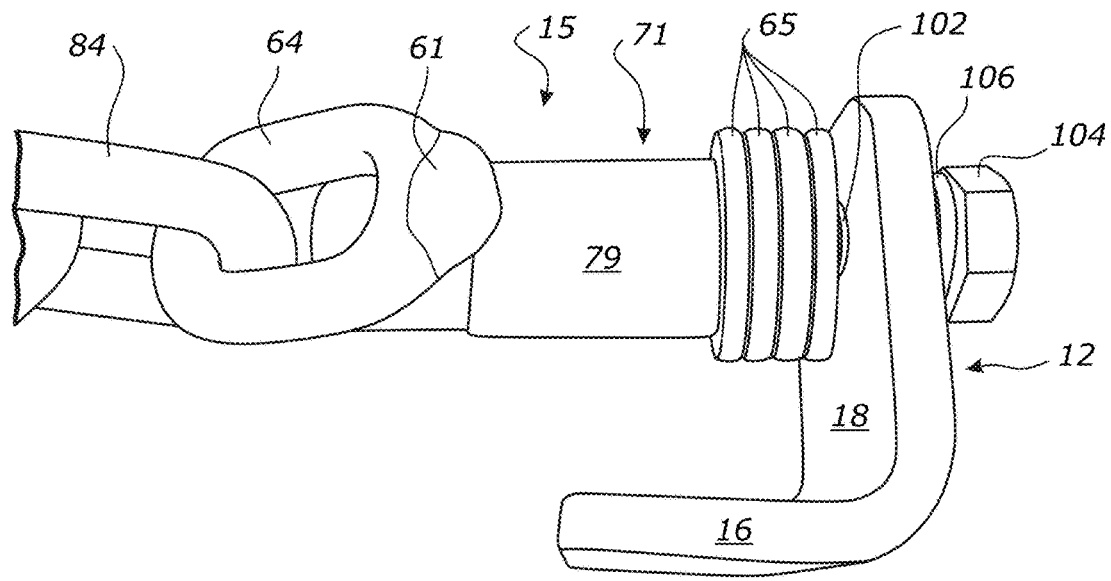
FIG. 41 is a side view of the adjustor of the device of FIG. 39.
Figure 42:
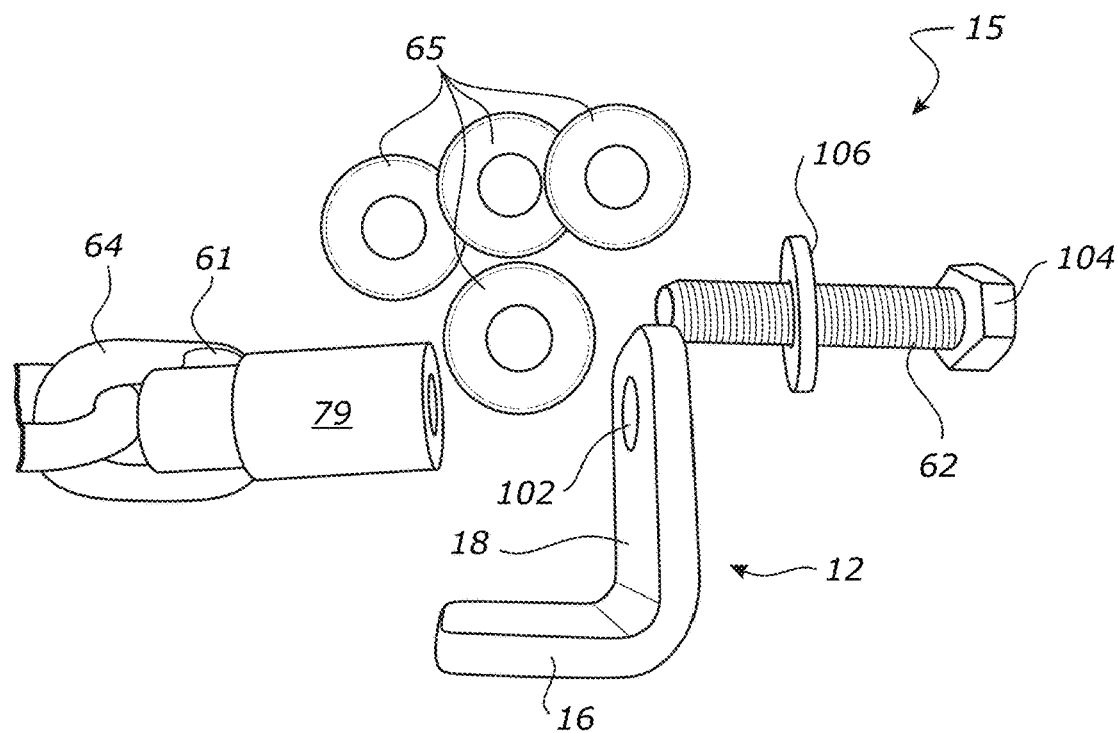
FIG. 42 is an exploded view of the adjustor of the device of FIG. 39.
Figure 43:
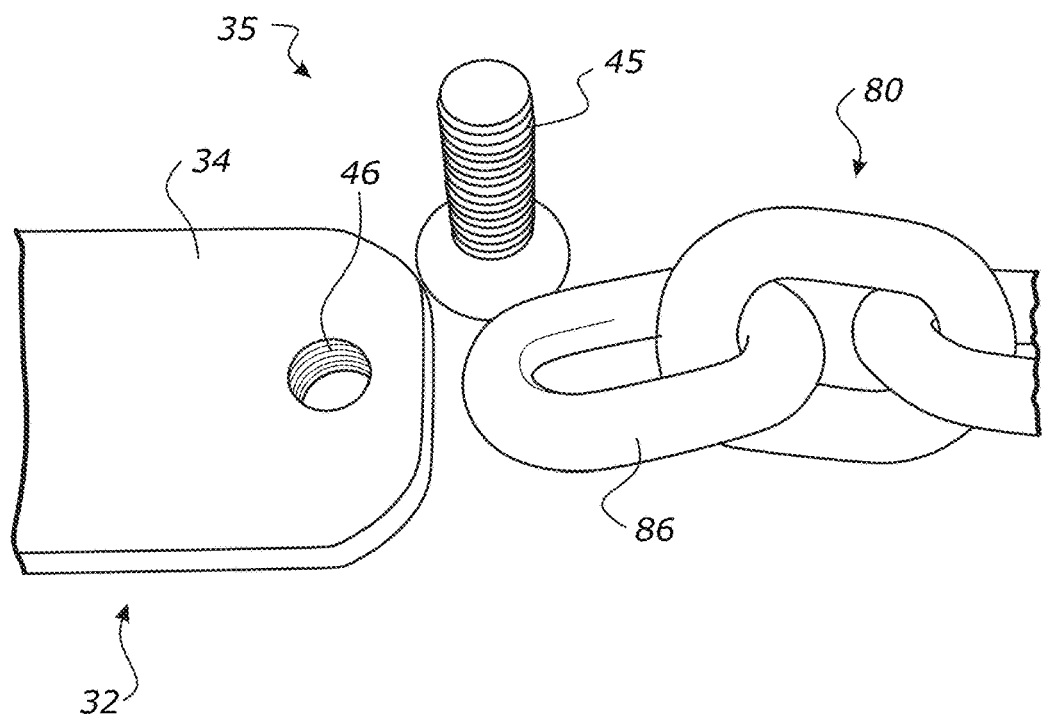
FIG. 43 is an exploded view of the connector of the device of FIG. 39.

Referring to FIGS. 40 to 42, as shown, in some embodiments, the ring 64 is the same or similar in shape and/or size to each or at least one chain link of the chain 80, such as the first chain link 84. As previously described elsewhere, an adapted portion 60 of the ring 64 may be provided to connect the ring 64 to the collar 79, such as having half a ring cut and attached to the collar 79. In the illustrated embodiment, an alternate adapted portion 61 is provided where the ring 64 remains mostly or fully intact and is attached to the collar 79.

It may be advantageous to have a device 10 that it is adapted for use with tracks 202 that have a relatively smaller width. This reduced size device 10 may be achieved by having a shorter chain 80 or other elongate member 80, and/or by having brackets 12, 32 that protrude less far across the width of the track 22.

In the present embodiment of FIGS. 39 to 44, the ring 64 is attached part way along the collar 79. More specifically, an end of the collar 79 extends further than part of the ring 64 outwardly from the edge engaging portion 18.

As the first chain link 84 is connected to the ring 64, the space for the chain link 84 is predetermined. Therefore, the ring 64 may be connected at the alternative adapted portion at a point along the collar 79 that provides adequate space for the first chain link 84 to have movement to extend from the first bracket 12 at an angle. This may be useful where the first and second brackets 12, 32 are not parallel across the track 202.

The use of an alternate adapted portion 61 for connecting to the elongate member (e.g. chain) 80 to the collar 79 allows for part of the elongate member 80 to be positioned closer to the edge engaging portion 18. This allows for narrower tracks 202 to maximise the length of elongate member 80 that is in contact with the ground and assisting with traction.

As described elsewhere, the collar 79 is connectable to the first bracket 12 in a number of ways. One such example is by having a thread inside the collar 79 wherein the threaded member 62 is screwed into the collar 79. Alternatively, the collar 79 may be directly joined to the bracket, such as in the case of a second bracket 32 that does not require any adjustable mechanism 100. In the illustrated embodiment of FIGS. 39 to 42, the collar 79 is connected to the bracket 12 by the threaded member 62. Only the bolt head 104 of the threaded member 62 is visible in FIG. 41.

In a difference to other embodiments, packers 65 are provided between the collar 79 and the edge engaging portion 18 where the collar 79 does not fully occlude with the edge engaging portion 18. The packers 65 may be formed as disks or washers that can be positioned around the exposed part of the threaded member 62 that extends between collar 79 and the edge engaging portion 18.

The number of packers 65 may be varied according to width requirements of the track 202. The packers 65 provide a number of advantages, such as protecting the exposed thread or part of the threaded member 62, and to increase the device strength by reducing any moment or bending force that may act on the threaded member 62 by transferring the bending force to the larger bracket 12 and collar 79 parts respectively.

Although the packers 65 are shown as washers, other shapes are possible. This includes packers 65 that do not require the threaded member 62 to be removed from the collar 79 to be positioned. This may be achieved with packers 65 having slots extending from an edge of the packers 65.

The embodiment of FIGS. 39 to 42, with reference to the alternate adapted portion 61 and packers 65, has been described with reference to an adjustor 15. However, these features may likewise be used with a second bracket 32 and connector 35. Further, each of the features may be combined with any other embodiment described herein, such as with different corresponding brackets 12, 32 or as parts of other brackets 12, 32.

Referring to FIGS. 39, 40, 43 and 44, an alternative embodiment of the second bracket 32 is shown. For purposes of explanation, the bracket is similar to that of FIG. 2, wherein the second bracket 32 has a top flange 34 and a bottom flange 36 (not visible in the present figures). The top flange 34 and bottom flange 36 are spaced apart. Extending between the top flange 34 and bottom flange 36 is a web 38 or second edge engaging surface 38 (not fully visible in the present figures). The second bracket 32 may be an extruded U-shape, where the web 38 forms the base of the U-shape and the top flange 34 and bottom flange 36 provide the sides of the U-shape. The distance between the top flange 34 and bottom flange 36 is such that the second bracket 32 fits around an edge 204, 206 of a track 202 of a tracked vehicle 200.

The second bracket 32 connects to the elongate member 80 via the connector 35 (or connection member 70) that engages with the second connection location/end 86 of the elongate member 80. As described elsewhere, the connector 35 may be formed in the top flange 34 of the second bracket 32 or it may be formed separately. In the illustrated embodiment of FIGS. 39, 40, 43 and 44, the top flange 34 comprises a through hole 46. A connector pin 45 may be provided, the connector pin being an elongate part. The connector pin may be positioned in the through hole 46, such that part of the pin 45 is exposed either above, below or at each side of the top flange 34. The connector pin 45 may connect to the elongate member 80 having its second connection point 86 to be connected to the pin. In the case of a chain 80 having a second end chain link 86, the chain link 86 may be looped over the connector pin 45. Therefore, the connector pin 45 sits in the inner ring of the chain link 86.

To hold the chain link 86 in position at the connector 35, the connector pin 45 may be threaded and attachable to a connector nut 47. The connector nut 47 being a nut of a bolt and nut combination and sharing the features of such nuts. Therefore, the chain link 86 is held between the top flange 34 and the connector nut 47, with the connector pin 45 passing through the chain link 86.

In some cases, the inner ring of the chain link 86 may be larger than the connector nut 47, such that the chain link 86 could pass over the connector nut 47. Therefore, a connector washer 49 may be provided. The connector washer 49 is larger in diameter than the inner ring of the chain link 86. Therefore, the chain link 86 is constrained between the top flange 34 and the connector washer 49, and the connector nut 47 holds the washer 49 on the pin 45. The chain link 86 maybe also be at a first end 84.

Figure 44:
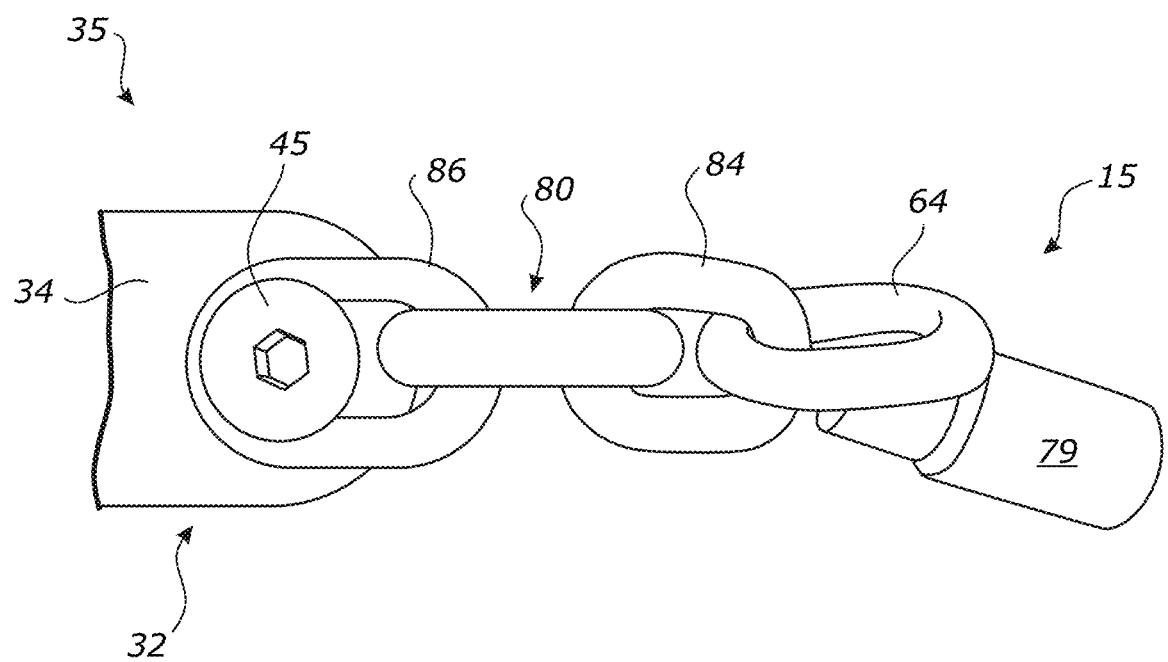
FIG. 44 is a top view of the connector, elongate member and adjustor of the device of FIG. 39.

To retain the connector pin 45 in the through hole 46 of the second bracket 32, the through hole 46 may be threaded. This thread may correspond to the thread of the connector pin 45. Alternatively, or additionally, a further connector nut 47 may be provided to be positioned on an opposite side of the top flange 34 such that the connector pin 45 is constrained in the through hole 46 by having connector nuts 47 at either side of the through hole 46. Alternatively, or additionally, the connector pin 45 may have a bolt or screw head that prevents the connector pin 45 from passing through the through hole 46. In some configurations, this bolt or screw head may also be shaped such that it is larger than the chain link 86 to pass over, i.e., larger than the inner ring of the chain link 86. Therefore, the chain link 86 may be retained over the connector pin 45 between the top flange 34 and the head of the connector pin 45. This is shown in FIG. 44.

The connector pin 45 may be connected to the chain link 86 above or below the top flange 34, i.e., such that in one configuration, it is on the track 202 side of the top flange 34. Whilst a chain 80 is described as being as the elongate member 80 of the ground engaging feature, other elongate members 80 may be connected to the connector pin 45, such as the twisted bar 80 of FIG. 8A, wherein the hole 60 may pass over the connector pin 45.

The use of the connector pin 45 forming the connector 35 for connecting to the elongate member (e.g. chain) 80 to the bracket 32, allows the elongate member 80 to be positioned closer to the second edge engaging portion 38. This provides a compact arrangement that maximise the length of elongate member 80 that is in contact with the ground and assisting with traction. This is useful for narrow tracks 202.

As the connector pin 45 passes through a top of the top flange 34 in a vertical direction when viewed from the side, at least one end of the connector pin 45 is near or in contact with the track 202 surface. This assists in the retention of the pin 45 in the through hole 46 as the connector bolt 47 or pin 45 is less liable to rotate given the contact with the track 202. Therefore, untightening of the connector pin 45 is prevented, or at least substantially inhibited. The arrangement also allows the elongate member 80 to be turned over or inverted such that the ground engagement occurs on the opposite surface. This can prevent wear of the elongate member 80 being subjected to a single side and elongate the life of the device 10.

The embodiment is described with reference a connector 35. However, these features may likewise be used with a first bracket 12 and adjustor 15. One such example is described with reference to FIG. 45 below.

Figure 45:
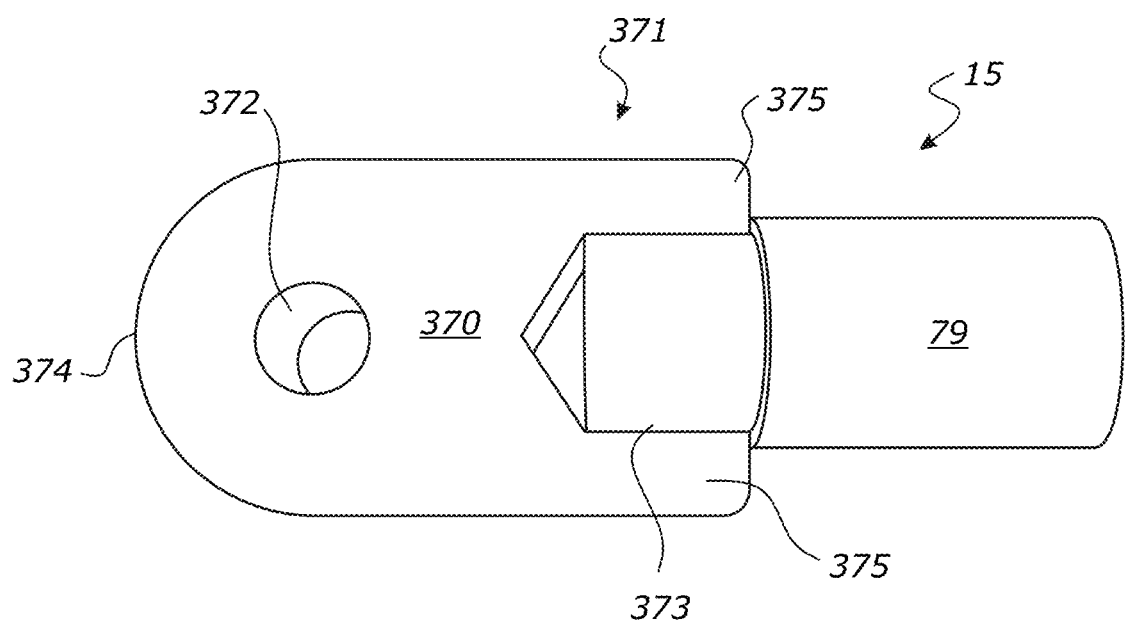
FIG. 45 is an alternative configuration of an adjustor for use with the device of the Figures in some configurations.

Referring to FIG. 45, an adjustor 15 is shown having a modified connection member 71 that is an eyelet connection member 371. As with other embodiments, this utilises a threaded collar 79 to allow adjustment with an adjustment mechanism 100 as described elsewhere herein.

In the illustrated embodiment, the connection member 371 is formed as a plate portion 370. The plate portion 370 is relatively flat to its width. The plate portion 370 has leg portions 375 that straddle either side of the collar 79. This allows the attachment of the plate portion 370 to the collar 79, at a connection portion 373. This is the point where the leg portions 375 and collar 79 are in contact (or near contact). The connecting portion 373 may be formed by welding or other joining techniques.

Whilst a plate portion 370 is described, other forms may be used to form the connection member 371.

The plate portion 370 extends from the collar 79 with relatively straight sides and terminates in a radiused plate edge 374. This ensures that any elongate member 80 connected thereto is able to swivel or pivot relative to the plate portion 370. The swivel or pivoting action allows the elongate member to extend at a non-parallel angle from the connection member 371.

The plate portion 370 has an eyelet 372 formed therein in the form of a through hole 372. The through hole 372 may be sized to receive a connector pin 45 as described with reference to FIGS. 39, 40, 43 and 44 as described above. Therefore, an elongate member 80 may be connected to the eyelet connection member 371 in the same manner.

This allows an adjustor 15 to be connected to an elongate member 80 at either end of the elongate member 80 whilst still retaining the adjustable requirements of (at least) one of the brackets.

Figure 46:
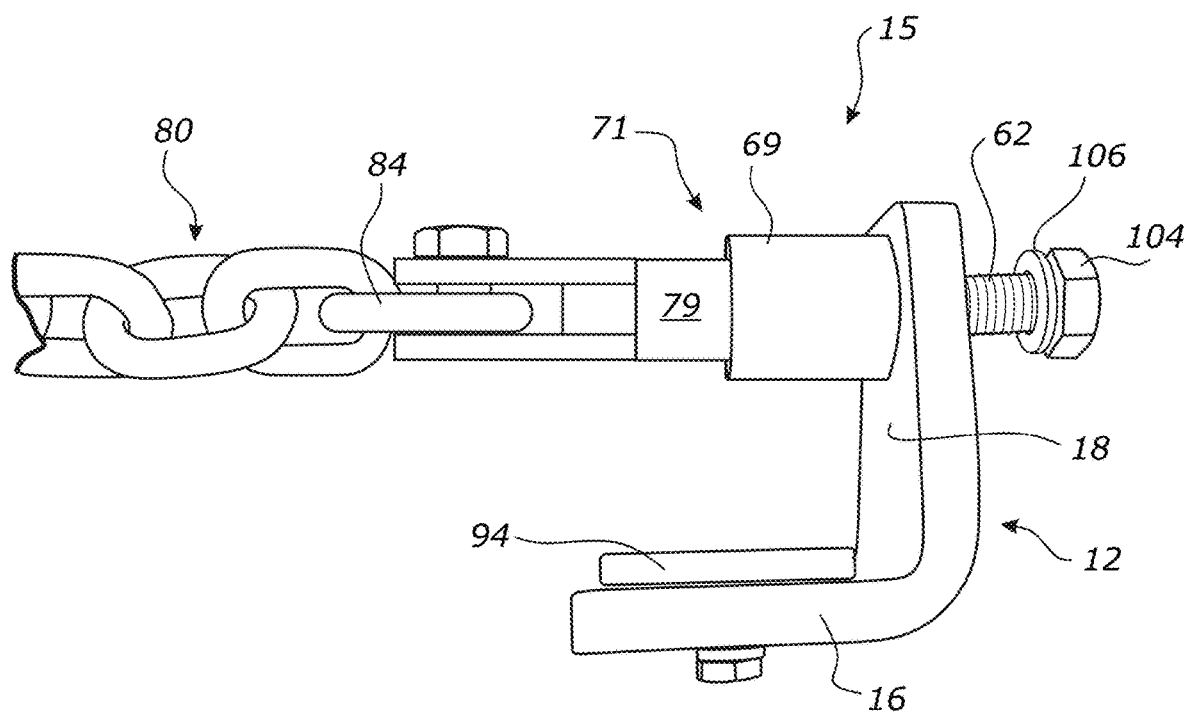
FIG. 46 is a side view of an alternative configuration of a bracket and adjustor for use with the device in the Figures in some configurations.
Figure 47:
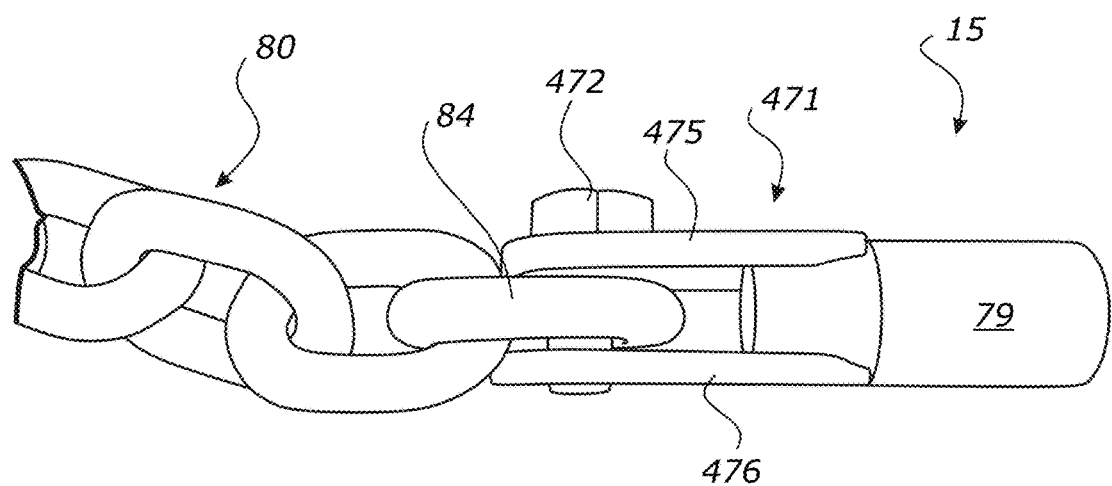
FIG. 47 is a side view of the adjustor of FIG. 46.
Figure 48:
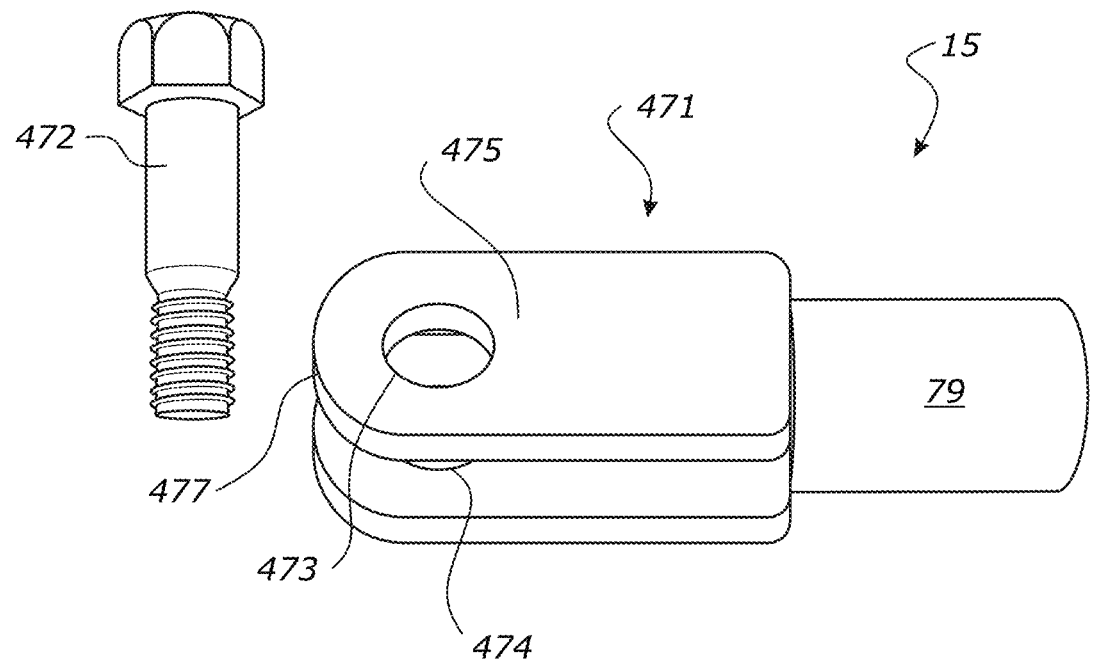
FIG. 48 is an exploded view of the adjustor of FIG. 46.

Referring to FIGS. 46 to 48, an alternative connection member 71 is provided. This may be referred to as a prong connection member 471. In FIG. 46, this is shown in combination with a first bracket 12, such as described with reference to FIG. 32. Therefore, to provide the adjustor 15, there is the threaded member 62 that extends through the receiving member 102 in the first edge engaging surface 18. The bolt head or threaded nut 104 is positioned on the other side of the receiving member 102. The threaded member 62 is surrounded by a bush 69. The bush 69 is a cylinder that extends from the first edge engaging surface 18 in the same direction as the threaded member 62. The bush 69 and the threaded member 62 are coaxial. The bush 69 surrounds the threaded member 62 and provides protection for the threaded member 62. The bush 69 internal diameter is larger than the outer diameter of the threaded member 62 such that there is a concentric space around the threaded member 62 when positioned within the bush 69. The concentric space may be used for accommodating the corresponding collar 79 of any connection member 70, 71 described elsewhere or prong connection member 471 described below.

The prong connection member 471 comprises a first leg 475 and a second leg 476 that co-extend from the end of the collar 79. The first leg and second leg 475, 476 are spaced apart, such that they are on opposing sides of the collar 79. The legs 475, 476 maintain the same gap as they extend from the collar 79. Therefore, the first and second legs 475, 476 form prongs. Each of the legs 475, 476 are flat plates where the flat surfaces face one another whilst maintaining the gap therebetween.

At or near the end of first leg 475, i.e. the end furthest from the collar 79, there is a first through hole 473 formed through the plate of the first leg 475. Therefore, the first through hole 473 faces the second leg 476.

At or near the end of second leg 476, i.e. the end furthest from the collar 79, there is a second through hole 474 formed through the plate of the second leg 476. This is formed concentrically with the first through hole 473 in the facing plates of the legs 475, 476. This is best observed in FIG. 48.

A prong bolt 472 is provided and is sized to pass through both the first through hole 473 and the second through hole 474. The prong bolt 472 may be secured in position through the through holes 473, 474 such as with a nut and closes the legs of the prongs 475, 476.

The first and second legs 475, 476 are separated such that a gap is formed between them. Inside this gap, the first end/connection point 84 of the elongate member 80 may be positioned. This may be held in position by the prong bolt 472 passing therethrough. In the case of a chain 80, the prong bolt 472 passes through an inner ring of a chain link 84. The space between the first and second legs 475, 476 may be sized such to fit different thickness of elongate members 80 or chain links. Likewise, the thickness of the plate forming the legs 475, 476 may be varied to provide additional strength.

At the end of each leg 475, 476, i.e. at the end further from the collar 79, there is a radiused edge 477. Therefore, the side of the legs 475, 476 extend substantially parallel and have a curved front edge 477. This allows the elongate member 80 to extend at an angled directed from the prong connection member 471.

Although the prong connection member 471 has been described in reference to a first connection member 71 for an adjustor 15 of a first bracket 12, the pronged legs 475, 476 could likewise be applied to a second bracket 32 having a connector 35, such as by replacing the collar 79. Alternatively, the prong connection member 471 may be used with two adjustors 15 with an elongate member 80 extendable therebetween.

The prong connection member 471 may be positioned such that the prong bolt 472 extends into the track 202 when in use. Therefore, the head or tail or the bolt 472 is constrained against the track surface to reduce vibrations and loosening of the bolt 472. This also allows for the elongate member 80 to be flipped or turned upside-down for an opposite side to be in contact with the ground when in use.

Referring to FIGS. 49 to 52, the adjustor 15 is provided with the hook such as shown in FIG. 5 or FIGS. 10A to 11B as hereinbefore described. Whilst a hooked connector 35 or adjustor 15 connection member 70, 71 has been described as being hooked 72, 72', 72" with various positioned hooks 77, 77', 77", 78, 78', 78", for purposes of clarity, a single hooked 72 connector 35 or adjustor 15 with first and second hooks 77, 78 is described herein for application to either connector 35 or adjustor 15 as appropriate. Therefore, where a description for an adjustor 15 or connector 35 may be provided, this may be applied to a connector 35 or adjustor 15.

Figure 49:
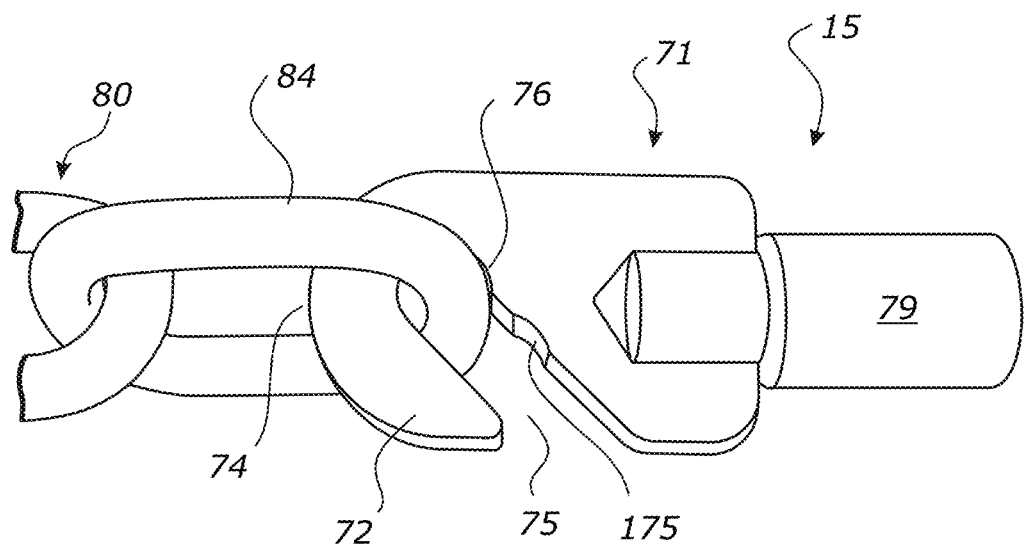
FIG. 49 is a perspective view of an alternative configuration of an adjustor for use with the device of the Figures in some configurations.
Figure 50:
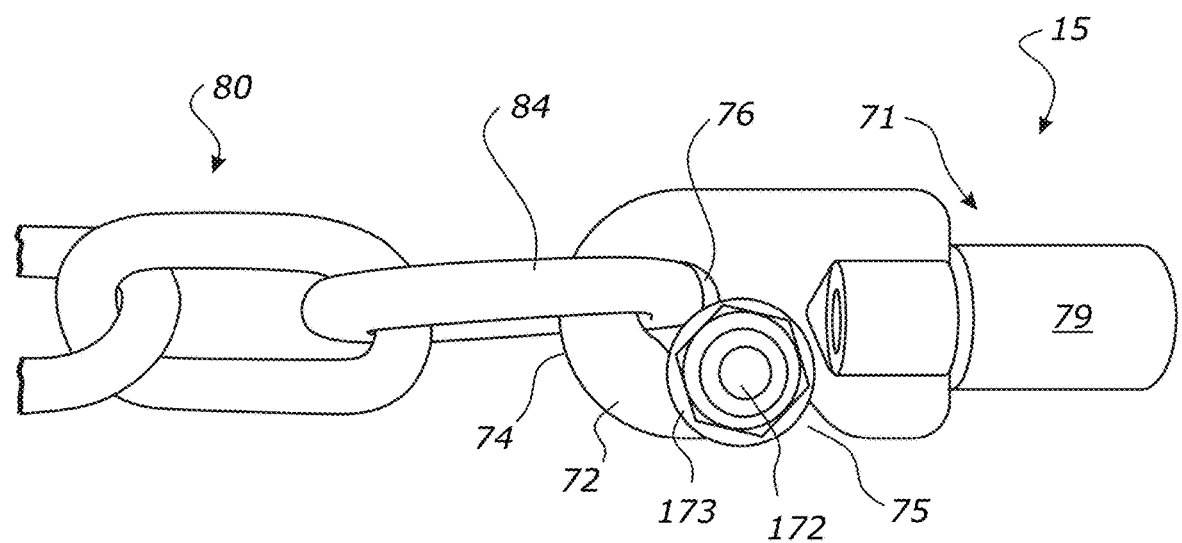
FIG. 50 is a top perspective view of the adjustor of FIG. 49 in a different arrangement.

FIGS. 49 and 50 show an adjustor 15 connection member 71 in the form of a hook 72 to connect to the elongate member 80. The hooked connection member 72 (generally called a hook 72) is joined to a collar 79 as hereinbefore described for adjusting the position of the connection member 71 relative to the first bracket 12. As with other embodiments, the hooked connection member 72 has a plate section connected to the collar 79.

Where the elongate member 80 is a chain, the hook 72 has a mouth 75. The mouth 75 is shaped to receive a chain link 82 of the first end 84. The mouth 75 of the hook 72 is directed (at least partially) in the closed side 44 direction to prevent the first end 84 from releasing when engaged in the hook 72. The hook 72 has an engaging section 76 where the first end 84 sits. This is positioned relatively centrally in the connection member 72. The engaging section 76 is a different shape from the mouth portion 75, such that the first end 84 enters the mouth 75 in a first orientation and may be moved to a second orientation when positioned in the engaging section 76. The position of the first end 84 when passing through the mouth 75 is generally a different orientation to the first end 84 in use. The end of hooked connection member 72, i.e. opposite the collar 79, has a radiused face 74. This ensures that the first end 84 may be able to rotate slightly when engaged in the engaging section 76 without fouling the hooked connection member 72.

The elongate member 80 may be another form other than a chain 80 and having a hoop or looped end to engage with the engaging section 76.

The description of the hooked connection member 72 here may be applied to the description of the hook 72, 72', 72" described elsewhere herein, and vice versa.

As shown in FIG. 49, the mouth 75 of the hooked connection member 72 has a mouth cut-out 175 in the form of a radiused cut-out into side walls of the mouth 75. The mouth 75 is otherwise parallel arranged walls. The mouth cut-out 175 may be on either wall of the mouth 75, e.g., the wall closest or furthest from the collar 79. Alternatively, in some embodiments, the mouth cut-out 175 is in both walls forming a substantially symmetrical mouth cut-out 175.

A blocking bolt 172 is provided that may be positioned passing through the hooked connection member 72. Therefore, from one side of the plate to the other side. The mouth 75 of the hook 72 is sized such that the body (i.e., thread and/or shank) of the blocking bolt 172 is unable to fit through the mouth 75 except at the mouth cut-out 175. In some embodiments, the outer radius of the blocking bolt 172 body is the same or similar to the radius of the mouth cut-out 175.

When positioned through the mouth cut-out 175, the blocking bolt 172 is unable to move or slide along the mouth 75. Therefore, the blocking bolt 172 prevents the first end 84 of the elongate member 80 from passing through the mouth 75. More particularly the mouth cut-out 175 is positioned such that the first end 84 may be positioned within the engaging section 76 when the blocking bolt 172 is present. Therefore, the blocking bolt 172 allows positioning and movement of the first end 84 in the engaging section 76 but prevents the first end 84 and thus elongate member 80 from becoming disengaged with the hooked connection member 72.

A blocking washer 173 may be provided with the blocking bolt 172 to increase the radius and thus blocking of the first end 84. This may be useful for different sized first ends 84 or chain links 84. This also provides a smooth radiused surface, where the blocking washer 173 is circular, rather than, in some embodiments, a hex head bolt which may disrupt the required rotation and movement of the first end 84.

The blocking bolt 172 may be constrained by a nut or may be a threaded bar with a plurality of nuts to hold the blocking bolt 172 in position. The hooked connection member 72 may be positioned such that the blocking bolt 172 extends into the track 202 when in use. Therefore, the head or tail or the bolt 172 is constrained against the track surface to reduce vibrations and loosening of the bolt 172. This also allows for the elongate member 80 to be flipped or turned upside-down for an opposite side to be in contact with the ground when in use.

Figure 51:
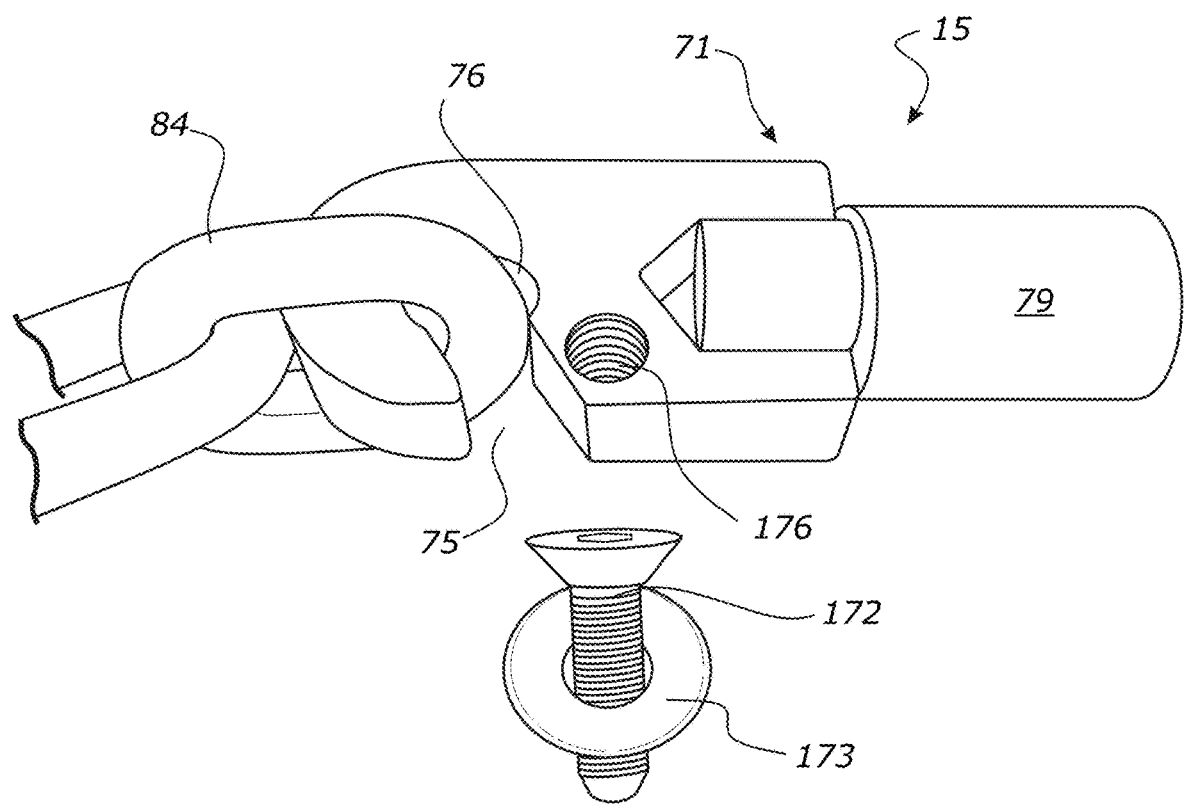
FIG. 51 is top perspective view of an alternative configuration of the adjustor of FIG. 49.
Figure 52:
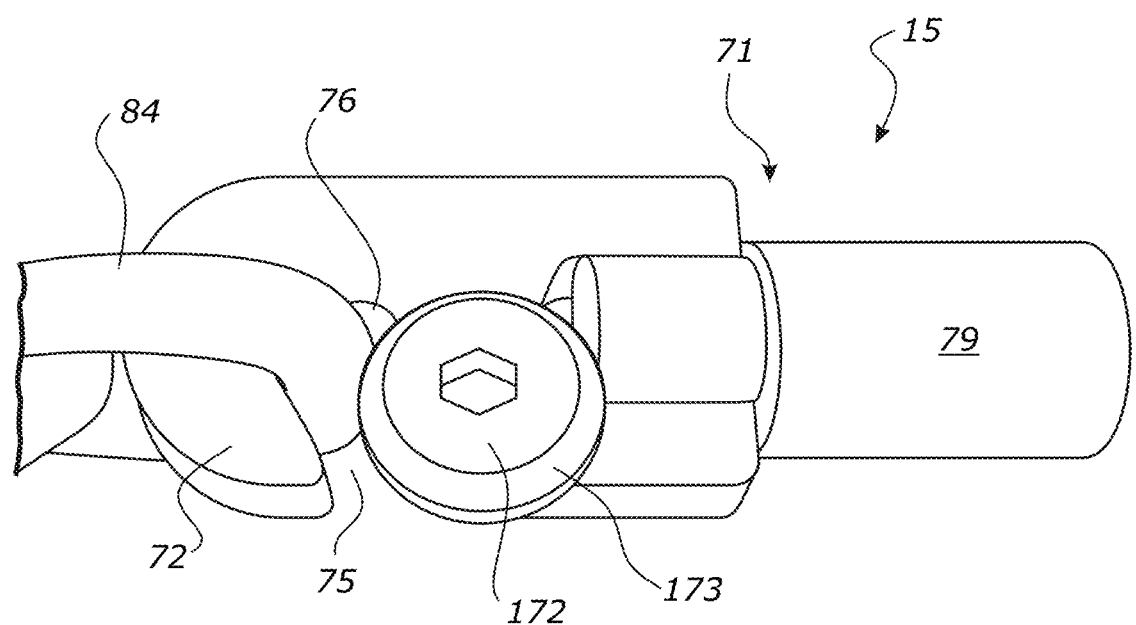
FIG. 52 is a top perspective view of the adjustor of FIG. 51 in an alternative arrangement.

Referring to FIGS. 51 and 52, an alternative embodiment of the connection member 71 in the form of the hooked connection member 72 is shown. The description is the same as above for like components and described elsewhere in relation to hooked connection members 72. However, in FIGS. 51 and 52, the mouth cut-out 175 is not present and a mouth adjacent through-hole 176 is instead provided.

The mouth adjacent through hole 176 is a through-hole extending through the plate forming the hooked connection member 72. The mouth adjacent through-hole 176 is proximal to the mouth 75.

The mouth adjacent through-hole 176 is sized to allow the blocking bolt 172 to extend therethrough. In some configurations, the mouth adjacent through-hole 176 may be threaded and corresponds to the thread of the blocking bolt 172.

The mouth adjacent through-hole 176 is positioned such that the head or nut (or blocking washer 173 when present) of the blocking bolt 172 when positioned in the mouth adjacent through-hole 176 extends across at least part of the mouth 75. Therefore, this reduces the size of the mouth 75 for allowing the first end 84 to pass through the mouth 75, i.e., to or from the engaging section 76. However, the engaging section 76 is not blocked or fouled by the bolt head or nut or blocking washer 173 of the blocking bolt 172. Therefore, the first end 84 may be positioned in the engaging section 76 and have the requirement movement to allow the elongate member 80 to extend across the track 202 whilst the blocking bolt 172 is in position.

Although the position of either the mouth adjacent through-hole 176 or mouth cut-out 175 may be any location that allows both blocking of the channel of the mouth 75 whilst still allowing the first end 84 to be positioned in the engaging section 76, in some embodiments, the mouth adjacent through-hole 176 or mouth cut-out 175 is substantially half-way along the length of the mouth 75.

In addition to the advantages described above, the mouth adjacent through-hole 176 or mouth cut-out 175 provide additional securement for the elongate member 80 to prevent the easy removal. Instead, at least one bolt needs to be removed.

As with the configuration of FIGS. 49 and 50, the configuration of FIGS. 51 and 52 may be applied to the connector 35 rather than the adjustor 15.

Figure 53:
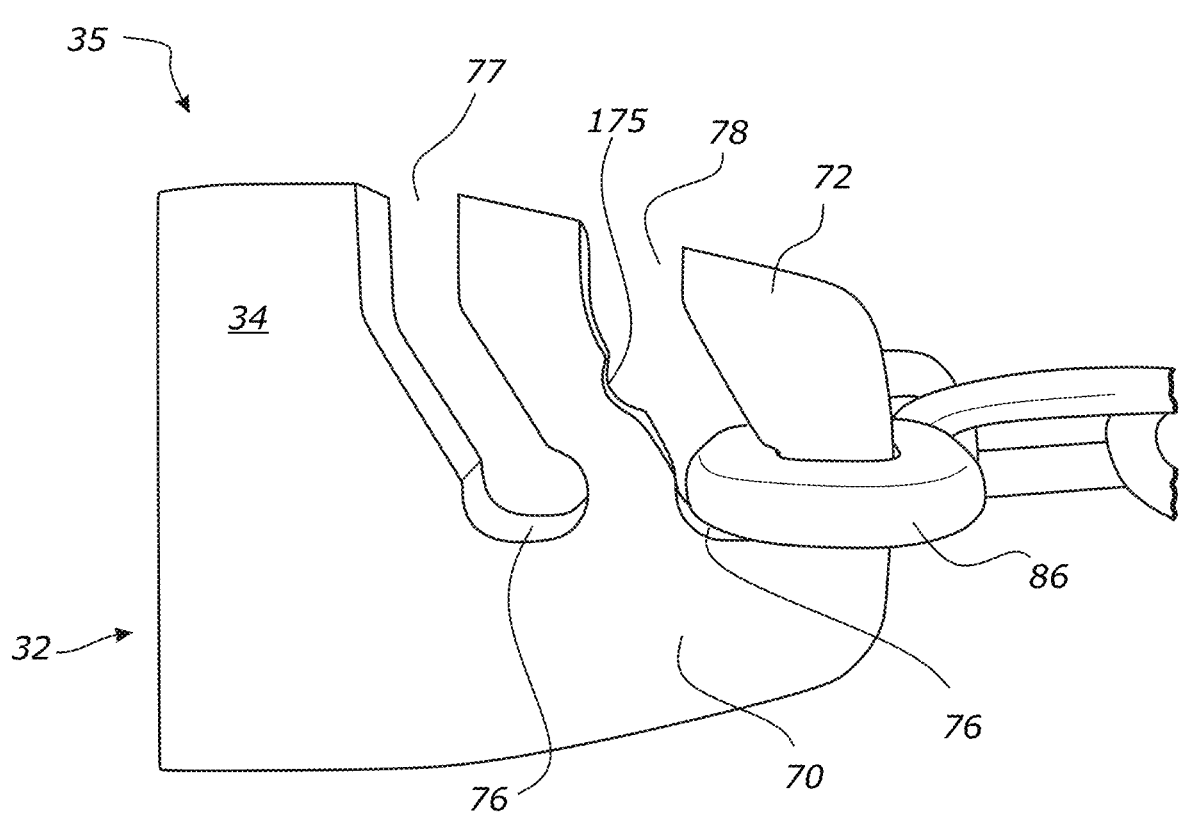
FIG. 53 is a top perspective view of an alternative configuration of a bracket and connector for use with the device of the figures in some configurations.
Figure 54:
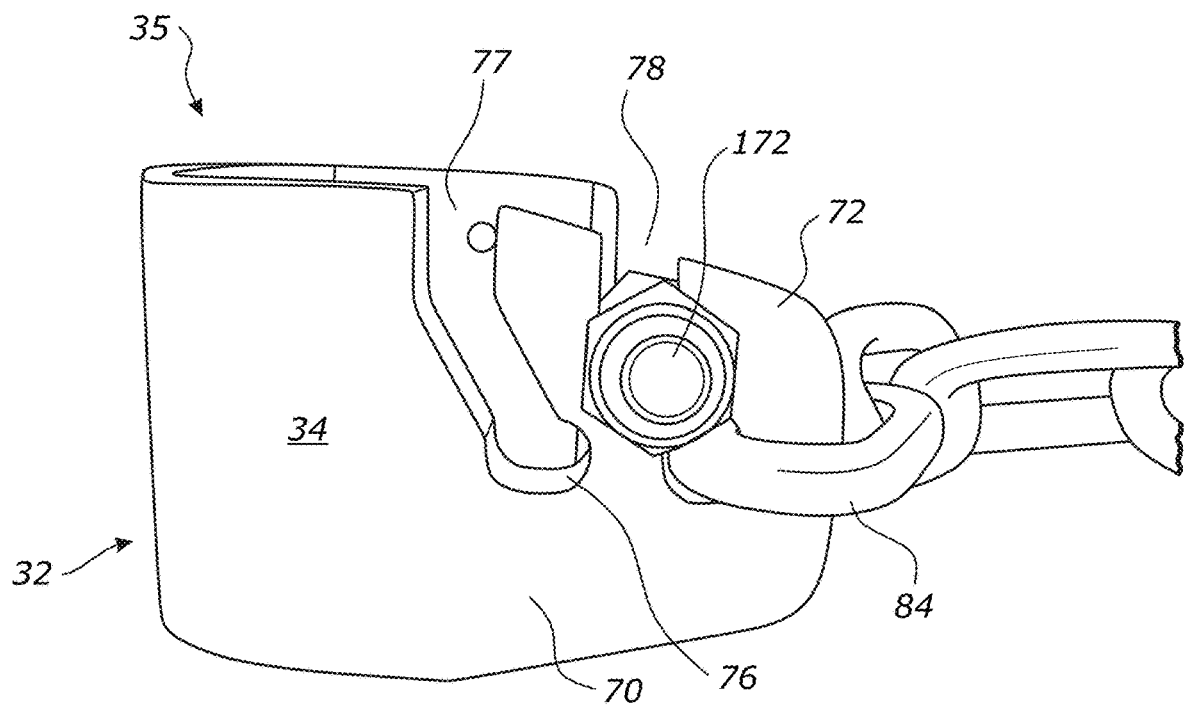
FIG. 54 is a top perspective view of the bracket of FIG. 53 in a different arrangement.
Figure 55:
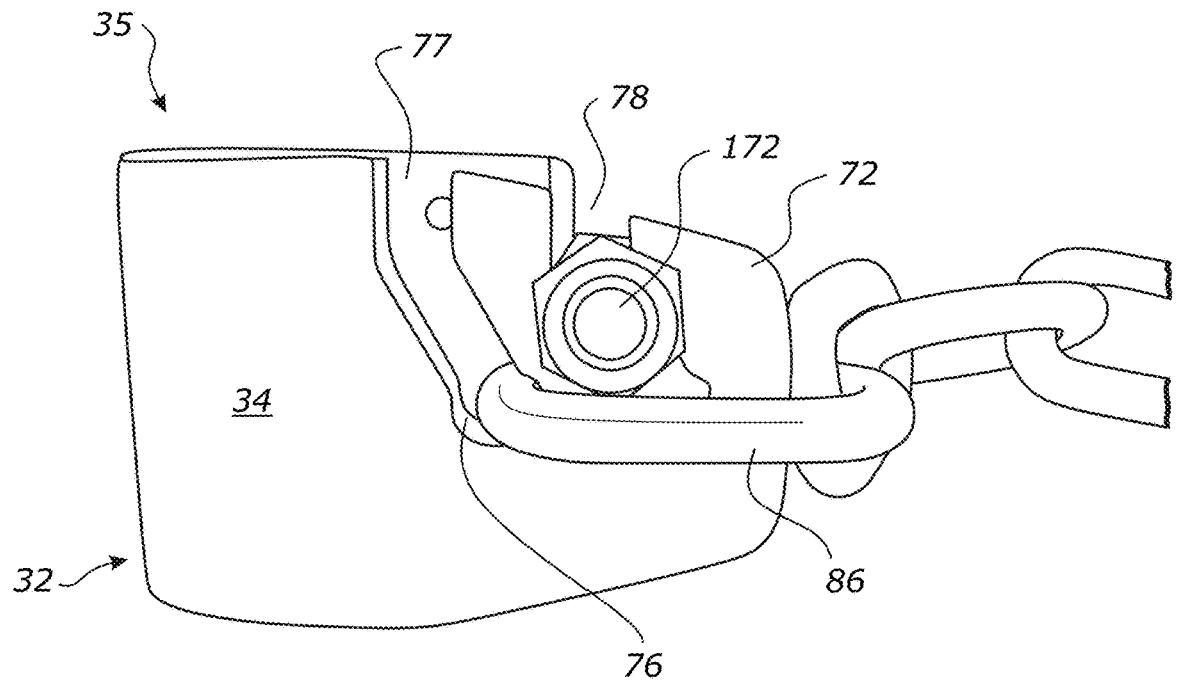
FIG. 55 is a top perspective view of the bracket of FIG. 53 in a further different arrangement.

Referring to FIGS. 53 to 55, a second bracket 32 having a connector 35 with a connection member 70 in the form of the hooked connection member 72 is shown. This is similar to the configuration shown in FIG. 10B and the description there can be applied here.

In the configuration of FIGS. 53 to 55, the top flange 34 of the second bracket 32 has the connection member 70 for removably connecting to the elongate member 80. The connection member 70 has the hook 72 or is in the form of the hooked connection member 72 for engaging with a link 82 of the chain 80. In a difference to the configuration of FIGS. 49 to 52, the hooked connection member 72 has multiple engaging sections 76 for receiving a second end 86. The engaging sections may also be referred to as hooking portions 76. The second end is selectively connectable at either of the hooking portions 76.

In the present description, the first hooking portion 77 and second hooking portion 78 are referred to as first and second mouths 77, 78 respectively for clarity of description as described below. However, the terms are interchangeable with the earlier description.

The first mouth 77 and second mouth 78 and respective engaging portions 76 are located along the upper flange 34 and form distinct channels extending from an edge of the upper flange to the respective engagement portions 76. Therefore, as described with reference to FIG. 10B, the first mouth 77 is closer to the closed side 44 than the second mouth 78 that is located closer to the open side 42. Therefore, the engaging portion 76 engaged with the second end 86 at the first mouth 77 will be closer to the closed side 44 than the second end 86 engaged with the engagement portion 76 of the second mouth 78.

Other than the multiple engagement portions 76 for each mouth 77, 78, the mouths 77, 78 and engagement portions 76 are similar to that as described for the mouth 75 of FIGS. 49 to 52.

As shown in FIG. 53, the second mouth 78 of the hooked connection member 72 has the mouth cut-out 175 such as described with reference to FIGS. 49 and 50. Therefore, the mouth cut-out 175 is a through-hole in the form of a radiused cut-out into side walls of the second mouth 78. The second mouth 78 (like the first mouth 77) is otherwise parallel arranged walls. The mouth cut-out 175 may be on either wall of the second mouth 78. Alternatively, in some embodiments, the mouth cut-out 175 is in both walls forming a substantially symmetrical mouth cut-out 175.

As shown in FIG. 54, the second mouth 78 may receive the blocking bolt 172 through the mouth cut-out 175 in the same manner as described for FIGS. 49 and 50. Therefore, the blocking bolt 172 may be positioned passing through the hooked connection member 72. That is, the blocking bolt 172 passes from one side of the plate to the other side.

The second mouth 78 of the hook 72 is sized such that the body (i.e., thread and/or shank) of the blocking bolt 172 is unable to fit through the second mouth 78 except at the mouth cut-out 175. This restrains the blocking bolt 172 within the mouth cut-out 175. Therefore, the blocking bolt 172 prevents the second end 86 of the elongate member 80 from passing through the second mouth 78. More particularly the mouth cut-out 175 is positioned such that the second end 86 may be positioned within the engaging section 76 when the blocking bolt 172 is present. Therefore, the blocking bolt 172 allows positioning and movement of the first end 84 in the engaging section 76 of the second mouth 78 but prevents the second end 86 and thus elongate member 80 from becoming disengaged with the hook 72.

In some embodiments, the outer radius of the blocking bolt 172 body is the same or similar to the radius of the mouth cut-out 175.

The mouth cut-out 175 is described as being present in the second mouth 78. However, this may also prevent a second end 86 of an elongate member 80 being removed when engaged with the engaging section 76 of the first mouth 77. As described above, the first mouth 77 is positioned further toward the second edge engaging surface 38 of the second bracket 32 than the second mouth 78. Therefore, when engaged in the engaging section 76 of the first mouth 77, the second end 86 passes over the second mouth 78 as the elongate member 80 extends in a direction away from the second edge engaging surface 38. In particular, to engage with the engagement section 76 of the first mouth 77, the inner hoop of the second end 86 also loops over the second mouth 78. in some embodiments, the second end 86 is positioned over the engaging section 76 of the second mouth 78. Therefore, the blocking bolt 172 will likewise prevent removal of the second end 86 when engaged with the first mouth 77 as the second end 86 is prevented from unlooping over the second mouth 78.

This presently described configuration provides an advantage that a single blocking bolt 172 position, such as the mouth cut-out 175 needs to be provided for the multi mouth hook 72.

As with the earlier described configuration, a blocking washer 173 may be provided with the blocking bolt 172 to increase the radius and thus blocking.

Figure 56:
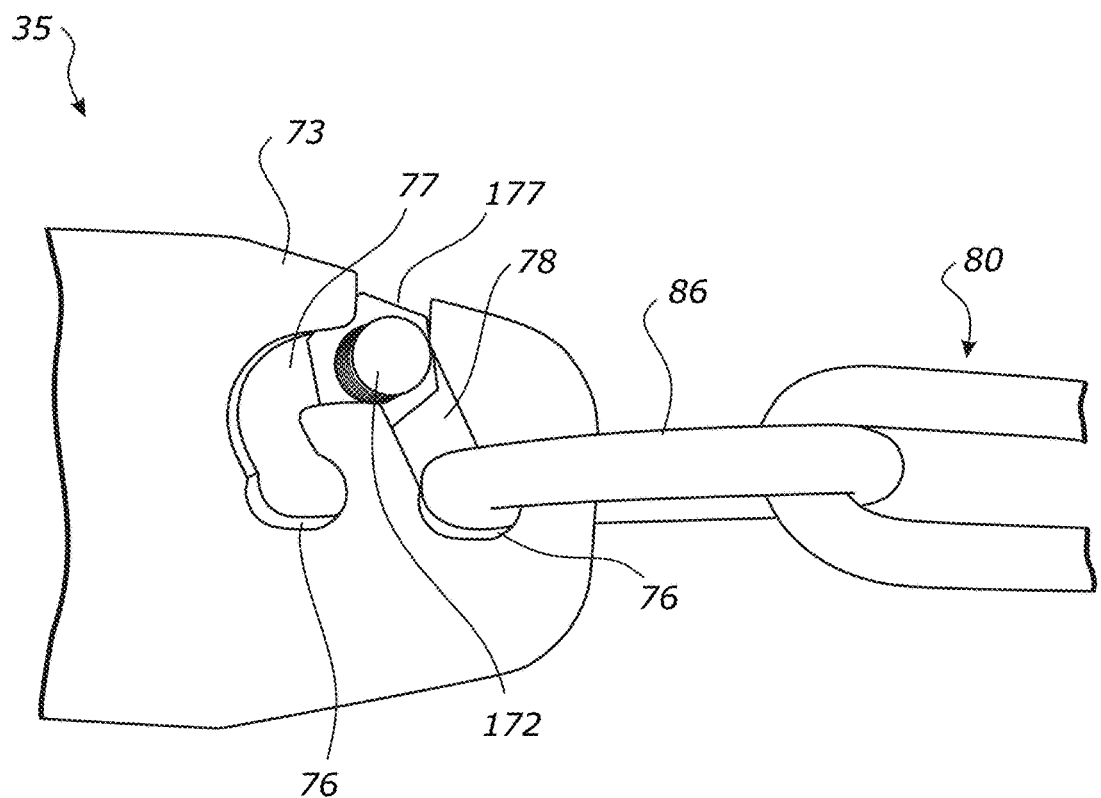
FIG. 56 is a top perspective view of an alternative configuration of a bracket and connector for use with the device of the figures in some configurations.
Figure 57:
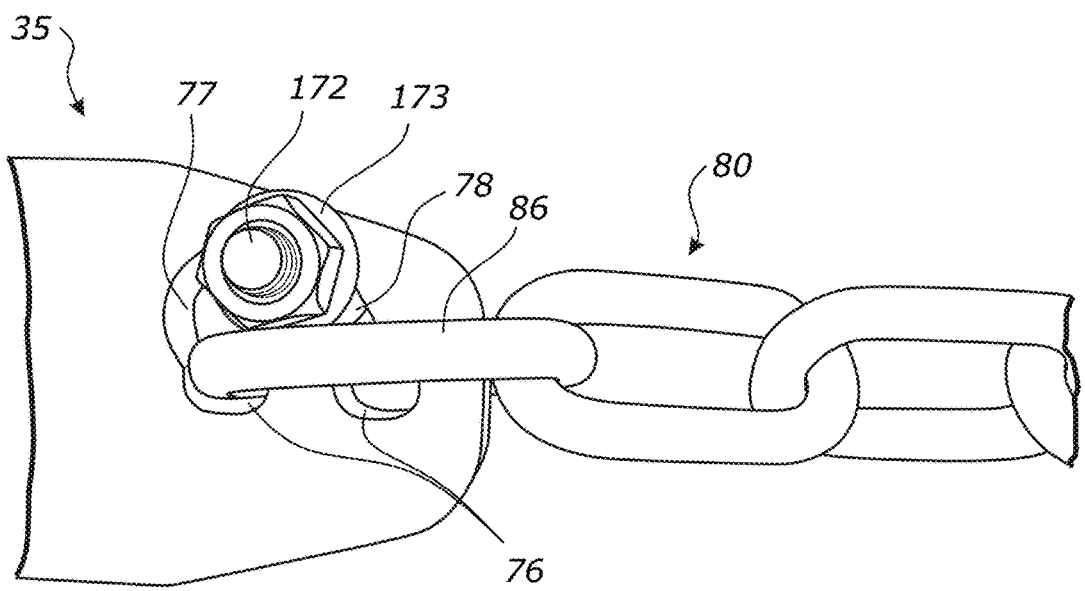
FIG. 57 is a top perspective view of the bracket of FIG. 56 in a different arrangement.

Referring to FIGS. 56 and 57, a second bracket 32 having a connector 35 with a connection member 70 in the form of the hooked connection member 72 is shown. In this configuration, a retaining arm 73 is provided similar to that described with reference to FIGS. 19 to 21.

In the configuration of FIGS. 56 and 57, a common mouth 177 is provided in the hooked connection member 72 that then splits or has further channels forming the first 77 and second 78 mouths. The retaining arm 73 forms part of the common mouth 177 such that a second end 86 must be hooked through the common mouth 177 before being directed to either the first or second mouth 77, 78 and the respective engaging sections 76.

The common mouth 177 is sized such that the blocking bolt 172 may not normally pass through the mouth. This is similar to the mouth, first mouth or second mouth 75, 77, 78 where the retaining bolt may not pass through the mouth as the mouth is too narrow. However, the position where the channels that form the common mouth 177 and the second mouth 78 and/or first mouth 77 meet is wider. This is because a three-way channel is formed by the common mouth 177 having branch channel to one of the first mouth 77 or second mouth 78. In some configurations, the common mouth 177 may split into the effect first mouth 77 and second mouth 78 at the same point having the same effect three-way channel.

The larger three-way channel is such that a retaining bolt may pass through the connector 35 at this point. Therefore, as described with reference to FIGS. 53 to 55, the blocking bolt 172 blocks the second end 86 of the elongate member 80 from being removed from an engaging portion 76 of the first or second mouth 77, 78 by blocking the common mouth 177.

As with the earlier described configuration, a blocking washer 173 may be provided with the blocking bolt 172 to increase the radius and thus blocking.

Either of the configurations of FIGS. 53 to 57 may be adapted to instead use the mouth adjacent through-hole 176 to block both of the mouths 77, 78 rather than positioning the blocking bolt 172 in one of the mouths.

The second bracket 32 has been described with reference to the multi-hook hooked connection member 72. However, the configuration may be used on a first bracket 12 with an appropriate adjustor 15.

The blocking bolt 172 prevents the easy removal of the elongate member 80. Not only does this prevent accidental disengagement of the elongate member 80 and the connector 35 or adjustor 15, but also increases the security of the device 10, such that an elongate member 80 may not be removed maliciously.

Figure 58:
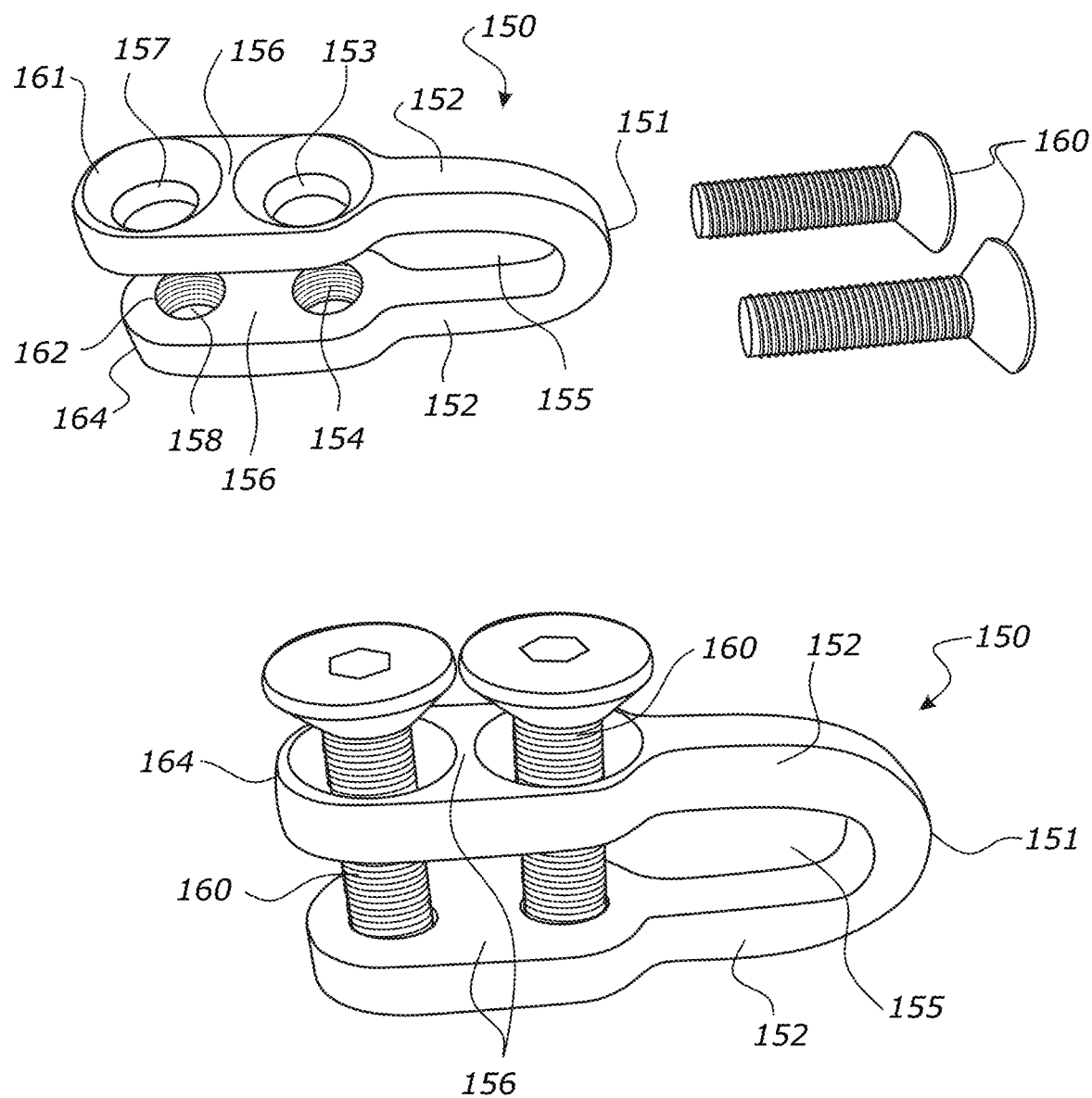
FIG. 58 is a perspective view exploded view of a shackle for use with the device of the figures in some configurations.

Referring to FIG. 58, a shackle 150 is provided. The shackle 150 comprises a substantially U-shaped body formed of a crown portion 151 having legs 152 extending from either side of the crown 151. Each leg (and component thereof) may be referred to as an opposing leg 152.

The space formed between the legs 152 and the crown 151 is an open portion 155. The open portion 155 is closable by a shackle bolt or pin 160 extending across the legs 152. Therefore, the mouth of the U-shaped body is closed by the shackle bolt or pin 160.

The crown 151 may be formed having a curved profile. In some configurations, the legs 152 may be substantially straight and extend substantially relatively parallel to one another. Therefore, the crown 151 may curved from the end of one leg 152 to the end of the other leg 152. Alternatively, the crown 151 may be other shapes, such as being substantially straight and forming a right angle with each leg 152.

The legs 152 are formed into a proximal portion 152 and a distal portion 156. The proximal portion 152 are connected to and/or proximal the crown 151. The distal portion 156 is connected to the proximal portion 152 at the end opposite to the crown 151. Therefore, the distal portion 156 is distal to the crown 151.

In some configurations, the proximal portion 152 and crown 151 are substantially of constant cross-section.

The distal portion 156 has a larger cross section (or dimension) relative to the proximal portion 152, or, in some configurations, at least part of the proximal portion 152. In some configurations, the larger cross-section of the distal portion 156 is in a single plane, such that the legs 152 when viewed from the front of the U-shape have a constant cross section, yet when viewed from the side of the U-shape widen from the proximal portion 152 to the distal portion 156. In some configurations, these planes may be reversed, in further configurations, the larger distal portion 156 may be larger in multiple planes.

A first hole 153 is formed in the distal section 156. The first hole 153 passes through the distal section 156 and faces the opposing distal section 156 of the opposing leg 152. A corresponding first hole 154 is formed in the opposing distal section 156. Therefore, the first hole 153 and corresponding first hole 154 face one another.

The first hole 153 and corresponding first hole 154 are concentric. Therefore, the first hole 153 and corresponding first hole 154 share a common axis that extends from one distal section 156 to the opposing distal section 156.

In some configuration, such as shown in FIG. 58, the first hole 153 and corresponding first hole 154 may be formed centrally in the distal portion 156, such that, when the U-shaped body is viewed from the side, the first hole 153 and corresponding first hole 154 are substantially horizontally central. In some configurations, the leg portion 152 extends vertically centrally from the distal portion 156.

The shackle bolt 160 is receivable in the first hole 153 and corresponding first hole 154. A common shackle bolt 160 may extend across the first hole 153 and corresponding first hole 154 to close the mouth of the shackle 150.

The shackle bolt 160 may be referred to as a pin.

A second hole 157 is formed in the same distal section 156 as the first hole 153. The second hole 157 passes through the distal section 156 and faces the opposing distal section 156 of the opposing leg 152. As shown in FIG. 58, in some configurations, the second hole 157 is formed at a distal end relative to the leg portion of the distal portion 156. The second hole 157 may be aligned with the first hole 153. Therefore, when viewed from the side of the U-shaped body, the first hole 153 and second hole 157 are vertically aligned.

A corresponding second hole 158 is formed in the opposing distal section 156. Therefore, the second hole 157 and corresponding second hole 158 face one another in a similar manner to the first hole 153 and corresponding first hole 154. In this regard, the corresponding first hole 154 and corresponding second hole 158 may be aligned and/or sized in the same manner as the first hole 153 and second hole 157 in the opposing distal portion 156.

The shackle bolt 160 is receivable in the second hole 157 and corresponding second hole 158. A common shackle bolt 160 may extend across the second hole 157 and corresponding second hole 158 to close the mouth of the shackle 150. Therefore, two shackle bolts 160 may be positioned in the shackle 150 to the close the mouth at the same, each shackle bolt 160 being positioned in respective first hole, corresponding first hole 153, 154 and second hole, corresponding second hole 157, 158 positions.

The shackle bolt 160 may be an elongate member, such as a pin, threaded bar, or bolt. A bolt head may restrain the shackle bolt 160 from passing through the respective holes 153, 154, 157, 158, or nuts may be used, or a combination thereof. Likewise, cotter pins or similar devices may be used to restrict movement of the shackle bolt 160 through the holes. At least one of the holes 153, 154, 157, 158 may be threaded 162 to correspond with a thread of a shackle bolt 160. Where a bolt head is present in the shackle bolt 160, the holes 153, 154, 157, 158 are positioned and/or the bolt head is sized as not to foul a corresponding bolt head from the adjacent shackle bolt 160. It is also possible for each shackle bolt 160 to be positioned at opposing sides of the distal portions 160, such that any bolt heads are adjacent to opposite sides of the body of the shackle 150. The shackle bolt 160 may be collared or have a shank. The distal portion may be a chamfered or indented portion 161 around the respective holes 153, 154, 157, 158 for receiving a bolt head or nut of the shackle bolt 160. This may allow the shackle bolt 160 to be flush with an outside edge of the shackle 150, e.g., outside edge of the distal portion 156.

In some configurations, the shackle 150 has a radiused distal edge 164, i.e. the edge of the distal portion 156 most distal to the proximal portion 152. The radius distal edge 164 allows an end 84, 86 of the elongate portion 80 to be able to be positioned at an angle comparatively with the shackle 150 as explained in more detail below.

Figure 59:
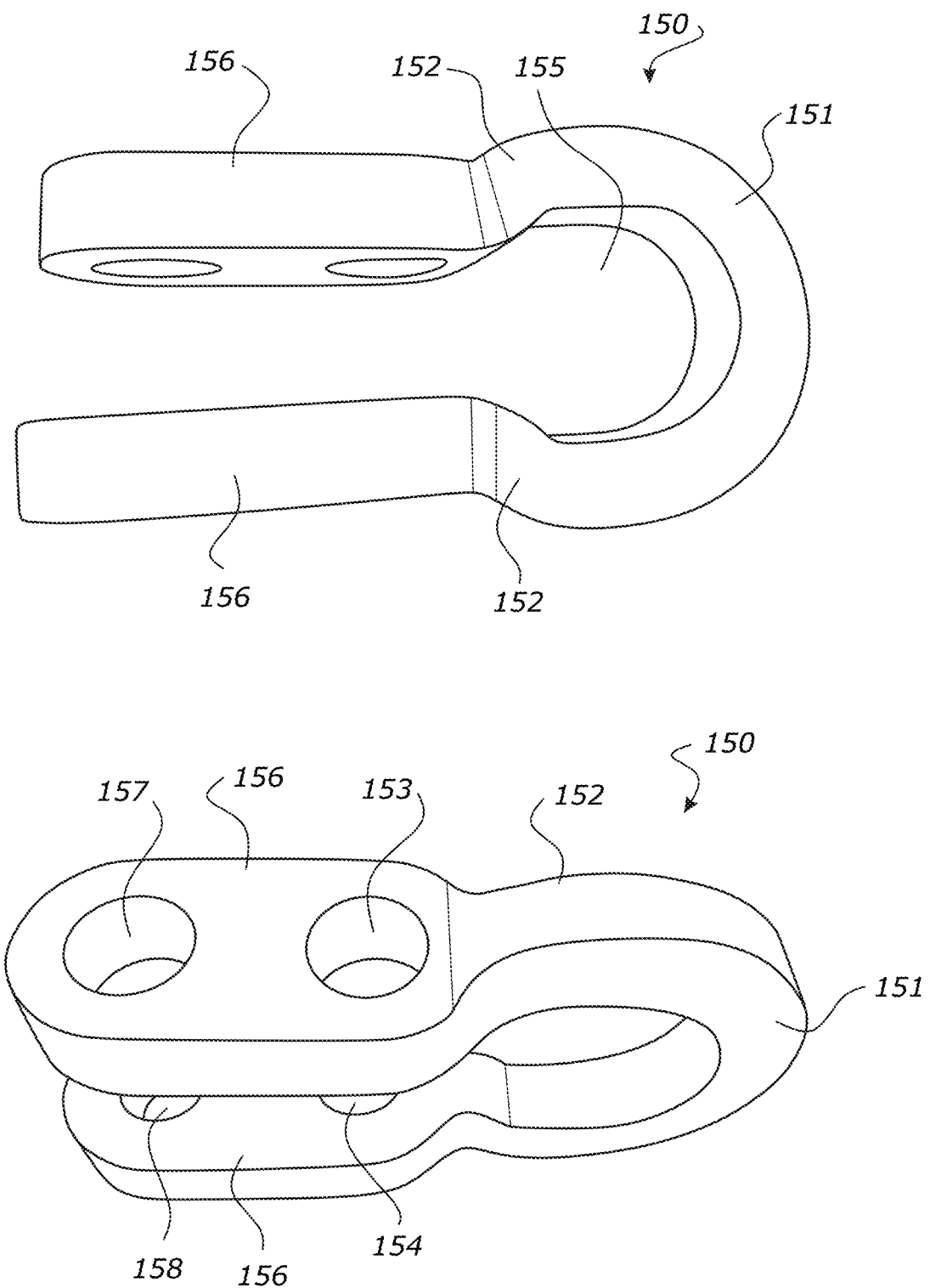
FIG. 59 is a perspective view of an alternative configuration of the shackle of FIG. 58.

Referring to FIG. 59, an alternative configuration of the shackle 150 of FIG. 58 is provided. The description of the shackle 150 is as previously provided. However, as illustrated in FIG. 58, where the crown 151 is formed having a curved profile, part of the legs 152 may also have a curved profile. Therefore, the distal portion 156 of the legs as previously described may be substantially straight and parallel. However, the proximal portion 152 of the legs have a curved portion that is wider than the distal portion 156 when the U-shaped body is viewed front the front. Therefore, the open portion of the shackle 155 is relatively wider than the distance between the distal portions 156. The proximal portion 152 curves back into the distal portion 156. This U-shaped body may be described as having a bulbous open portion 155.

Various curved portions are possible for the curved crown portion 151 and the curved proximal portion 152. However, in one configuration, the outside radius of the crown 151 and proximal portion(s) 152 is the same. In some configurations, only the proximal portion(s) 152 is curved.

The shackle 150 as described with reference to FIGS. 58 and 59 may be formed such that crown 151 has a substantially square cross section. Therefore, when the U-shaped body is viewed from the side, the crown 151 has flat sides and the top (and bottom) edge of the crown 151 is flat (as opposed to curved). Alternatively or additionally, the legs 152 or proximal portions 152 are also substantially square in cross section. This may follow the same cross section as the crown 151 such that when the U-shaped body is viewed from the side or top or bottom, the legs 152 have flat sides.

The distal portions 152 may be formed with relatively rectangular cross-sections. Therefore, when the U-shaped body is viewed from the front, the sides of each distal portion 156 is flat.

Whilst substantially square cross-sections have been described for the crown 151 and proximal portions 152, it will be appreciated that rectangular cross-sections are possible, or other polygonal shapes, or a circular or fully curved profile. A combination of different shapes may be provided in a single shackle 150.

Figure 60:
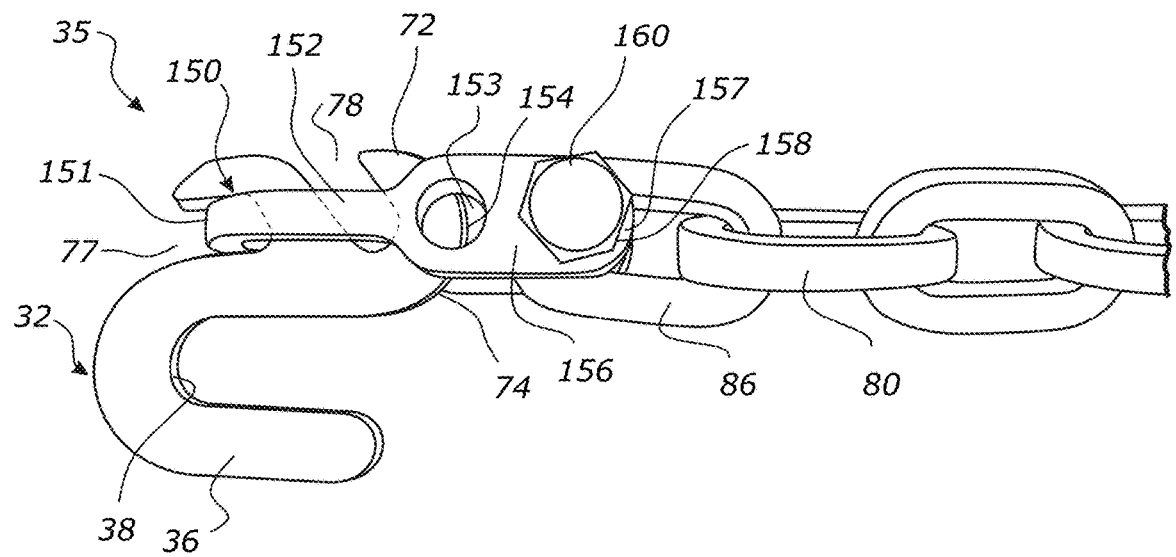
FIG. 60 is a side view of the shackle of FIG. 58 in combination with a connector of the figures in some configurations.
Figure 61:
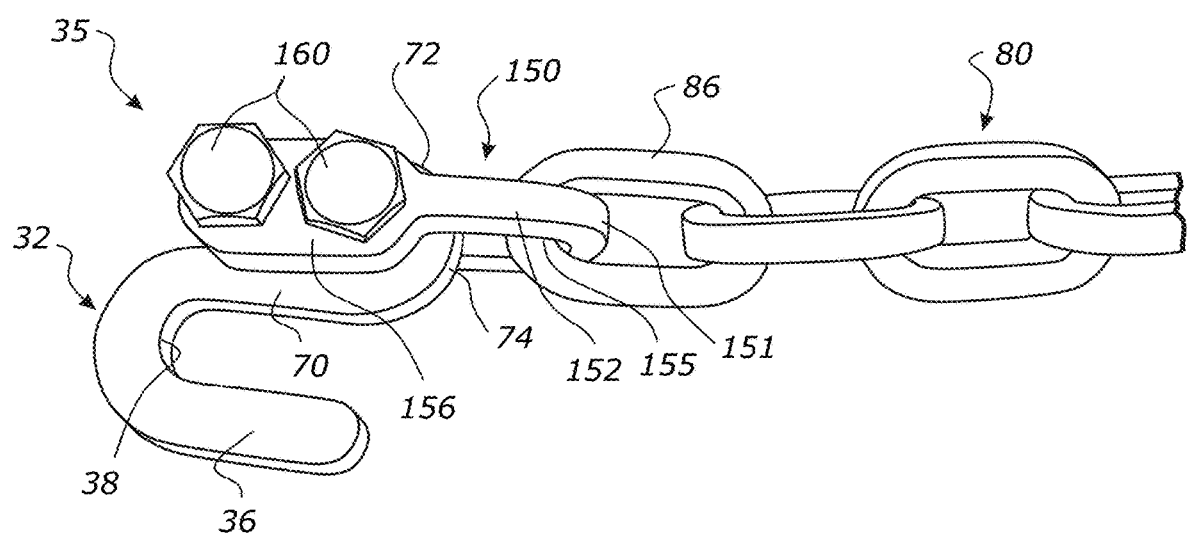
FIG. 61 is a side view of the shackle and connector of FIG. 60 in a different arrangement.

Referring to FIGS. 60 and 61, the connection member 70 (hooked connector member 72) of FIG. 29 is shown. In FIG. 29, and thus FIGS. 60 and 61, the second bracket 32 has the first hook 77 (or first mouth 77) arranged to position the elongate member 80 closer to the second edge engaging surface 38 when engaged than the second hook 78 (or second mouth 78). The first mouth 77 has its opening in a direction extending away from the track 202, i.e. toward the second edge engaging surface 38. The second mouth 78 has its opening in a direction between the rearward direction (like that of the first mouth 77) and the vertical direction. Further description of FIG. 29 applies to the connection member 70 of FIGS. 60 and 61.

Instead of the second end 86 (or first end 84) of the elongate member 80 interacting with the first and/or second mouths 77, 78, the shackle 150 engaging with the first mouth 77. As illustrated in FIG. 60, the crown 151 of the shackle 150 is positionable in the first mouth 77 (i.e. in the engaging portion 76). The shackle 150 is positionable such that the legs 152 extend over the second mouth 78 (i.e. in across the width of the track 202). Therefore, part of the open portion 155 of the shackle 150 is filled with the connector 70, 72.

The second hole 157 and corresponding second hole 158 at the end of distal portion 156 are positioned proud of (or protruding from) the connector 70, outside of the radiused portion 74. Therefore, the shackle bolt 160 may be positioned through the second hole 157 and corresponding second hole 158 to close the mouth of the shackle 150. The first or second end 84, 86 of the elongate member 80 may be looped around the shackle bolt 160 to secure or restrain the first or second end 84, 86 to the shackle 150.

In the case of a chain as the elongate member 80, one of the chain links may form the end 84, 86 that the shackle bolt passes through to secure it to the shackle 150. Therefore, the shackle bolt 160 passes through an inner loop of a chain link 84, 86 and the chain link 84, 86 is positioned between the legs 152, such as the distal portion 156, of the shackle 150 when secured to the connector 70, 72.

The arrangement allows different sized elongate members 80 or chains 80 to be connected to the connector 70, 72 where the size of the first or second mouth 77, 78 does not need to match the thickness of the chain link or other part of the elongate member 80.

Referring to FIG. 61, the connection member 70 (hooked connector member 72) of FIG. 29 is again shown. However, the orientation of the shackle 150 is changed. In this configuration, the shackle 150 is positionable such that the shackle bolts 160 engaged through the holes 153, 154, 157, 158 are each engaged with the respective first and second mouths 77, 78.

In this configuration, the shackle 150 is positionable such that the second hole 157 and corresponding second hole 158 are aligned with the first mouth 77. In some configurations, the common axis of the second hole 157 and corresponding second hole 158 are aligned with the engaging portion 76 of the first mouth 77. Therefore, the shackle bolt 160 passes through the second hole 157, corresponding second hole 158 and engaging portion 76 of the first mouth 77. Likewise, the first hole 153 and corresponding first hole 154 are aligned with the second mouth 78. In some configurations, the common axis of the first hole 153 and corresponding first hole 154 are aligned with the engaging portion 76 of the second mouth 78. Therefore, the shackle bolt 160 passes through the first hole 153, corresponding first hole 154 and engaging portion 76 of the second mouth 78.

With the shackle bolts 160 of the shackle 150 engaged in the engaging portions 76, the shackle 160 is secured in position on the hooked connector 72.

In this configuration, the first or second end 84, 86 of the elongate member 80 is securable to the shackle 150 around the crown 151. Namely, when the elongate member 80 is in the form of a chain, the crown 151 passes through the inner ring of the first or second end 84, 86. Therefore, the shackle 150 connects similar to a further link to the chain 80. To connect the shackle 150 to the chain 80, one of the legs 152 is passed through the centre of the chain link 82.

In the configuration of FIG. 61, the shackle 150 is secured to the hooked connector 72 at the first and second mouths 77, 78. Therefore, at least one shackle bolt 160 must be removed to remove the shackle 150 from the hooked connector 72. This increases the securement and security of the device 10.

The first mouth 77 and second mouth 78 may be any opening formed in the hooked connector 72 through which the shackle bolt 160 or crown 151 may be positioned. In some cases, the mouths 77, 78 do not need to extend to an edge of the hooked connector 72 to form the opening, but may instead be a through-hole for instance.

As with other embodiments, the hooked connector 72 may be part of an adjustor 15.

Figure 62:
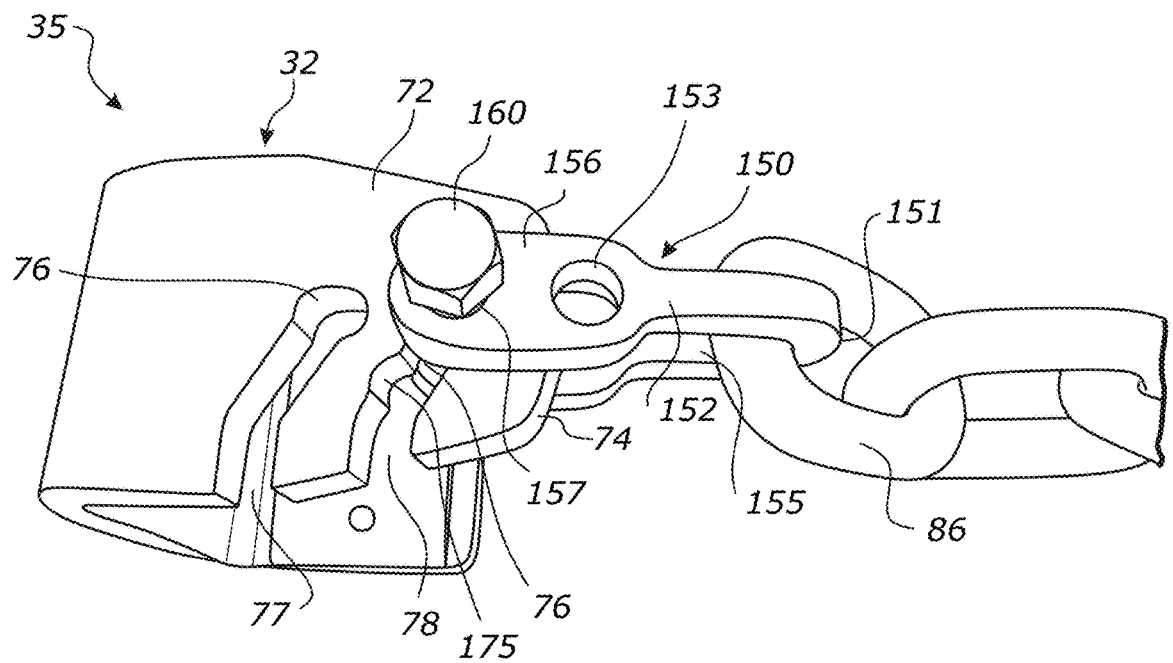
FIG. 62 is a perspective view of the shackle of FIG. 58 in combination with a connector of the figures in some configurations.
Figure 63:
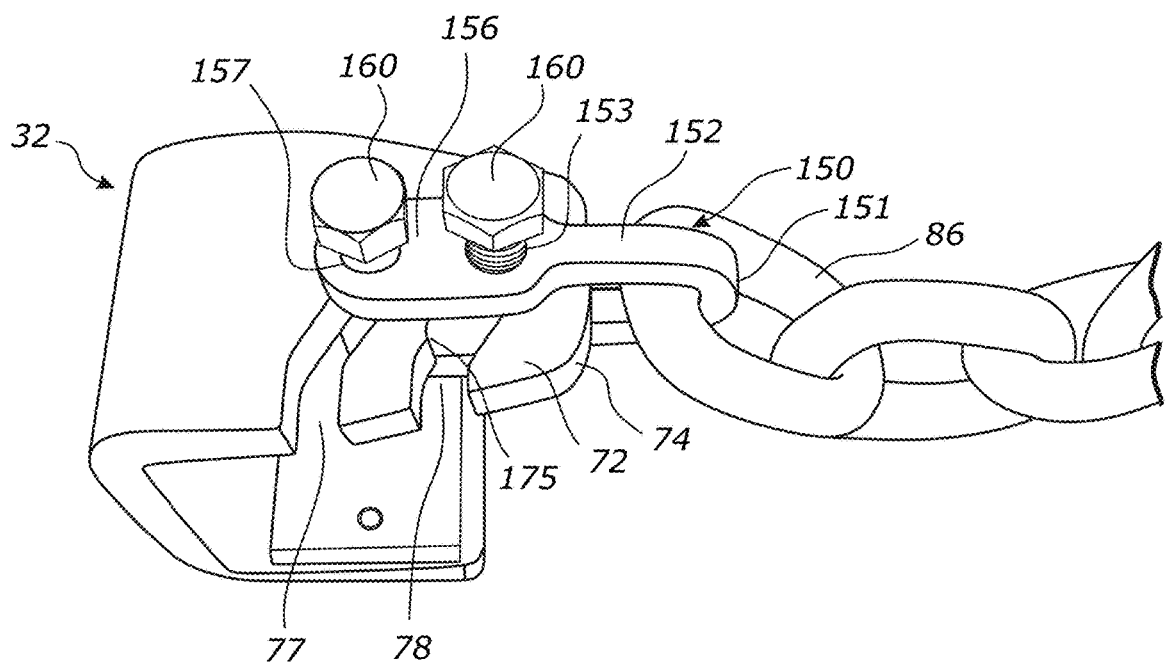
FIG. 63 is a perspective view of the shackle and connector of FIG. 62 in a different arrangement.

Referring to FIGS. 62 and 63, a hooked connector 72 is shown similar to that of FIG. 10B and discussed further with reference to FIGS. 53 to 55. Therefore, the description for those applies for FIGS. 62 and 63.

The hooked connector 72 additionally includes the mouth cut-out 175 as described with reference to FIG. 53 to 55.

In the configuration illustrated in FIG. 62, the shackle 150 is positionable such that the second hole 157 and corresponding second hole 158 are aligned with the second mouth 78. In some configurations, the common axis of the second hole 157 and corresponding second hole 158 are aligned with the engaging portion 76 of the second mouth 78. Therefore, when in position, the shackle bolt 160 passes through the second hole 157, corresponding second hole 158 and engaging portion 76 of the second mouth 78.

The shackle 150 is secured to the hooked connector 72 with a single shackle bolt 160.

In some configurations, the first hole 153 and corresponding first hole 154 extend away from the second bracket 32 (also hooked connector 72) in a direction substantially across the track 202. This may also be termed as being in a direction toward the opposing or first bracket 12. Likewise, the crown 151 of the shackle 150 extends away from the web or second edge engaging surface 38 of the second bracket 32. Therefore, the first hole 153 and corresponding first hole 154 are not aligned with the first mouth 77.

The crown 151 is engagable with the second end 86 of the elongate member 80. Therefore, the second end 86 is positionable in the open portion 155 of the shackle 150. In the case of a chain as the elongate member 80, the chain link is looped around one leg 152 of the shackle 150 to be positioned in the open portion 155.

This configuration allows for a larger end 84, 86 of an elongate member 80 to be engaged with the open portion 155 as more space is given by the first hole 153 and corresponding first hole 154 not being engaged with a shackle bolt 160. This configuration also allows for rotation of the shackle 150 relative to the hooked connector 72 as it is engaged at a single shackle bolt 160. This allows more flexibility for different angles of extension of the elongate member 80 across the track 202.

Referring to FIG. 63, in the configuration illustrated, the same hooked connector 72 as described above in FIG. 62 is provided. However, in this configuration, the shackle 150 is shown connectable with both the first mouth 77 and second mouth 78 using the shackle bolts 160.

Therefore, in this configuration the shackle 150 is positionable such that the second hole 157 and corresponding second hole 158 are aligned with the first mouth 77. In some configurations, the common axis of the second hole 157 and corresponding second hole 158 are aligned with the engaging portion 76 of the first mouth 77. Therefore, the shackle bolt 160 passes through the second hole 157, corresponding second hole 158 and engaging portion 76 of the first mouth 77. Likewise, the first hole 153 and corresponding first hole 154 are aligned with the second mouth 78. In some configurations, the common axis of the first hole 153 and corresponding first hole 154 are aligned with the engaging portion 76 of the second mouth 78. Therefore, the shackle bolt 160 passes through the first hole 153, corresponding first hole 154 and engaging portion 76 of the second mouth 78.

The shackle 150 is orientated in the same direction, such that the crown 151 is engagable with the second end 186 of the elongate member 80. However, the size open portion 155 of the shackle 150 is reduced relative to the configuration of FIG. 62 as the distal portion 156 of the shackle 150 is further engaged with the body of the hooked connector 72.

As the shackle 150 is secured at two points, i.e. two shackle bolts 160 at the first and second mouths 77, 78, the shackle 150 cannot be angled or rotated relative to the hooked connector 72. Therefore, it may be considered to have additional securement. The securement is also increased by having an additional shackle bolt 160 for the connection.

The mouth cut out 175 may also be used to further secure the shackle 150. However, in some configurations, the shackle 150 fouls the space provided for the blocking bolt 172.

As with the configuration of FIGS. 60 and 61, in some configurations of FIGS. 62 and 63, the crown 151 may be positionable in at least one of the mouths 77, 78. Therefore, the crown 151 may be slidable through at least one of the mouths 77, 78.

As with other embodiments, the hooked connector 72 may be part of an adjustor 15.

Referring to FIGS. 64 to 67, an alternative configuration of a second bracket 32 connector 35, alternative connector plate 140, is shown. As discussed above with reference to FIGS. 60 and 61, the first and second mouths 77, 78 were described as being closed mouths, as in they did not extend to the edge of the top flange 74. Therefore, they may be considered as through holes. In the configuration of FIGS. 64 to 67, such mouths are provided.

In this configuration the alternative connector plate 140 is has a top flange or plate 34 as described elsewhere herein with reference to the second bracket 32. The alternative connector plate 140 has a through hole 145 formed as a hole through the plate 34.

The through hole 145 is sized such that a shackle bolt 160 may pass therethrough.

The alternative connector plate 140 sized to allow the legs 152 of the shackle 150 to extend around the alternative connector plate 140, i.e., one leg 152 is above the plate 140 and one leg 152 is below the plate 140.

Figure 65:
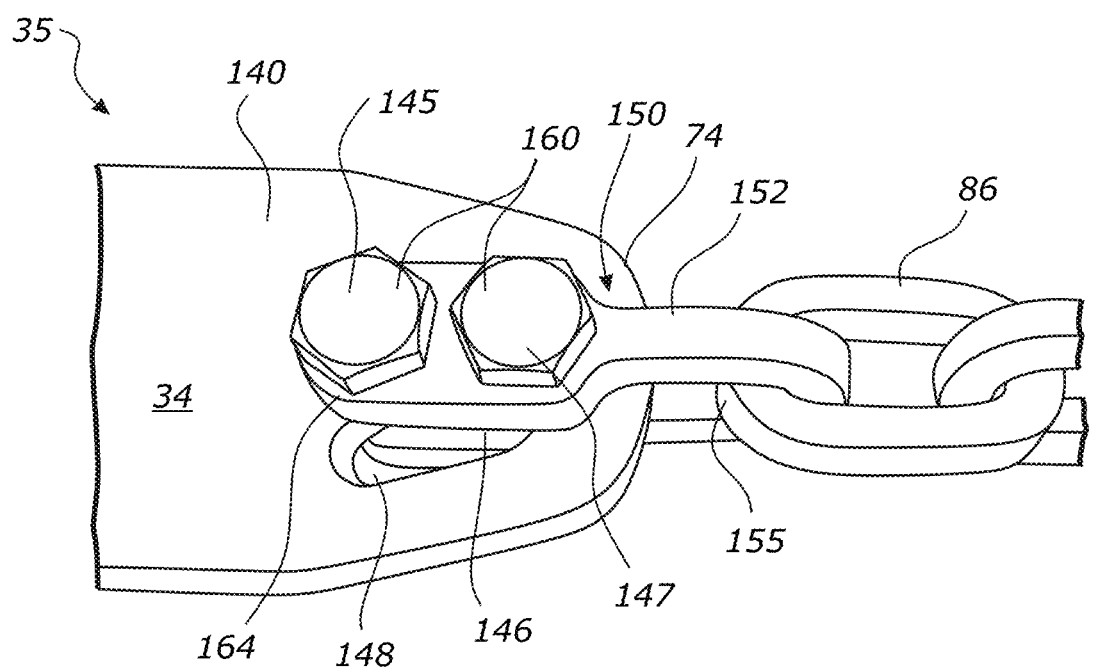
FIG. 65 is a top perspective view of the connector of FIG. 64 in use with a shackle and elongate member of the figures in some configurations.
Figure 66:
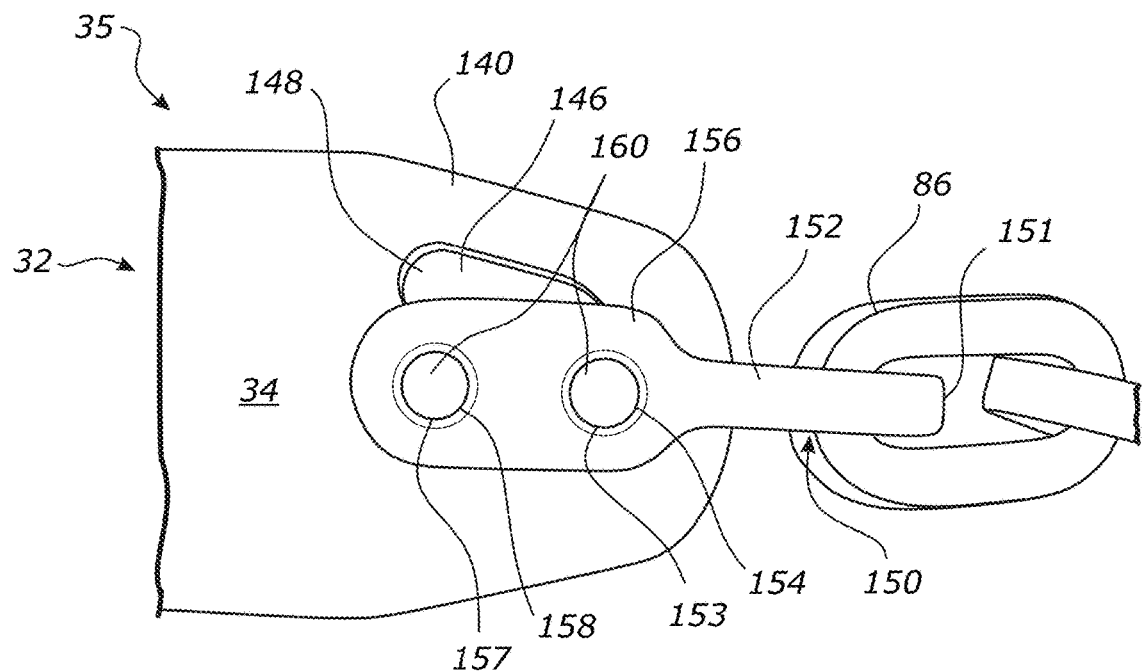
FIG. 66 is a bottom view of FIG. 65.

As illustrated in FIGS. 65 and 66, the through hole 145 is positioned on the alternative connector plate 140 such that the shackle 150 is positionable to allow the second hole 157 and corresponding second hole 158 to be aligned with the through hole 145. Therefore, the shackle bolt 160 is able to pass through the second hole 157, corresponding second hole 158 and through hole 145 to secure the shackle 150 to the through hole 145 and thus the alternative connector plate 140.

In this regard, the through hole 145 may be similar to the engaging portion 76 of the first mouth 77 as described with reference to FIGS. 60 to 63.

The through hole 145 may be positioned distal to the web 38 or second engaging surface 38. Preferably, the through hole 145 is positioned on the plate such that the legs 152 are able to straddle from an edge of the plate 140 to align the second hole 157 with the through hole 145 whilst leaving sufficient space for the open portion 155. More preferably, at most substantially 80% of the leg 152 extends over the plate 140 when the through hole 145 is engaged with the second hole 157. The extension is in a direction substantially directly away from the web 38 or second engaging surface 38. Alternatively, or additionally, the through hole 145 may be substantially centrally positioned in at least one axis of the plane of the plate 140. This axis may be normal to the extension of the legs 152 in the same plane as the plate 140.

Referring back to FIG. 64, an elongated through hole 146 may be formed in the alternative connector plate 140. The elongated through hole 146 is a through hole that is distinct to the previously described through hole 145.

The elongated through hole 146 is sized such that a shackle bolt 160 may pass therethrough.

More particularly, in some configurations, the elongated through hole 146 has an engaging portion 147 formed as part of the elongated through hole 146 for engaging with a shackle bolt 160.

As illustrated in FIGS. 65 and 66, the engaging portion 147 is positioned such that either the second hole 157 and corresponding second hole 158 are alignable with the engaging portion 147, or that the first hole 153 and first corresponding hole 154 are alignable with the engaging portion 147. Therefore, the shackle bolt 160 is able to pass through either the first hole 153 or the second hole 157, to secure the shackle 150 to the engaging portion 147 and thus the alternative connector plate 140.

In this regard, the elongated through hole 146 and engaging portion 147 may be considered similar in function to the engaging portion 76 of the second mouth 78 as described with reference to FIGS. 60 to 63.

The engaging portion 147 may be relatively closer to an edge of the plate 140 than the through hole 145.

Both the through hole 145 and the engaging portion 147 may be engagable at the same time by a single shackle 150 with shackle bolts 160 through the respective through hole 145 and engaging portion 147 of the plate 140. Therefore, the first hole 153 is alignable (and engageable) with the through hole 145 at the same time that the second hole 157 is alignable (and engageable) with the engaging portion 147.

The engaging portion 147 may be positioned distal from the web 38 or second engaging surface 38. Preferably, the engaging portion 147 is more distal from web 38 than the through hole 145. Preferably, the engaging portion 147 is positioned on the plate such that the legs 152 are able to straddle from an edge of the plate 140 to align the first hole 153 with the engaging portion 147 whilst leaving sufficient space for the open portion 155. More preferably, at most substantially 80% of the leg 152 extends over the plate 140 when the engaging portion 147 is engaged with the first hole 153.

The extension is in a direction substantially directly away from the web 38 or second engaging surface 38. Alternatively, or additionally, the engaging portion 147 may be substantially centrally positioned in at least one axis of the plane of the plate 140. This axis may be normal to the extension of the legs 152 in the same plane as the plate 140. This position may be aligned with the through hole 145.

The through hole 145 and elongated through hole 146 allow the engagement and securing of a shackle 150 to the alternative connector plate 140. The crown 151 and thus open portion 155 of the shackle 150 is engageable with the second end 86 of an elongate member 80 as described above with reference to FIGS. 60 to 63. As there are no mouth 77, 78 extending to the edge of the plate 140, the shackle bolts 160 are unable to be removed from the plate 140 other than by unfastening and disengaging the shackle bolts 160.

Figure 64:
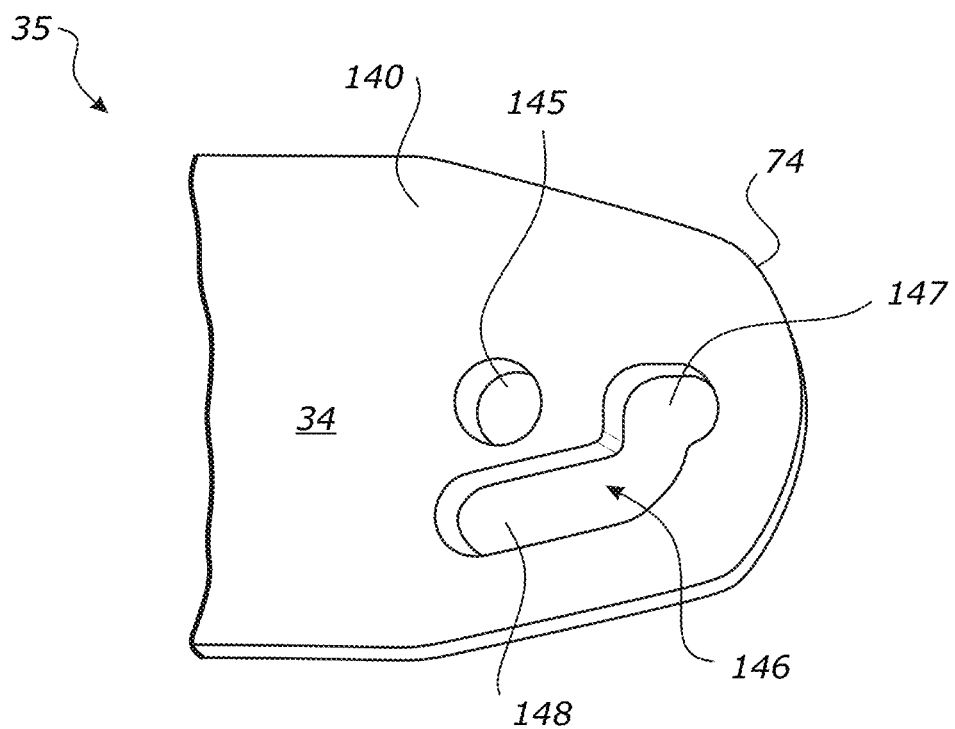
FIG. 64 is a top view of an alternative configuration of a connector for use with the device of the figures in some configurations.

As illustrated in FIG. 64, in some configurations, the elongated through hole 146 comprises an engaging portion 147 and an arm section 148. The engaging portion 147 and arm section 148 are connected. The arm section 148 is a through slot (e.g. through hole or opening that passes through one side of the plate 140 to the other). The arm section 148 is formed away from an edge of the plate 140.

The arm section 148 is formed as an elongate slot and is shaped to allow the distal portion 156 of the legs 152 of the shackle 150 to pass there through. Therefore, the arm section 148 is at least as long as the width of the distal leg 156 when the shackle is viewed from the side (i.e. the side of the U-shaped body). Likewise, the width of the arm section 148 is at least as thick as one of the distal legs when the shackle 150 is viewed from the front (i.e. the front of the U-shaped body).

Therefore, the size and/or shape of the arm section 148 opening is at least the same as a horizontal cross-section of the distal section 156 of the shackle 150.

The shape of the arm section 148 allows a distal portion 156 to pass therethrough. Therefore, the shackle 150 may be threaded around the arm section 148 of the plate 140. The crown 151 is engageable with the arm section 148 and, more particularly, the crown 151 may be moveably positioned around the elongated through hole 146 such as at the engaging portion 147.

Figure 67:
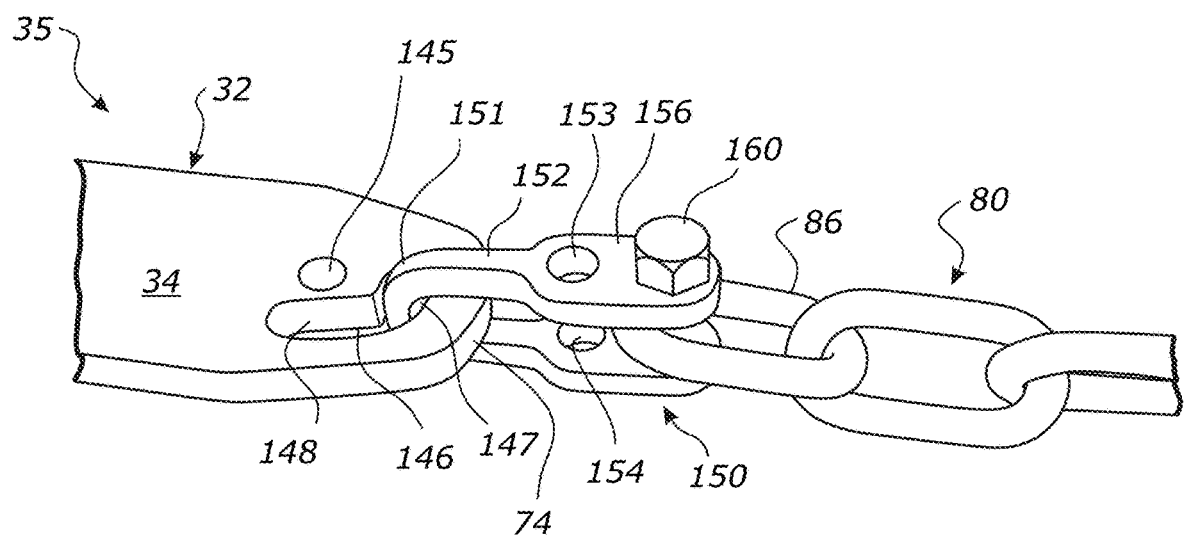
FIG. 67 is a perspective view the connector of FIG. 64 in use with a shackle and elongate member of the figures in some configurations in a different arrangement.

As shown in FIG. 67, the crown 151 may be engageable with the engaging portion 147 such that the legs 152 extend outwardly from the plate 140. Therefore, the second end 86 of the elongate member 80 is engageable with the legs 151 of the shackle 150 such that, for instance, a shackle bolt 160 when engaged with the holes 153, 154, 157, 158 of the shackle 150 passes through the inner ring of a chain link.

Such a configuration allows for a reconfigurable arrangement to allow an elongate member 80 to be connected to the shackle 150 in multiple ways. For instance, a chain link may be sized such that a leg 151 of the shackle 150 does not pass through the inner ring of a chain link, therefore, the shackle bolt 160 may instead be used to retain the chain link in connection with the shackle 150. The elongate member may be connected at either one of the shackle bolt 160 points, i.e. the first hole 153 or second hole 157.

The engaging portion 147 may be shaped the same as a shackle bolt 160. Alternatively, the engaging portion 147 may be slightly elongated to encourage a shackle bolt 160 or crown 151 to engage within a specific part of the engaging portion 147. This may assist with retaining the shackle bolt 160 or engaging portion 147 in the engaging portion 147 when in use with an elongate member 80 and to stop movement along the arm section 148. Additionally or alternatively, the engaging portion 147 may be elongate in a direction toward (or away from) the through hole 145. This may provide additional tolerance for connecting two shackle bolts 160.

The arm section 148 may be shaped in any direction away from the engaging portion 147. However, preferably, in some configurations, the arm section 148 is positioned at an angle from the engaging portion 147, such as in an L shape. This may additionally secure the shackle bolt 160 or crown 151 from moving or slipping along the elongated through hole 146 when engaged with the elongate member 80. In some configurations, the arm section 148 extends past the through hole 145. This may be in a direction substantially toward the web 38 or edge engaging surface 38.

As shown in FIGS. 65 and 66, the shackle bolts 160 when engaged with the shackle 150 in the plate 140 may be flush with the surface of the distal portion 156 and/or may have a part or bolt head that is proud of (or protruding from) the surface of the distal portion 156. The shackle 150 and shackle bolts 160 may be arranged in any configuration such that a flush part or proud part (protruding part) is in contact with a surface of the track 202. This may assist with retaining the bolts 160 in position. This is also applicable when in the configuration where the crown 151 engages with the plate 140 and thus the shackle bolt(s) 160 are engageable with the elongate member 80.

Figure 68:
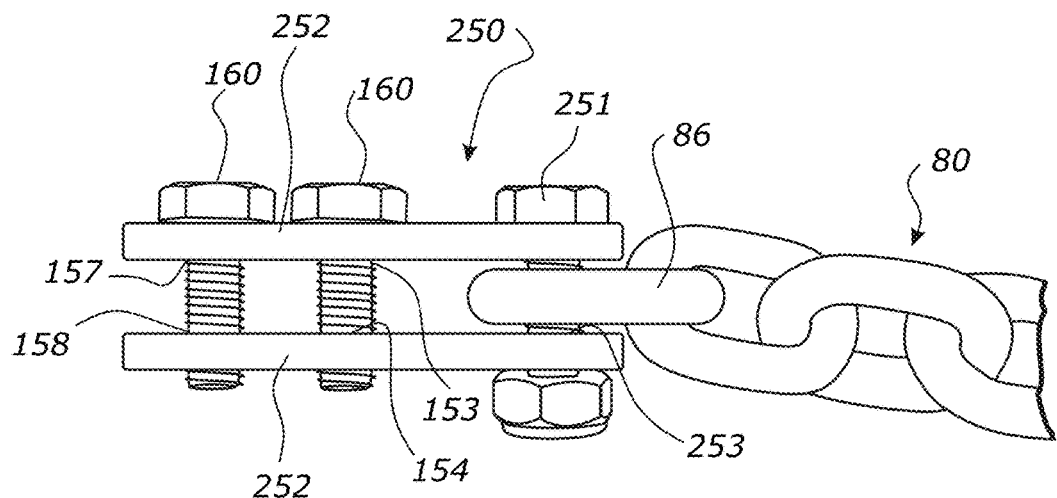
FIG. 68 is a top perspective view of an alternative configuration of the shackle of FIG. 58.

Referring to FIG. 68, whilst a shackle 150 has been described above with reference to a crown 151, in this configuration an alternative shackle 250 is provided. The alternative shackle 250 may be termed a bolt shackle 250 as the crown is replaced by a crown bolt 251. Otherwise, the description as provided above for the shackle 150 applies here.

In the configuration of FIG. 68, two shackle legs 252 are provided as elongate plates. The first and second holes 153, 157 are provided at one end of one of the legs 252. Likewise, corresponding first and second holes 154, 158 are provided at one end of the other leg 252. These allow the engagement of a shackle bolt 160 as described above. In contrast to the shackle 150, the bolt shackle 250 has a crown hole 253 formed at the opposing end of each leg 252 to the first, second and corresponding holes 153, 154, 157, 158. The crown hole 253 of each leg 252 is sized to receive the chain link bolt 251. The chain link bolt 251 may extend between crown holes 253 of each leg 252. Therefore, the chain link bolt 251 effectively fulfils the same function as the crown 151 by enclosing an open portion 155 of the shackle 150, 250. The chain link bolt 251 may be held in position by a nut or a screw thread.

The bolt shackle 250 provides additional flexibility where a space larger than a fixed crown 151 of a shackle 150 may provide. This may be advantageous for a particularly thick elongate member 80, such as a thick chain link. There may also be manufacturing benefits as the legs 252 of the bolt shackle 250 may have a consistent cross-section throughout as holes 251, 153, 157 are required at each end of the legs 252.

The chain link bolt 251 also does not require threading through an arm section 148 of an alternative connector plate 140 as the chain link bolt 251 may be removed from the leg 252 for attaching to the plate 140. Therefore, additional flexibility is provided in the bolt shackle 250.

Figure 69:
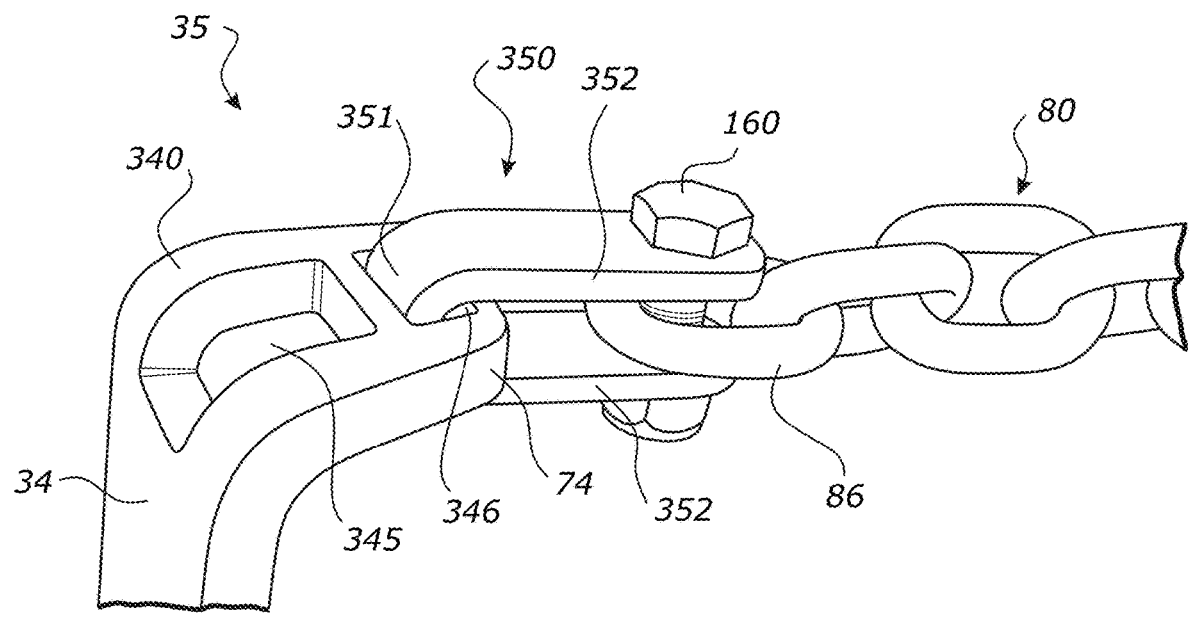
FIG. 69 is a side perspective view of an alternative configuration of a connector and shackle of the figures.

Referring to FIG. 69, a further alternative connector plate 340 is shown. This is similar to the hooked connector 72 or alternative connector plate 140 described above and like features share the description for those configurations.

The further alternative connector plate 340 replaces the through hole 145 with a first slot 345. The first slot 345 is a through hole and is shaped rectangular or square through the plate 340 in profile. The plate 340 is provided with a second slot 346 that effectively replaces the elongated through hole 146. The second slot 346 is a through hole and is shaped rectangular or square through the plate 340 in profile.

The first slot 345 and second slot 346 are formed separately to one another with one slot closer to the web 38 or edge engaging surface 38 of the bracket 32 than the other. The longest length of the slot 345, 346 is generally formed perpendicular to the direction of web 38 along the plane of the plate 340.

The first slot 345 and second slot 346 are formed to be connectable to an alternative configuration of a shackle 150 in the form of a U-plate shackle 350. The U-plate shackle 350 is formed as a plate-like body having a continuous cross section throughout. The U-plate shackle 350 has a crown 351 extending to parallel extending legs 352 on either side of the crown 351.

The legs 352 have holes extending therethrough for receiving a shackle bolt 160. Therefore, the U-plate shackle 350 is similar in configuration to the shackle 150. However, the U-plate shackle 350 does not have the change in cross-sectional profile.

The first slot 345 and second slot 346 are sized to receive one of the legs 352 of the U-plate shackle 350. This allows the U-plate shackle 350 is feedable around at least one of the slots 345, 346 to allow the crown 351 of the U-plate shackle 350 to align with either the first slot 345 or second slot 346. This is similar to the crown 151 of the shackle 150 aligning with the engaging portion 147 of the alternative connector plate 140 of FIG. 67.

Whilst a single shackle bolt 160 and corresponding holes are shown in FIG. 69, additional holes may be provided to allow for multiple shackle bolts 160 in a similar manner to the shackle 150.

The U-plate shackle 350 may provide a more rigid connector, such as where rotation of the U-plate shackle 350 is not required relative to the plate 340.

Figure 70:
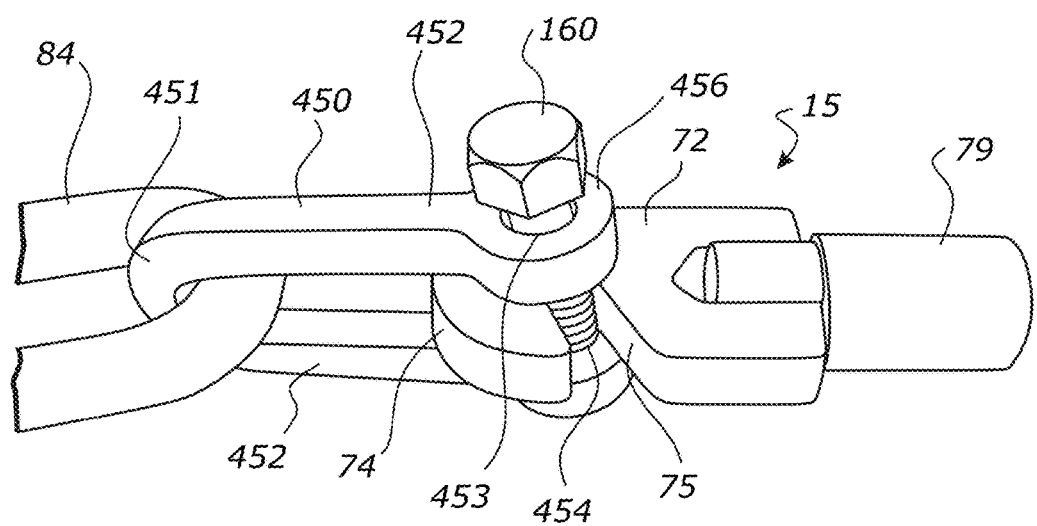
FIG. 70 is a perspective view of an alternative configuration of a shackle of FIG. 58 in combination with an adjustor and elongate member of the figures in some configurations.

Referring to FIG. 70, an alternative configuration of a D-shackle 450 is provided. Where the alternative D-shackle 450 shares features with the shackle 150, the description may be applied to present configuration.

The alternative D-shackle 450 is formed similarly to the shackle 150 and comprises a crown 451 connected to legs 452 extending substantially parallel from either end of the crown 451. The shackle crown 451 and legs 451 are formed with a substantially square cross-sectional profile similar to the shackle 150 of FIG. 58.

The alternative D-shackle 450 has a distal leg portion 456 extending from each of the legs 452. Therefore, it may be considered that the leg 452 has a proximal portion 452 near (proximal) the crown 451 and a distal portion 456 far from (distal) the crown 451. The distal portion 456 has a different cross-sectional profile to the proximal portion 452. The distal portion 456 is sized to accommodate a hole 453 in one of the legs 452 and an axially aligned corresponding hole 454 in the other leg 452. The holes 453, 454 are sized to receive a shackle bolt 160. Therefore, the shackle bolt 156 closes the open body of the shackle 450.

Therefore, the alternative D-shackle 450 is substantially similar to the shackle 150 whilst accommodating a single shackle bolt 160. Additionally, as shown in FIG. 70, the alternative D-shackle 450 is connected at its crown 451 to the first end 84 of the elongate member 80. Further, the shackle bolt 160 whilst engaged with the hole 453 and corresponding hole 454 is also engaged with an adjustor 15.

The adjustor 15 of FIG. 70 includes a collar 79 connected to a hooked connector 72. Therefore, the hooked connector 72 is adjustable by the collar 79 extending along a threaded bar 62 (not shown). This configuration may be applied to any of the hooked connectors 72 described herein to allow for adjustment.

The hooked connected 72 in this configuration has a single mouth portion 75. Within the mouth portion, the shackle bolt 160 of the alternative D-shackle 450 is engaged. The shackle bolt 160 is engaged with the engaging section 76 of the mouth portion 75. Therefore, the engaging portion 76 is sixed to receive the shackle bolt 160.

In some configurations, the engaging portion 76 may be sized to receive the shackle bolt 160 whilst the mouth portion 75 (or first and second mouth 77, 78 where applicable) are too small or narrow to receive a shackle bolt 160. Therefore, the shackle bolt 160 is restrained in the engaging portion 76 whilst engaged in the hole 453 and corresponding hole 454.

The shackles 150, 250, 350 of FIGS. 58, 59, 68 and 69 may likewise be engaged with the hooked connector 72 in a similar manner.

The mouths referred to herein, including the mouth 75, first mouth 77, second mouth 78, through hole 145, elongated through hole 146, first slot 345, second slot 346 and corresponding holes may all be referred to as openings.

Whilst the term through-hole is used herein, this is to mean a hole formed through a surface from one side to an opposing side. However, it does not limit the through-hole from being a slot or other shape.

Referring to FIGS. 71 to 74, means for retaining the shackle bolt 160 on any of the shackles, such as the shackle 150 of FIG. 58 or shackle 50 of FIG. 1 are described.

Figure 71:
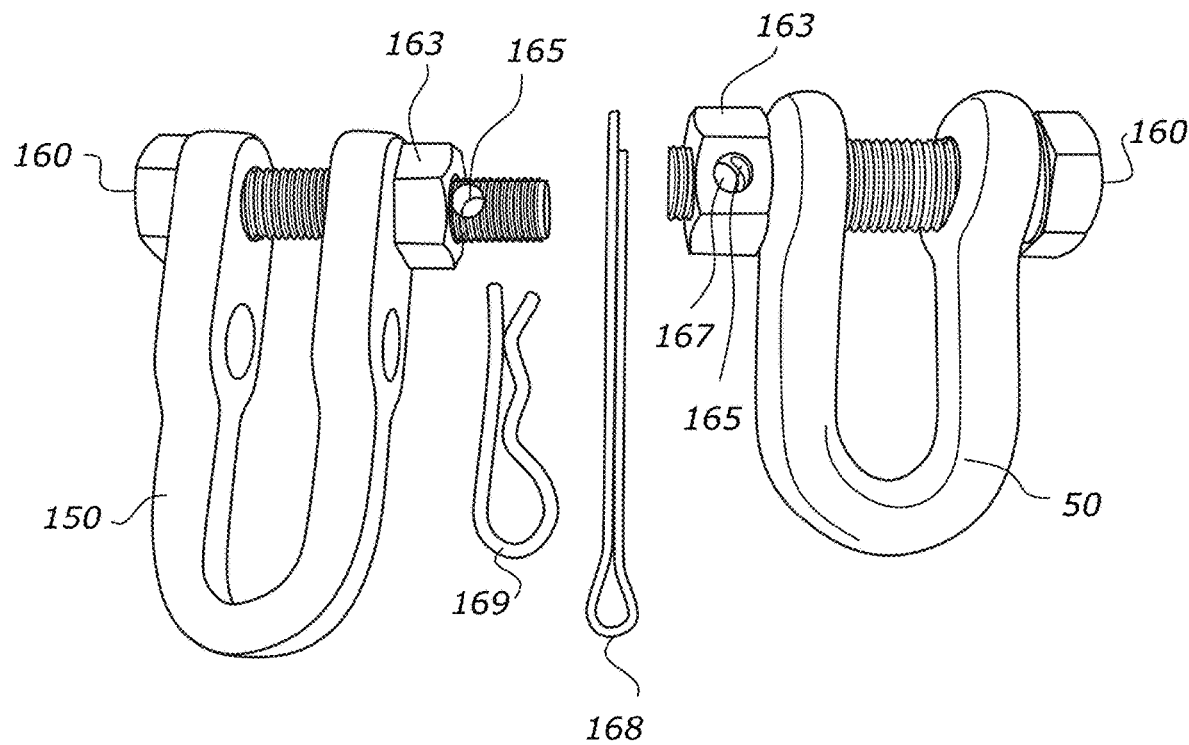
FIG. 71 is a top perspective view of the shackles of the figures in combination with cotter pins.

FIG. 71 shows the shackle bolt 160 engaged with the shackle 150. The shackle bolt 160 has a through hole in the bolt thread 165. The through hole in the bolt thread 165 is positioned such that when a shackle nut 163 is engaged with the shackle bolt 160 on the shackle 150, the through hole in the bolt thread 165 is exposed on an outer side of the shackle nut 163.

The through hole in the bolt thread 165 allows for the shackle nut 163 to be retained on the shackle bolt 160 by a pin passing through the through hole in the bolt thread 165. Such a pin may be a split pin 168, also referred to as a cotter pin 168.

The cotter pin 168 may pass through the through hole in the bolt thread 165 and then have its arms bent or deformed to prevent removal from the through hole in the bolt thread 165 when passed therethrough.

Alternatively, the pin may be an R-shaped pin 169. The R-shaped pin 169 may be retained in the through hole in the bolt thread 165 by an arm of the R-shaped pin 169 being bent or deformed around the shackle bolt 160 and the other arm passing through the through hole in the bolt thread 165.

Removal of the shackle nut 163 is prevented whilst either of the pins 168, 169 are in position.

The through-hole does not need to be limited to the shackle bolt 160. Still referring to FIG. 71, the shackle 50 has the shackle bolt 160 engaged therethrough with a shackle nut 163 secured to the shackle bolt 160 to retain it on the shackle 50. The through hole in the bolt thread 165 is present. Additionally, a through hole in the nut 167 is also present. The through hole in the bolt thread 165 and through hole in the nut 167 must be aligned ton allow one of the pins 168, 169 to pass therethrough. Therefore, the through hole in the bolt thread 165 is positioned closer to the head of the shackle bolt 160 to align with the shackle nut 163 and thus through hole in the nut 167 when the shackle nut 163 is engaged with the shackle bolt 160.

The through hole in the bolt thread 165 aligned with the through hole in the nut 167 is retained in a similar manner. However, when engaged with one of the pins 168, 169, the shackle nut 163 is unable to rotate out of alignment with the through hole in the bolt thread 165 as this will foul upon the pin 168, 169 when engaged in the through holes 165, 167.

Referring to FIG. 72, the shackle 150 is shown with two shackle bolts 160 engaged. Each of the shackle bolts has a through hole in the bolt head 166. The through hole in the bolt head 166 of each shackle bolt 160 is substantially aligned or concentric. Therefore, in some arrangements, each through hole in the bolt head 166 substantially share a common axis.

Referring to FIG. 73, the cotter pin 168 is shown passing through both of the through holes in the bolt heads 166 of the shackle bolt 160. Therefore, the shackle bolts 160 are preventing from rotating, such as to be unscrewed, as this will bring each through hole in the bolt head 166 out of alignment and foul the cotter pin 168. Therefore, the pair of shackle bolts 160 are held in position whilst the cotter pin 168 is engaged through the through hole in the bolt head 166.

Referring to FIG. 74, alternatives to the cotter pin 168 and R-shaped pin 169 are provided. These are shown in combination with the through hole in the bolt head 166 but may be applied to the other through holes 165, 167.

A wire hoop 268 is provided that this engageable with the through hole in the bolt head 166. The wire hoop 268 being a hoop formed of wire or other elongate material that may pass through the through hole in the bolt head 166. The wire hoop 268 forms a hoop on the outside of the shackle bolt 160 when engaged with the through hole in the bolt head 166. The wire hoop 268 may provide a handle-like device for tightening the shackle bolt 160. It may also form a hoop for engaging with a pin 168, 169 passing through the through hole in the bolt head 166 of a shackle bolt 160 next to the shackle bolt 160 with the wire hoop 268.

Additionally, or alternatively, a locking nail 269 may be provided. The locking nail 269 is a substantially straight rigid nail that is engageable through the through hole in the bolt head 166 (or other through hole 165, 167). The locking nail 269 may be alignable with a wire hoop 268 of an adjacent shackle bolt 160. Alternatively, the locking nail 269 may pass through aligned through holes in the bolt head 166. In some configurations, the locking nail 269 is tapered toward one end to foul against the through hole in the bolt head 166 to hold it in position.

Figure 75:
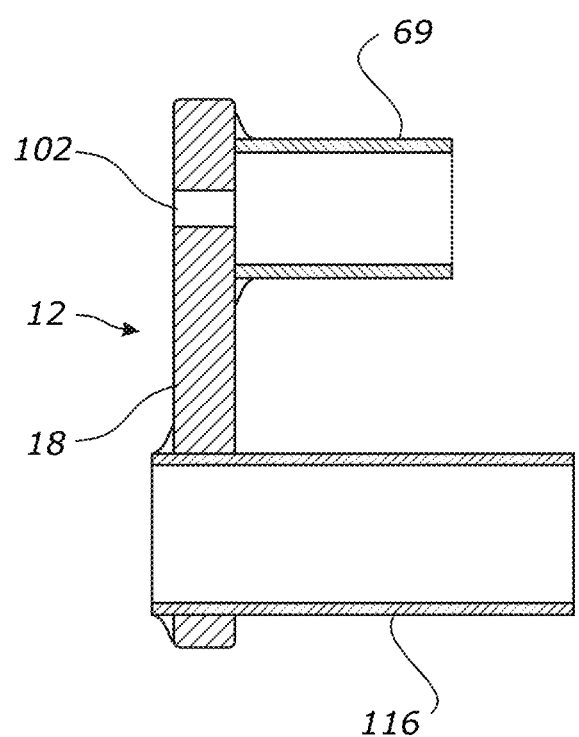
FIG. 75 is a side view of a schematic of a bracket for use with the device of the figures in some configurations.

Referring to FIG. 75, an alternative configuration of a first or second bracket 12, 32 is provided. The configuration is similar to that of FIG. 32 and description for features may apply to both.

FIG. 75 shows the bracket 12, 32 in a side cross-section view. Therefore, the walls of the bush 69 are visible as is the receiving member 102. The web/edge engaging surface 18, 38 extends to the bottom arm 16, 36 which is formed as a pipe 116 extending from the web 18, 38. Therefore, the pipe 116 forms the functions of the bottom arm (or flange) 16, 36.

The pipe 116 extends outwardly from the web 18, 38. The pipe 116 is engageable with a bottom or inside surface of the track 202. The pipe 116 allows the bracket 12, 32 to be engaged with tracks 202 which have features on the inside surface such as where the inside surface is shaped to engage with a sprocket. Therefore, the pipe 116 may fit within the groove that a sprocket would engage with. Likewise, in some configurations, the pipe 116 may be engageable over an elongate member on the inside surface of a track 202.

Various bolts, pins and bars have been described, such as the pin 45, threaded bar 62, blocking bolt 172, prong bolt 472, etc. However, these may be any feature with a similar function of an elongate member and having means to be retained such as a bolt head or a nut. Some bolt heads may be chamfered to fit into a corresponding recess. The bolts may have a shank. This may be useful for when the elongate member 80 is in connection with the bolt, such that it sits on the shank rather than the thread. However, the thread may also withstand forces exerted by an end 84, 86 of the elongate member 80.

Figure 76A:
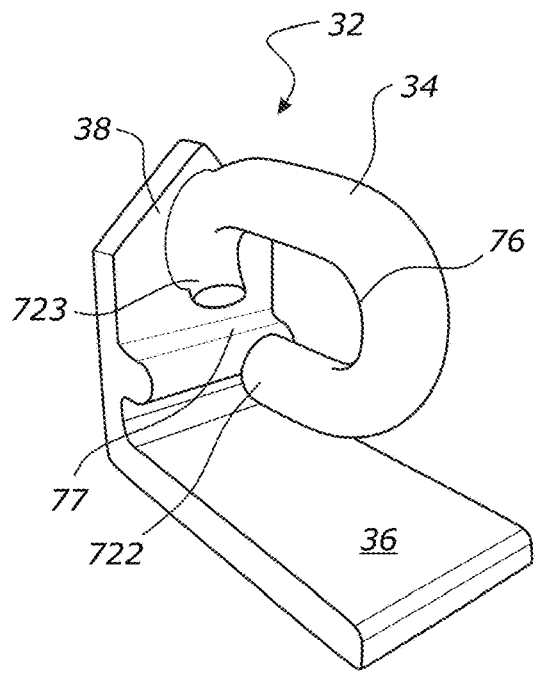
FIGS. 76A to 76D are perspective views of alternative configurations of the bracket of the device.
Figure 76B:
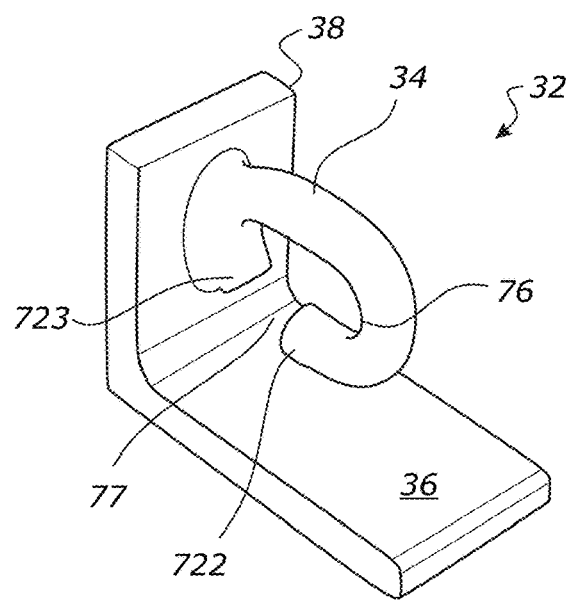
Figure 76C:
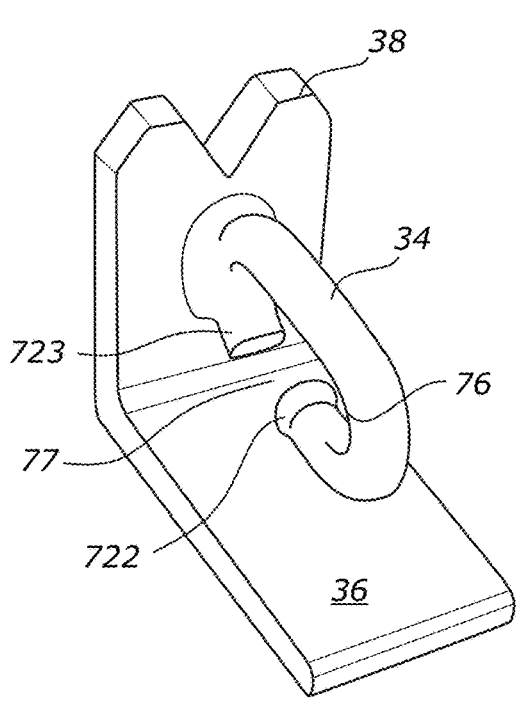
Figure 76D:
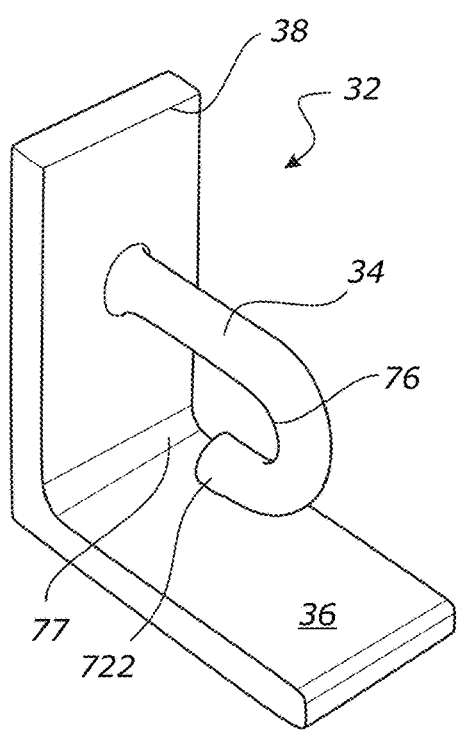
Figure 77:
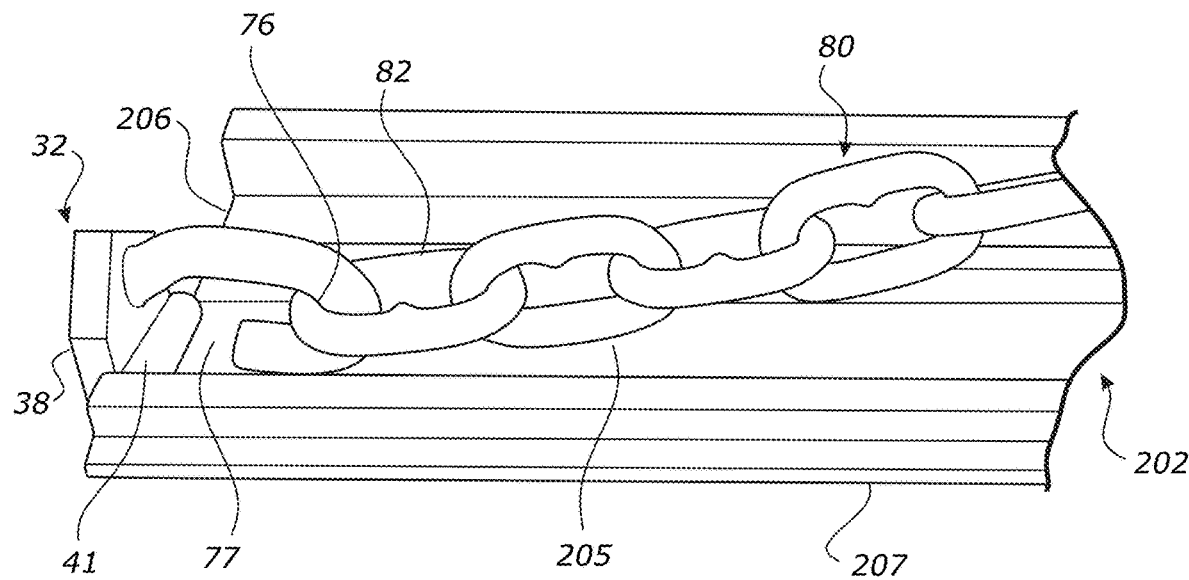
FIG. 77 is a perspective view of the bracket of FIG. 76A engaged with a track.

In accordance with FIGS. 76A to 77, there is provided an alternative embodiment of a traction device 10. Unless specified, the traction device 10 described includes the features described elsewhere herein, such as with reference to FIGS. 1 to 75.

In this embodiment the second bracket 32 is shown. Whilst the second bracket 32 is referred to, for purposes of description, this second bracket 32 may be similar to the first bracket 12 or second bracket 32 of any embodiment herein and associated parts may be the other parts that refer to the first bracket 12.

The track 202 has a first edge 204 and second edge 206 as described herein. In FIG. 77 only the second edge 206 is shown as the track 202 is focused at this end. The track 202 is additionally defined has having an outer surface 205 and an inner surface 207, where the surface of the track 202 that comes into contact with the ground as part of the rotation of the track 202 is the outer surface 205. The surface of the track 202 that is internal and faces the gears (and other surfaces of the track 202) is the inner surface 207. The outer surface 205 and inner surface 207 are on opposing sides of the track 202. The inner surface 207 is generally not directly viewable in FIG. 77.

Figure 78:
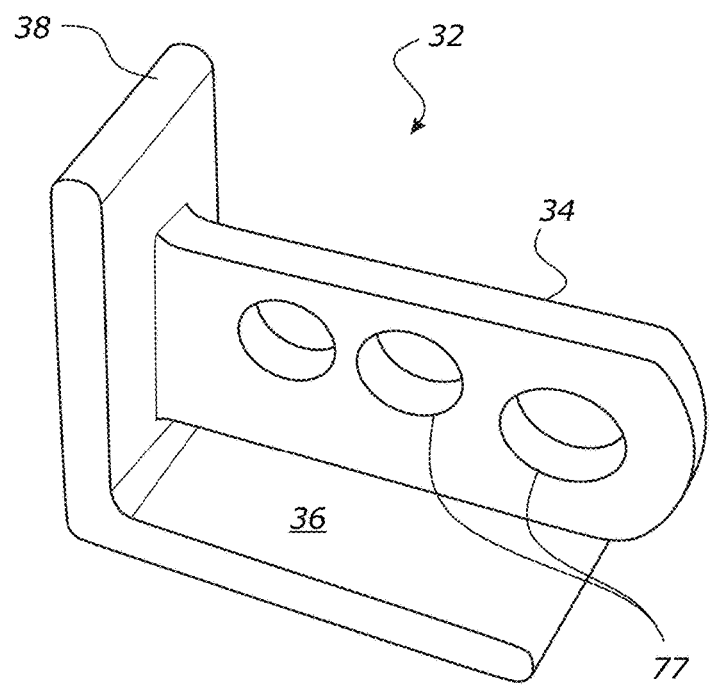
FIG. 78 is a perspective view of an alternative configuration of the bracket of the device.

In FIG. 77, the second bracket 32 is shown to be engageable with one of the edges 204, 206 of the track 202 of the tracked vehicle 202. Whilst the second bracket 32 of FIG. 78 is shown in combination with track 202 in FIG. 77, it will be appreciated that any of the embodiments of FIGS. 76A-d may be used with track 202 of FIG. 77. As shown in FIGS. 76A to 77, the second bracket 32 has an inner bracket portion 36. When the second bracket 32 is engaged with track 202, the inner bracket portion 36 is positioned proximal to the inner surface 207 of the track 202. Therefore, the inner bracket portion 36 is similar to the bottom flange or arm 36 as described herein.

The second bracket 32 has an outer bracket portion 34. When the second bracket 32 is engaged with track 202, the outer bracket portion 34 is positioned proximal to the outer surface 205 of the track 202. Therefore, the outer bracket portion 34 is similar to the top flange or arm 34 as described herein. Therefore, the track 202 is sandwiched between the outer bracket portion 34 and the inner bracket portion 36 when the second bracket 32 is engaged with the track 202.

The second bracket 32 also comprises a web 38. When the second bracket 32 is engaged with the track 202, the web 38 is engaged with one of the edges 204, 206 of the track 202. The web 38 may be similar to the webs or edge engaging portions 38 as described elsewhere herein.

The inner bracket portion 36 extends from the web 38. Therefore, in some configurations, the inner bracket portion 36 and web 38 form an L-shape around the edge 204, 206 and the inner surface 207 of the track 202. The web 38 extends substantially in an inner surface 207 to outer surface 205 direction (or vice versa). This may be considered a vertical direction in some definitions given the orientation of the Figures.

The inner bracket portion 36 extends in a substantially perpendicular direction from the web 38. More particularly, in some configurations, the inner bracket portion 36 extends in a direction from the edge of the track 202 toward the centre of the track 202.

The outer bracket portion 34 extends from the web 38. The outer bracket portion 34 extends in a substantially perpendicular direction from the web 38. More particularly, in some configurations, the outer bracket portion 34 extends in a direction from the edge of the track 202 toward the centre of the track 202. This centre of the track direction may be referred to as a track width direction. Therefore, inner bracket portion 36 and outer bracket portion 34 extend in substantially the same direction from the web 38.

The web 38 has an inner end and an outer end at each end extending from the inner direction to the outer directions described above. In some configurations, at least one of the inner bracket portion 36 or outer bracket portion 34 extend from the respective inner or outer end of the web 38. Therefore, at least one of the inner bracket portion 36 or outer bracket portion 34 may extend to a same height in the inner or outer direction as the web 38.

In some configurations, such as the illustrated configuration, the outer end of the web 38 is tapered towards a central apex. In other embodiments, the shape of the outer end may be any shape, such as the shapes shown in FIGS. 76B-76D. These are described in more detail below.

In some configurations, such as the illustrated configuration, the outer bracket portion 34 extends from a position on the web that is between the outer and inner end. Therefore, the web 38 extends further in the outer direction than the outer bracket portion 34. In such a configuration it is also the case that the height (as defined in the inner to outer direction) of the outer bracket portion 34 is less than the height (also from the inner end to outer end) of the web 38.

The second bracket 32 comprises a mouth portion 40. The mouth portion 40 is the space between the outer bracket portion 34 and the inner bracket portion 36. Therefore, the mouth portion 40 is for receiving the track 202 (when the second bracket 32 is engaged) with the inner surface of the track 207 proximal (and/or facing) the inner bracket portion 36 and the outer surface of the track 205 proximal (and/or facing) the outer bracket portion 34.

The mouth portion 40 also allows the edge of the track 204, 206 to be positioned proximal (and/or facing) the web 38. Therefore, the track 202 may be fed into the mouth portion 40 to be restrained between the outer bracket portion 34, inner bracket portion 36 and the web 38. In some configurations, the track 202 may be positioned in the mouth portion 40 but may not be in contact with some or all of the outer bracket portion 34, inner bracket portion 36 and the web 38.

The outer bracket portion 34 comprises a hooking portion 722. The hooking portion 722 may be similar to the hooks 72, as hereinbefore described. The hooking portion 722 is for releasably attaching to a chain 80. However, other elongate members 80 having means to attach to the hooking portion 722 may be attached. In particular, any hooped member similar to a chain link 82 may be used for connecting to the hooking portion 722.

Referring to the hooking portion 722, this may form part of the outer bracket portion 34, or may substantially be all of the outer bracket portion 34. In some embodiments, the hooking portion 722 refers to the part that is formed in a general hook shape as shown in FIGS. 76A-76D. As can be seen, in some embodiments, the outer bracket portion 34 extends in an outward direction from the hooking portion 722. In other embodiments, such as FIGS. 78 to 81B, the hooking portion 722 refers to the function of hooking and the outer bracket portion 34 does not look like a hook (e.g. fish hook shape).

The hooking portion 722 comprises an opening 77. This opening 77, may be similar to the hook mouth 77 as hereinbefore described and like features may use the description as applied elsewhere. The opening 77 is a slot formed in an edge of the outer bracket portion 34 (or hooking portion 722). The opening 77 allows a chain 80 to be attached to the hooking portion 722 by the chain link 82 passing through the opening 77. The chain link 82 is then restrained in the opening 77. The opening is sized to fit the ring of a chain link 82.

In some embodiments, as shown in FIGS. 76A-76C, the opening is further defined by an opposing hooking portion 723. The opposing hooking portion 723 extends from the web 38, towards the hooking portion 722. The opening 77 is provided in between the hooking portion 722 and the opposing hooking portion 723.

In the embodiment of shown in FIG. 76A, the opening 77 is formed at an inner surface of the outer bracket portion 34. The inner surface is the surface that is in the inner direction (toward the inner bracket portion 36). In some cases, the inner surface may also be termed as the surface of the outer bracket portion 34 that faces that inner bracket portion 36.

The opening 77 is formed to open into the mouth portion 40. Therefore, an open area (i.e., part of the bracket 32 devoid of material) is formed from the mouth portion 40 to the opening 77. To attach the chain 80, a ring of the chain link 82 may be fed through the mouth portion 40 and then into the opening 77, such that the chain link 82 no longer occupies the mouth portion 40. This arrangement allows the bracket 32 to be engaged with the track 202 whilst the chain 80 is attached to the opening 77.

In the arrangement of FIG. 77, when engaged with the track 202, the chain 80 cannot be removed as it is blocked by the track 202. In particular, the chain link 82 cannot pass through the mouth portion 40 as it is occupied by the track 202. Therefore, the bracket 32 must be disengaged from the track 202 before the removal of the chain 80. This prevents the chain from being removed easily when the vehicle is stationary, e.g. vandalism, and/or prevents the chain 80 from inadvertently sliding off the bracket 82 when in use.

The hooking portion 722 further comprises a chain engaging section 76. The chain engaging section 76 is similar to the hook engaging section 76 as hereinbefore described. Therefore, the description for like features may be applied.

The chain engaging section 76 is a portion of the second bracket 32 for accommodating the chain 80 when engaged with the hooking portion 722. The chain engaging section 76 is in contact with or extends from the opening 77. Therefore, the chain engaging section 76 is an open part of the bracket 32 that allows the chain 80, namely, the chain link 82, to hook around. An open part of the bracket 32 may be a part that is devoid of material.

The chain engaging section 76 is a section of the hooking portion 722 that is generally elongate or directed to toward the direction in which a force is applied to chain 80. More specifically, in some configurations, the chain engaging section 76 extends in a substantially perpendicular direction from the web 38, or in a direction from the edge of the track 202 toward the centre of the track 202, or in a track width direction.

In the embodiment shown in FIG. 77 the chain engaging section 76 is shown to extend from the opening 77. The opening 77 is positioned closer to the web 38/track edge 204, 206 than the chain engaging section 76. Therefore, the chain engaging section 76 extends in a direction toward the track centre/across the track width away from the opening 77. The direction of the chain engaging section 76 allows the chain 80 to be held in the chain engaging section 76 without allowing it to slip back over the opening when a force is applied to the chain 80 across the track 202 (e.g., from the first bracket 12). Therefore, the chain 80 is secured in place by the chain engaging section 76 being elongate in the direction that the chain 80 is pulled.

The opening 77 of the bracket 32 is formed to open into the mouth portion 40 and the engaging section 76. Therefore, the opening 77 is effectively in between the engaging section 76 and the mouth portion 40. The opening 77, chain engaging section 76 and mouth portion 40 forms an open area (i.e., part of the bracket 32 devoid of material). To attach the chain 80, a ring of the chain link 82 may be fed through the mouth portion 40 and then into the opening 77 and along the engaging section 76, such that the chain link 82 no longer occupies the mouth portion 40 or the opening 77. This arrangement allows the bracket 32 to be engaged with the track 202 whilst the chain 80 is attached at the engaging section 76.

In some configurations, such as the embodiment shown in FIG. 76A, the bracket 32 comprises a track engaging notch 41. More specifically, in some configurations, the mouth portion 40 comprises a track engaging notch 41. The track engaging notch 41 is an extension of the mouth portion 40 for receiving the track edge 204, 206. However, the engaging notch 41 is positioned in the direction of the web 38 relative to the opening 77. Therefore, when the bracket 32 is engaged with the track 202, the track 202 is positionable further along the mouth portion 40 further than the opening 77 (in the web direction) and the track edge 204, 206 is proximal to the track engaging notch 41.

The track engaging notch 41 ensures that the chain 80 cannot easily pass from the opening 77 into the mouth portion 40 if the track 202 is not fully engaged with the mouth portion 40. The track engaging notch 40 also allows for a more secure hooking portion 722 as a smaller open part may be provided as the engaging section 76 as it does not need to be from the web 38 (or other part that engages with the track edge 204, 206), but may be remote from this in a track direction.

The engaging notch 41 also allows more area within the mouth portion 40 for the inner surface 207 and outer surface 205 to be in contact with the surfaces of the mouth portion 40—or, at least, proximal to the surfaces.

The engaging notch 41 may be formed by the mouth portion 40 extending further into the material of the second bracket 32 in the web 38 direction. Alternatively, the engaging notch 41 may be formed by material extending outward (in the track direction) from the web 38. In further embodiments, the engaging notch 41, may be formed by the hooking portion 722, such that the hook is formed to have an opening 77 that is separated from the web 38. In some embodiments the engaging notch 41 may be the opposing hooking portion 723. Alternatively, both features may be present.

In an alternative arrangement, such as the embodiment of shown in FIG. 78, there is provided a second bracket 32 where the outer bracket portion 34 is a flange. The outer bracket portion 34 in this configuration extends in a direction toward the track centre/across the track width, away from the web 38. The outer bracket portion extends in a substantially perpendicular direction from the web 38. The outer bracket portion 34 comprises at least one opening 77, the at least one opening 77 being formed through the outer bracket portion 34 in the form of a through-hole. Therefore, the opening 77 is a through-hole that has sides and is formed in the body of the outer bracket portion 34. The opening 77 is positioned on the outer bracket portion in a direction toward the track centre/across the track width, away from the web 38. The opening 77 allows a chain 80 to be connected via a further bolt, such as the shackle 150 as described herein, or a connector pin 45 as described herein, or any other suitable connection device.

Figure 79A:
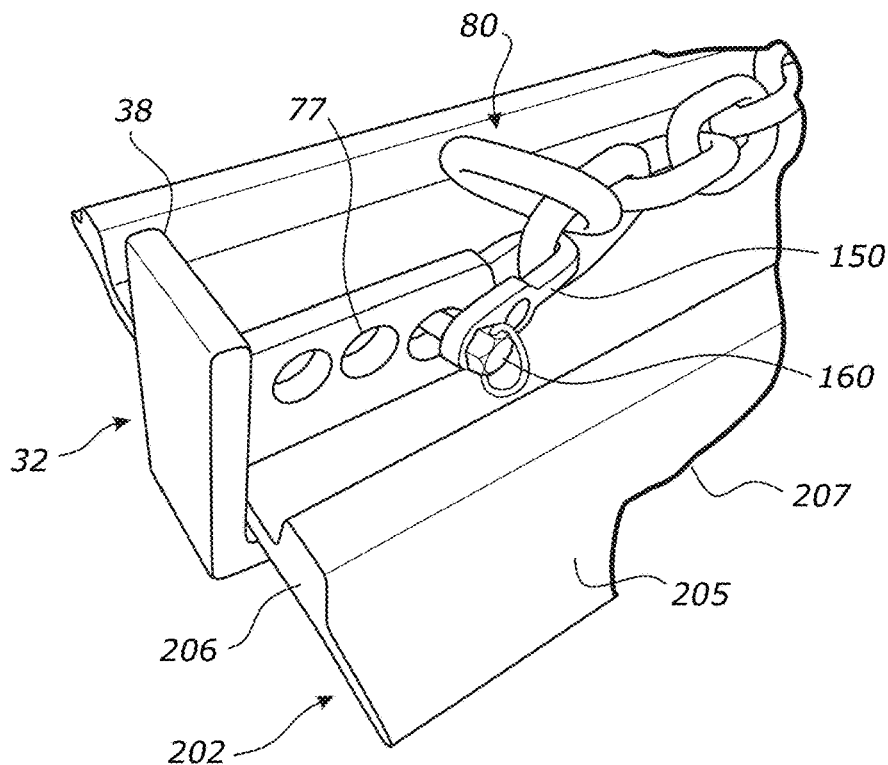
FIGS. 79A and 79B are perspective views of the bracket of FIG. 78 engaged with a track.
Figure 79B:
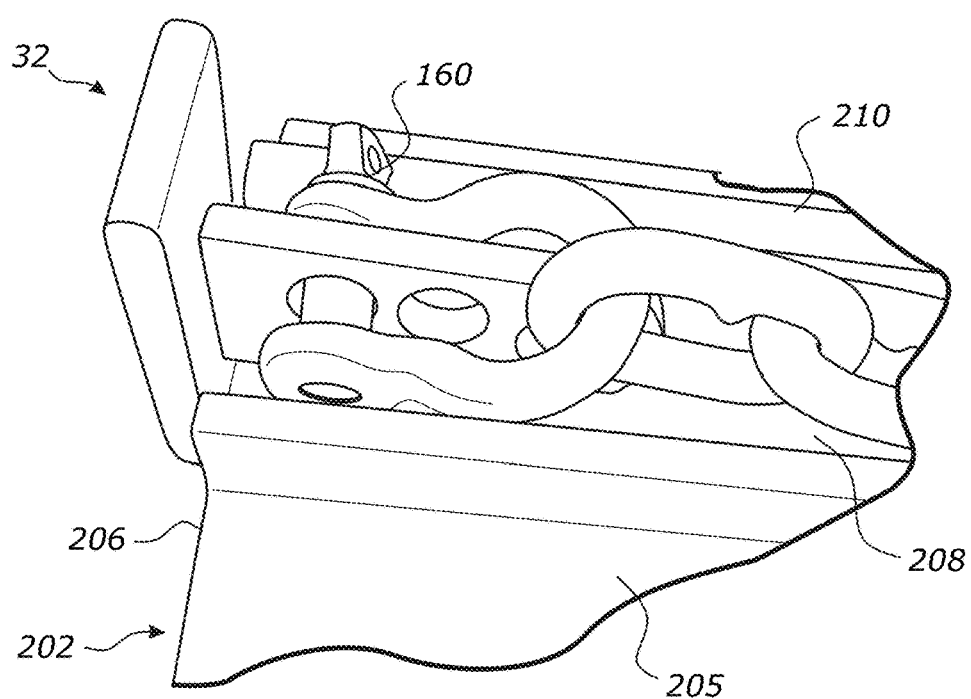

In the embodiments of FIGS. 78 to 79B, the bracket 32 may comprise multiple openings 77, either in a through-hole form or an open area form. This allows a chain 80 to be attached at multiple locations as shown in FIGS. 79A and 79B.

In the embodiment shown in FIGS. 78 to 79B, the mouth portion 40 also allows the edge of the track 204, 206 to be positioned proximal (and/or facing) the web 38. Therefore, the track 202 may be fed into the mouth portion 40 to be restrained between the outer bracket portion 34, inner bracket portion 36 and the web 38. In some configurations, the track 202 may be positioned in the mouth portion 40 but may not be in contact with some or all of the outer bracket portion 34, inner bracket portion 36 and the web 38.

Whilst the chain 80 does not need to slide along the mouth portion 40 to be attached or detached from the opening 77 in this arrangement, as shown in FIG. 79B the chain 80 may be retained and blocked from being removed from the bracket 32 when engaged with the track 202 by the recesses 208 and raised portions 210 of the track 202. Namely, the shackle bolt 160 cannot be unscrewed as the bracket 32 sits in a recess 208 and, therefore, the bolt 160 access is blocked by the raised portions 210. The bracket 32 must be removed (disengaged) from the track 202 to allow access to remove the shackle bolt 160. The same may be true of a connector pin 45 which may also be blocked from being removed in the recess 208.

In some embodiments, when the bracket 32 is connected to a chain 80, the connected link 82 of the chain 80 is parallel with the outer surface 205 of the track. That is, the chain link 82 is orientated at its flattest in line with the track 202 to have the lowest outward dimension. This ensures that the chain 80 is secure in this area and will not overly twist or exert forces on the bracket 32.

Figure 80:
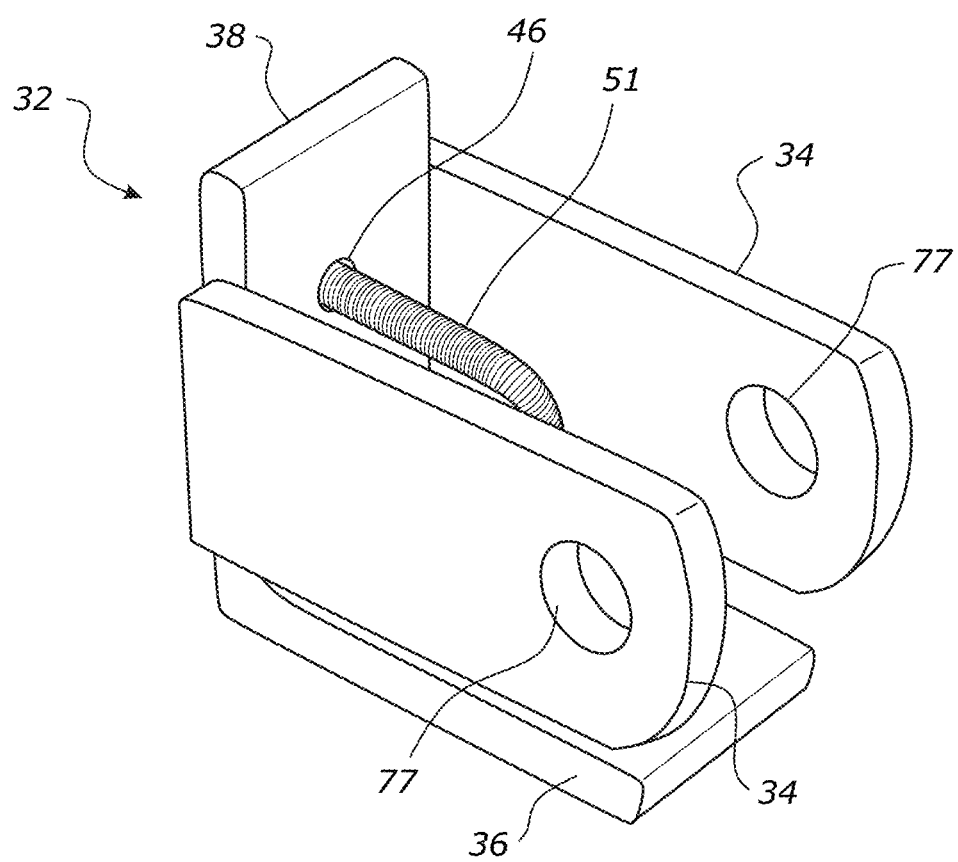
FIG. 80 is a perspective view of an alternative configuration of the bracket of the device.
Figure 81A:
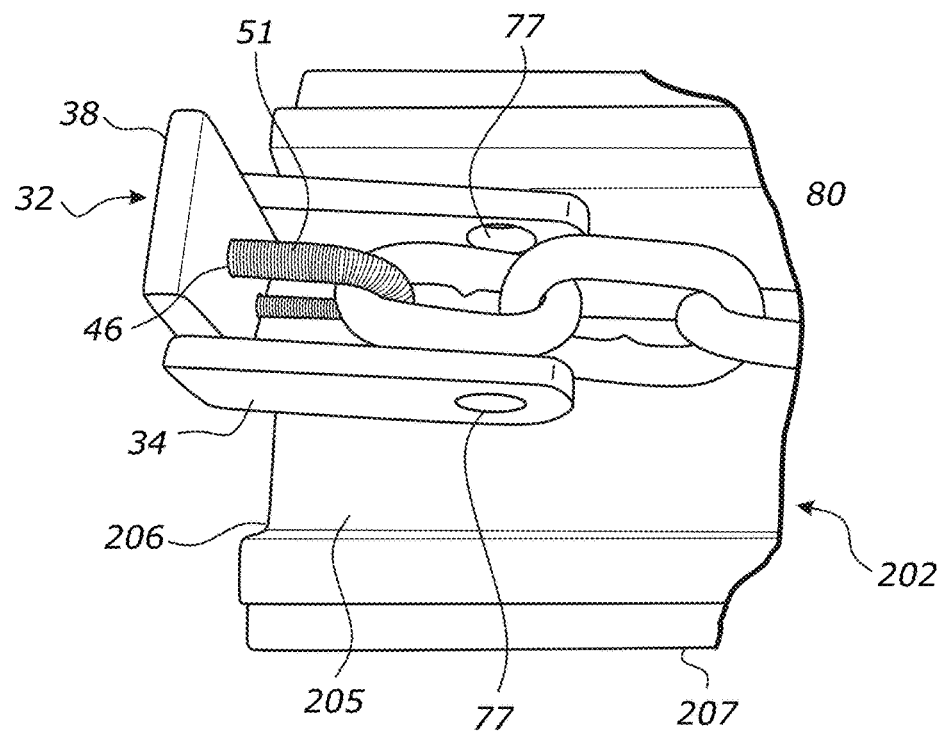
FIGS. 81A and 81B are perspective views of the bracket of FIG. 78 engaged with a track.
Figure 81B:
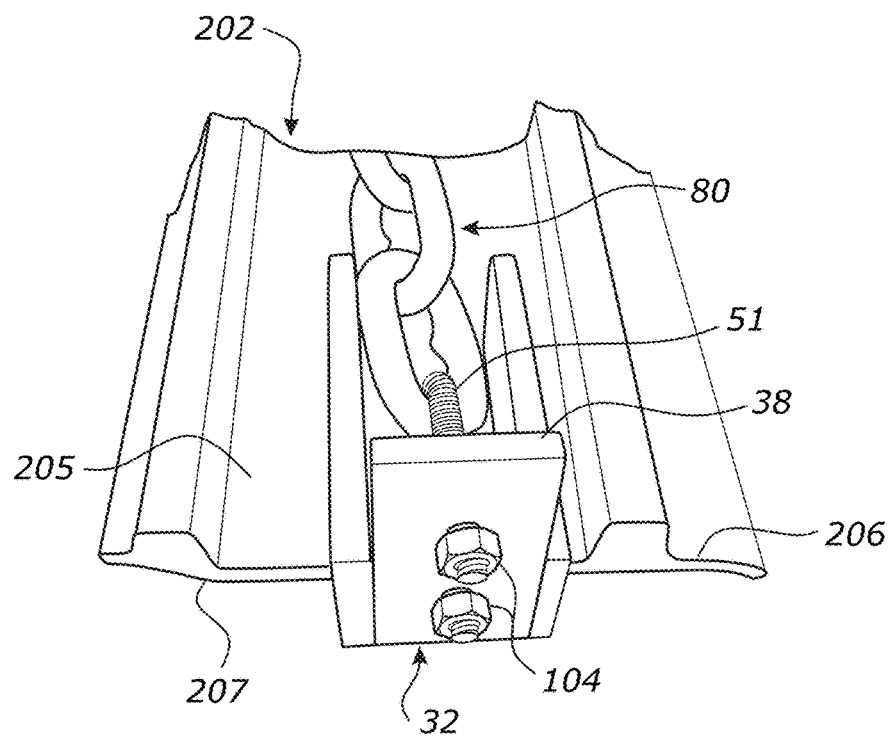

In the embodiments shown in FIGS. 80 to 81B, the bracket 32 has a first outer bracket portion 34 and a second outer bracket portion 34. When the bracket is engaged with track 202, the first and second outer bracket portions 34 are positioned proximal to the outer surface 205 of the track 202. Therefore, the first and second outer bracket portions 34 are similar to the top flange or arm 34 as described herein. Therefore, the track 202 is sandwiched between the outer bracket portions 34 and the inner bracket portion 36 when the bracket 32 is engaged with the track 202.

The first and second outer bracket portions 34 are connected to a respective side of the web 38, such that the first and second outer bracket portions 34 extend in a substantially perpendicular direction from the web 38. In some configurations, the first and second outer bracket portions 34 each comprises at least one opening 77, the at least one opening 77 being formed through the outer bracket portion 34 in the form of a through-hole. Therefore, the opening 77 is a through-hole that has sides and is formed in the body of the outer bracket portion 34. The opening 77 is positioned on the outer bracket portion in a direction toward the track centre/across the track width, away from the web 38. The openings 77 allow the connection of a chain 80 by a connector pin 45 or a prong bolt 472 through the opening and passing through a ring of the chain 80 to secure the chain 80.

Two through holes 46 are provided in the web 38 to allow a threaded U-bolt 51 to connect to the web 38. The through-holes 46 can be varied in location to allow alternative positioning of the threaded U-bolt 51. The threaded U-bolt 51 is secured to the web 38 by securing nuts 104.

In the arrangement of FIGS. 81A to 81B, when engaged with the track 202, the chain 80 is connected to the threaded U-bolt 51 and is secured to the track 202 by the tension provided using the securing nuts 104. This allows for the chain to be removed easily, without disengaging the bracket 32 from the track 202 by releasing the securing nuts 104.

Referring to FIGS. 82A to 82G alternative arrangements of the bracket 32 as described with reference to FIGS. 76A to 81B are shown. The brackets 32 of FIGS. 82A to 82G are formed as a relatively thin bracket, i.e. having a thickness in a depth direction (along the moving direction of the track 202, or from a front side to a rear side of the bracket 32) that is less than a ring of a chain 80.

Such dimensions are similar to the brackets 32 shown on FIGS. 60 and 61.

The brackets 32 of FIGS. 82A to 82G are as described with reference to FIGS. 76A to 81B. Like features may be described by the description provided with reference to those figures. Therefore, the second bracket 32 is engageable with one of the edges 204, 206 of the track 202 of the tracked vehicle 202. The second bracket 32 has an inner bracket portion 36. When the second bracket 32 is engaged with track 202, the inner bracket portion 36 is positioned proximal to the inner surface 207 of the track 202. Therefore, the inner bracket portion 36 is similar to the bottom flange or arm 36 as described herein.

The second bracket 32 has an outer bracket portion 34. When the second bracket 32 is engaged with track 202, the outer bracket portion 34 is positioned proximal to the outer surface 205 of the track 202. Therefore, the outer bracket portion 34 is similar to the top flange or arm 34 as described herein. Therefore, the track 202 is sandwiched between the outer bracket portion 34 and the inner bracket portion 36 when the second bracket 32 is engaged with the track 202.

The second bracket 32 also comprises a web 38. When the second bracket 32 is engaged with the track 202, the web 38 is engaged with one of the edges 204, 206 of the track 202. The web 38 may be similar to the webs or edge engaging portions 38 as described elsewhere herein.

The inner bracket portion 36 extends from the web 38. Therefore, in some configurations, the inner bracket portion 36 and web 38 form an L-shape around the edge 204, 206 and the inner surface 207 of the track 202. The web 38 extends substantially in an inner surface 207 to outer surface 205 direction (or vice versa). This may be considered a vertical direction in some definitions given the orientation of the Figures.

The inner bracket portion 36 extends in a substantially perpendicular direction from the web 38. More particularly, in some configurations, the inner bracket portion 36 extends in a direction from the edge of the track 202 toward the centre of the track 202.

The outer bracket portion 34 extends from the web 38. The outer bracket portion 34 extends in a substantially perpendicular direction from the web 38. More particularly, in some configurations, the outer bracket portion 34 extends in a direction from the edge of the track 202 toward the centre of the track 202. This centre of the track direction may be referred to as a track width direction. Therefore, inner bracket portion 36 and outer bracket portion 34 extend in substantially the same direction from the web 38.

The web 38 has an inner end and an outer end at each end extending from the inner direction to the outer directions described above. In some configurations, at least one of the inner bracket portion 36 or outer bracket portion 34 extend from the respective inner or outer end of the web 38. Therefore, at least one of the inner bracket portion 36 or outer bracket portion 34 may extend to a same height in the inner or outer direction as the web 38.

The second bracket 32 comprises a mouth portion 40. The mouth portion 40 is the space between the outer bracket portion 34 and the inner bracket portion 36. Therefore, the mouth portion 40 is for receiving the track 202 (when the second bracket 32 is engaged) with the inner surface of the track 207 proximal (and/or facing) the inner bracket portion 36 and the outer surface of the track 205 proximal (and/or facing) the outer bracket portion 34.

The mouth portion 40 also allows the edge of the track 204, 206 to be positioned proximal (and/or facing) the web 38. Therefore, the track 202 may be fed into the mouth portion 40 to be restrained between the outer bracket portion 34, inner bracket portion 36 and the web 38. In some configurations, the track 202 may be positioned in the mouth portion 40 but may not be in contact with some or all of the outer bracket portion 34, inner bracket portion 36 and the web 38.

The outer bracket portion 34 comprises a hooking portion 722. The hooking portion 722 may be similar to the hooks 72, as hereinbefore described. The hooking portion 722 is for releasably attaching to a chain 80. However, other elongate members 80 having means to attach to the hooking portion 722 may be attached. In particular, any hooped member similar to a chain link 82 may be used for connecting to the hooking portion 722.

Referring to the hooking portion 722, this may form part of the outer bracket portion 34, or may substantially be all of the outer bracket portion 34. In some embodiments, the hooking portion 722 refers to the part that is formed in a general hook shape as shown in FIGS. 81A-82D. As can be seen, in some embodiments, the outer bracket portion 34 extends in an outward direction from the hooking portion 722. In other embodiments, such as FIGS. 82E to 82G, the hooking portion 722 refers to the function of hooking and the outer bracket portion 34 does not look like a hook (e.g. fish hook shape).

The hooking portion 722 comprises an opening 77. This opening 77, may be similar to the hook mouth 77 as hereinbefore described and like features may use the description as applied elsewhere. The opening 77 is a slot formed in an edge of the outer bracket portion 34 (or hooking portion 722). The opening 77 allows a chain 80 to be attached to the hooking portion 722 by the chain link 82 passing through the opening 77. The chain link 82 is then restrained in the opening 77. The opening is sized to fit the ring of a chain link 82.

In some embodiments, as shown in FIGS. 82A to 82D, the opening is further defined by an opposing hooking portion 723. The opposing hooking portion 723 extends from the web 38, towards the hooking portion 722. The opening 77 is provided in between the hooking portion 722 and the opposing hooking portion 723.

In the embodiment of shown in FIG. 82A to 82D, the opening 77 is formed at an inner surface of the outer bracket portion 34. The inner surface is the surface that is in the inner direction (toward the inner bracket portion 36). In some cases, the inner surface may also be termed as the surface of the outer bracket portion 34 that faces that inner bracket portion 36.

The opening 77 is formed to open into the mouth portion 40. Therefore, an open area (i.e., part of the bracket 32 devoid of material) is formed from the mouth portion 40 to the opening 77. To attach the chain 80, a ring of the chain link 82 may be fed through the mouth portion 40 and then into the opening 77, such that the chain link 82 no longer occupies the mouth portion 40. This arrangement allows the bracket 32 to be engaged with the track 202 whilst the chain 80 is attached to the opening 77.

Figure 83:
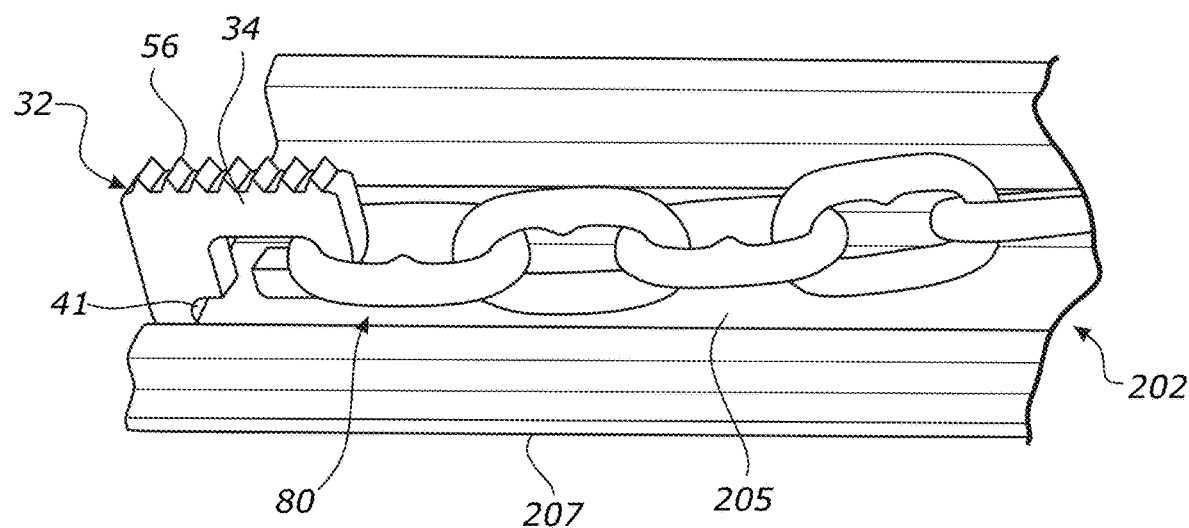
FIG. 83 is a perspective view of the bracket of FIG. 82A engaged with a track.

In the arrangement of FIG. 83, which shows the bracket 82A engaged with the track 202, when engaged with the track 202, the chain 80 cannot be removed as it is blocked by the track 202. In particular, the chain link 82 cannot pass through the mouth portion 40 as it is occupied by the track 202. Therefore, the bracket 32 must be disengaged from the track 202 before the removal of the chain 80. This prevents the chain from being removed easily when the vehicle is stationary, e.g. vandalism, and/or prevents the chain 80 from inadvertently sliding off the bracket 82 when in use.

The hooking portion 722 further comprises a chain engaging section 76. The chain engaging section 76 is similar to the hook engaging section 76 as hereinbefore described. Therefore, the description for like features may be applied.

The chain engaging section 76 is a portion of the second bracket 32 for accommodating the chain 80 when engaged with the hooking portion 722. The chain engaging section 76 is in contact with or extends from the opening 77. Therefore, the chain engaging section 76 is an open part of the bracket 32 that allows the chain 80, namely, the chain link 82, to hook around. An open part of the bracket 32 may be a part that is devoid of material.

The chain engaging section 76 is a section of the hooking portion 722 that is generally elongate or directed to toward the direction in which a force is applied to chain 80. More specifically, in some configurations, the chain engaging section 76 extends in a substantially perpendicular direction from the web 38, or in a direction from the edge of the track 202 toward the centre of the track 202, or in a track width direction.

Figure 84:
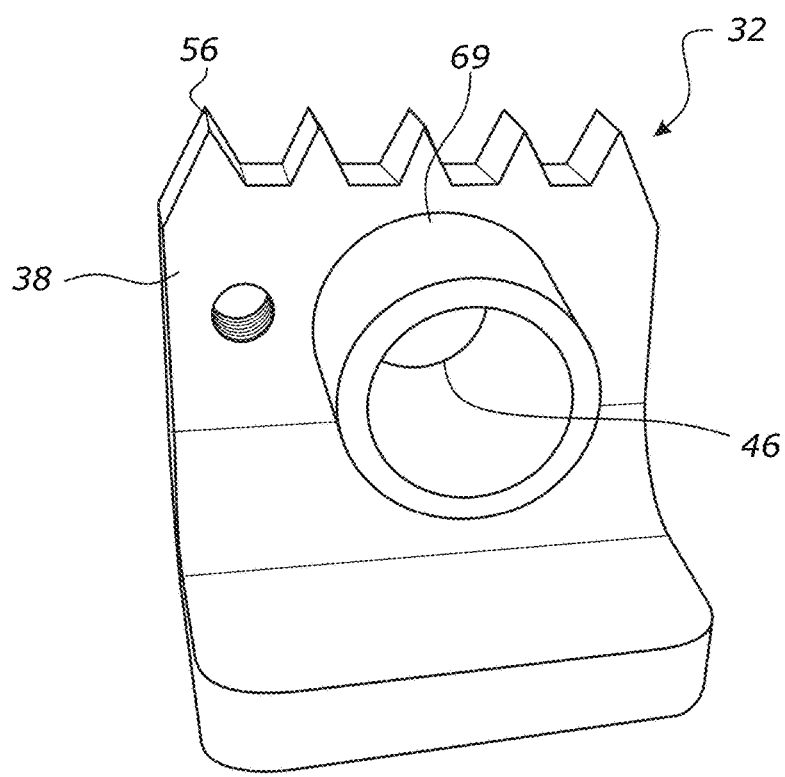
FIG. 84 is a perspective view of alternative configuration of the bracket of the device.

In the embodiment shown in FIG. 84 the chain engaging section 76 is shown to extend from the opening 77. The opening 77 is positioned closer to the web 38/track edge 204, 206 than the chain engaging section 76. Therefore, the chain engaging section 76 extends in a direction toward the track centre/across the track width away from the opening 77. The direction of the chain engaging section 76 allows the chain 80 to be held in the chain engaging section 76 without allowing it to slip back over the opening when a force is applied to the chain 80 across the track 202 (e.g., from the first bracket 12). Therefore, the chain 80 is secured in place by the chain engaging section 76 being elongate in the direction that the chain 80 is pulled.

The opening 77 of the bracket 32 is formed to open into the mouth portion 40 and the engaging section 76. Therefore, the opening 77 is effectively in between the engaging section 76 and the mouth portion 40. The opening 77, chain engaging section 76 and mouth portion 40 forms an open area (i.e., part of the bracket 32 devoid of material). To attach the chain 80, a ring of the chain link 82 may be fed through the mouth portion 40 and then into the opening 77 and along the engaging section 76, such that the chain link 82 no longer occupies the mouth portion 40 or the opening 77. This arrangement allows the bracket 32 to be engaged with the track 202 whilst the chain 80 is attached at the engaging section 76.

In some configurations, such as the embodiment shown in FIG. 82A to 82D, the bracket 32 comprises a track engaging notch 41. More specifically, in some configurations, the mouth portion 40 comprises a track engaging notch 41. The track engaging notch 41 is an extension of the mouth portion 40 for receiving the track edge 204, 206. However, the engaging notch 41 is positioned in the direction of the web 38 relative to the opening 77. Therefore, when the bracket 32 is engaged with the track 202, the track 202 is positionable further along the mouth portion 40 further than the opening 77 (in the web direction) and the track edge 204, 206 is proximal to the track engaging notch 41.

The track engaging notch 41 ensures that the chain 80 cannot easily pass from the opening 77 into the mouth portion 40 if the track 202 is not fully engaged with the mouth portion 40. The track engaging notch 40 also allows for a more secure hooking portion 722 as a smaller open part may be provided as the engaging section 76 as it does not need to be from the web 38 (or other part that engages with the track edge 204, 206), but may be remote from this in a track direction.

The engaging notch 41 also allows more area within the mouth portion 40 for the inner surface 207 and outer surface 205 to be in contact with the surfaces of the mouth portion 40—or, at least, proximal to the surfaces.

The engaging notch 41 may be formed by the mouth portion 40 extending further into the material of the second bracket 32 in the web 38 direction. Alternatively, the engaging notch 41 may be formed by material extending outward (in the track direction) from the web 38. In further embodiments, the engaging notch 41, may be formed by the hooking portion 722, such that the hook is formed to have an opening 77 that is separated from the web 38. In some embodiments the engaging notch 41 may be the opposing hooking portion 723. Alternatively, both features may be present.

Figure 82E:
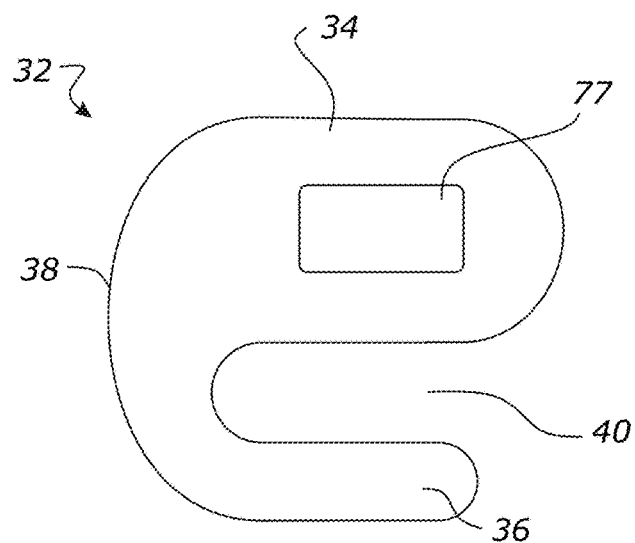
FIGS. 82E to 82G are side views of alternative configurations of the bracket of the device.
Figure 82F:
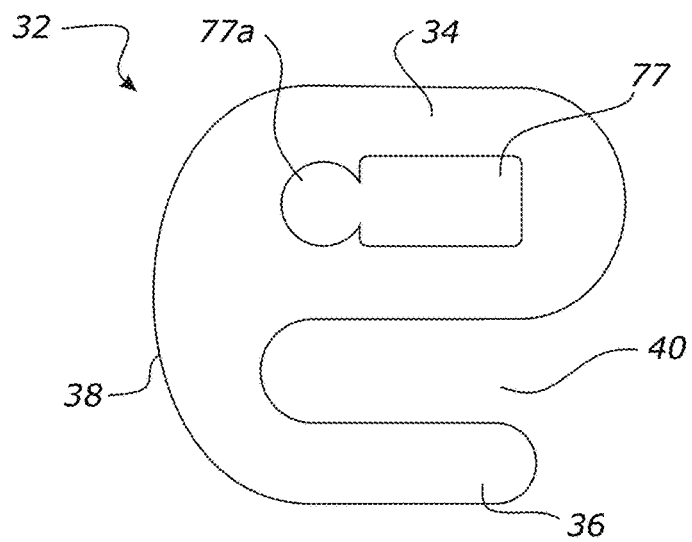

In FIGS. 82E and 82F, the outer bracket portion 34 comprises at least one opening 77, the at least one opening 77 being formed through the outer bracket portion 34 in the form of a through-hole. Therefore, the opening 77 is a through-hole that has sides and is formed in the body of the outer bracket portion 34. The opening 77 is positioned on the outer bracket portion in a direction toward the track centre/across the track width, away from the web 38. The opening 77 allows a chain 80 to be connected via a further bolt, such as the shackle 150 as described herein, or a connector pin 45 as described herein, or any other suitable connection device.

In the embodiment of FIG. 82F, the bracket 32 may comprise an extended opening 77 (or an opening 77 with an extension 77*a*), either in a through-hole form or an open area form. This allows a shackle 150 (as described herein) to be attached where the shackle bolt 160 may pass through the extended opening 77. In particular, part of the extended opening 77 (such as extension 77*a*) may be shaped to allow a shackle bolt 160 to pass there through without moving to a further location of the extended opening 77.

In some configuration, the extended opening 77 may be sized to receive multiple shackle bolts 160.

In the embodiment shown in FIGS. 82E and 82F, the mouth portion 40 also allows the edge of the track 204, 206 to be positioned proximal (and/or facing) the web 38. Therefore, the track 202 may be fed into the mouth portion 40 to be restrained between the outer bracket portion 34, inner bracket portion 36 and the web 38. In some configurations, the track 202 may be positioned in the mouth portion 40 but may not be in contact with some or all of the outer bracket portion 34, inner bracket portion 36 and the web 38.

Whilst the chain 80 does not need to slide along the mouth portion 40 to be attached or detached from the opening 77 in this arrangement, the chain 80 may be retained and blocked from being removed from the bracket 32 when engaged with the track 202 by the recesses 208 and raised portions 210 of the track 202. Namely, the shackle bolt 160 cannot be unscrewed as the bracket 32 sits in a recess 208 and, therefore, the bolt 160 access is blocked by the raised portions 210. The bracket 32 must be removed (disengaged) from the track 202 to allow access to remove the shackle bolt 160. The same may be true of a connector pin 45 which may also be blocked from being removed in the recess 208.

In some embodiments, when the bracket 32 is connected to a chain 80, the connected link 82 of the chain 80 is parallel with the outer surface 205 of the track. That is, the chain link 82 is orientated at its flattest in line with the track 202 to have the lowest outward dimension. This ensures that the chain 80 is secure in this area and will not overly twist or exert forces on the bracket 32.

In the configurations of FIGS. 82E and 82F, the openings 77 allow the connection of a chain 80 by a connector pin 45 or a prong bolt 472 through the opening and passing through a ring of the chain 80 to secure the chain 80.

Figure 82G:
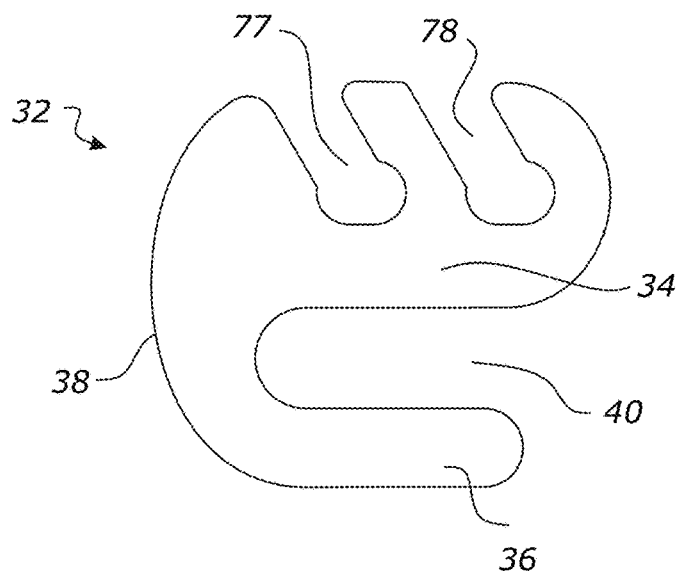

FIG. 82G shows a shackle 32 similar to that as described with reference to FIG. 60. Therefore, the same description applies. However, in this configuration the opening 77, being the first mouth 77 closest to the web 38, extends in the same direction as the second opening/mouth 78. The direction of the first opening 77 and the second opening 78 has its opening in a direction between the rearward direction and the outward direction. In some configurations the opening may be up to 15° more toward the outward direction than the web 38 direction, this may also be 60° from the horizontal surface.

As shown in the embodiment of FIGS. 82A to 82B, at the outer surface of either the web 38, outer portion 34 or a combination of both, there may be provided a gripping section 56. The gripping section 56 may be similar to the jagged side grip 52, or jagged central grip 56 as described elsewhere herein.

The gripping section 56 is a pattern formed on a ground contacting surface of the bracket 32 that increases traction. Therefore, as described, the gripping section 56 is formed on outer surfaces of the bracket 32 that are brought into contact with the ground during rotation of the track 202. The gripping section 56 may be formed as pointed or sharp surfaces for engaging with the ground, such as a jagged surface. However, in some configurations a single point may be provided.

The direction of the gripping section 56 may be in any suitable direction, for instance, as shown in FIGS. 82A to 82B, it may be formed in the web 38 to track direction, across the width of the track. Therefore, in such a configuration, the gripping section 56 may be along the outer bracket portion 34.

The bracket 32 comprises a track engaging notch 41. More specifically, in some configurations, the mouth portion 40 comprises a track engaging notch 41. The track engaging notch 41 is an extension of the mouth portion 40 for receiving the track edge 204, 206. However, the engaging notch 41 is positioned in the direction of the web 38 relative to the opening 77. Therefore, when the bracket 32 is engaged with the track 202, the track 202 is positionable further along the mouth portion 40 further than the opening 77 (in the web direction) and the track edge 204, 206 is proximal to the track engaging notch 41.

In the embodiment shown in FIG. 83 the second bracket 32 of FIG. 82A is shown. However, it will be appreciated that any of the brackets of FIGS. 82A to 82G may be used with the track 202 of FIG. 83. In this illustrated embodiment, the track engaging notch 41 ensures that the chain 80 cannot easily pass from the opening 77 into the mouth portion 40 if the track 202 is not fully engaged with the mouth portion 40. The track engaging notch 40 also allows for a more secure hooking portion 722 as a smaller open part may be provided as the engaging section 76 as it does not need to be from the web 38 (or other part that engages with the track edge 204, 206), but may be remote from this in a track direction.

The engaging notch 41 also allows more area within the mouth portion 40 for the inner surface 207 and outer surface 205 to be in contact with the surfaces of the mouth portion 40—or, at least, proximal to the surfaces.

Figure 85:
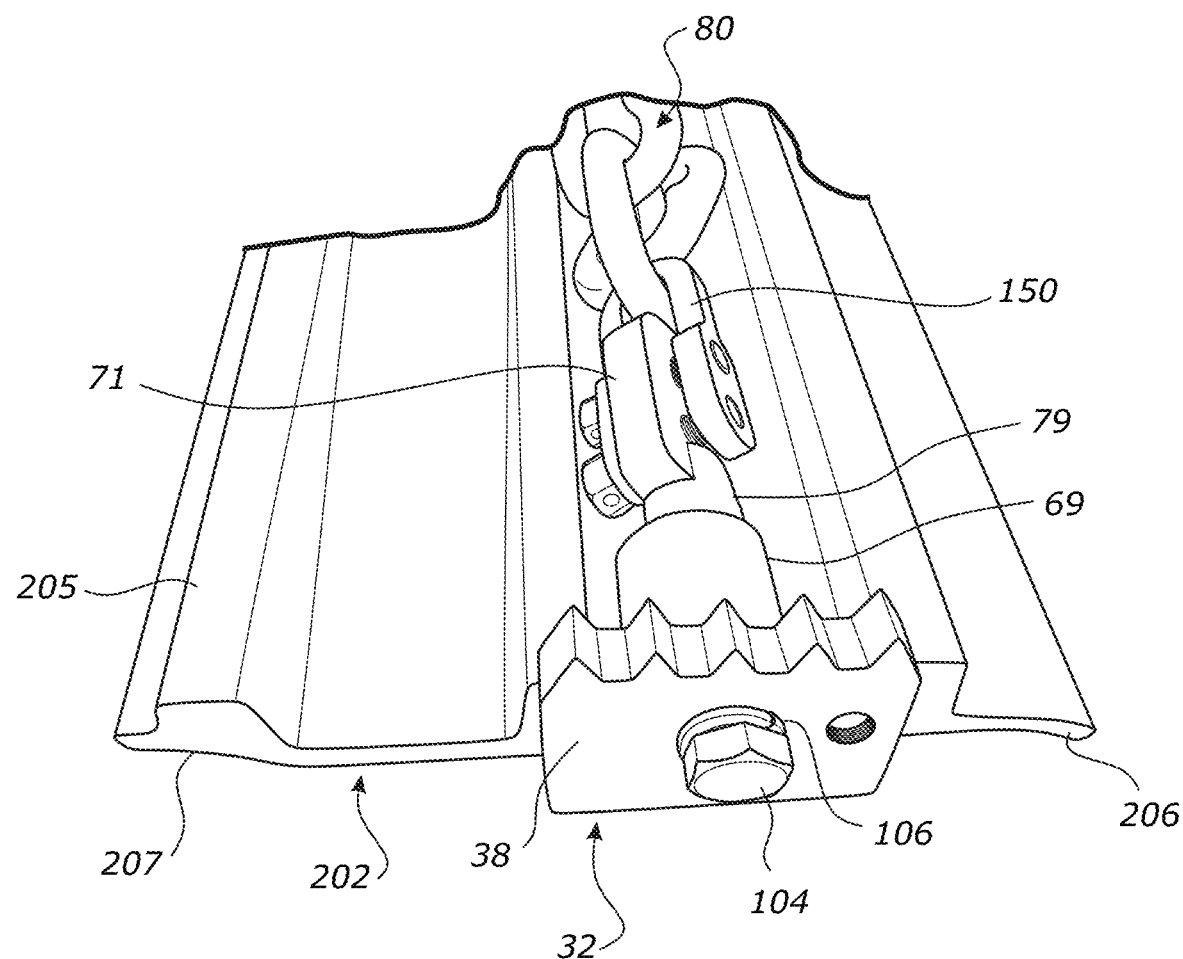
FIG. 85 is a perspective view of the bracket of FIG. 84 engaged with a track.

Alternatively, the gripping section 56 may be formed in the direction along the length of the track. Therefore, the gripping section is formed across the outer edge of the web 38. This is particularly the useful where the outer edge of the web 38 extends further outwardly than the outer edge of the outer bracket portion 34 as described above. Such a configuration is shown in FIGS. 84-85.

The gripping section 56 increases the traction at the bracket 32 between the track 202 and the ground to further assist the traction provided by the chain 80.

At least one of inner bracket portion 36 and the web 38 may be formed as plates, i.e. flat plates that are perpendicular in direction to one another. Such plates may be joined by usual means known in the art, such as welding or by fasteners. The inner bracket portion 36 and the web 38 may also be formed from a single plate that is bent to be formed the plates extending perpendicular to one another. In some configurations, the plates or plate forms an 'L' shape when viewed from the side.

The hooking portion 722 may be joined to the plate as a separate part, particularly where the hooking portion 722 is in the form of a hook or a link.

In some configurations, at least one of inner bracket portion 36 and the web 38 may be formed as a single plate with the mouth portion 40, opening 77 and engaging section 78 cut-out. The cutting may be done by various cutting techniques known in the art.

In the embodiment shown in FIGS. 84 and 85, the bracket 32 further comprises a bush 69 extending generally from the web 38 toward the track centre/across the track width. The bush 69 is hollow and a through-hole 46 is provided on the web 38 within the bush 69. There is the threaded member 62 that extends through the through-hole 46. The bush 69 is a cylinder that extends from the web 38 in the same direction as the threaded member 62. The bolt head or threaded nut 104 is positioned on the other side of the receiving member 102. A washer 106 is provided to ensure that the rotation of the securing nut 104 is possible once secured. The threaded member 62 is surrounded by a bush 69. The bush 69 and the threaded member 62 are coaxial. The bush 69 surrounds the threaded member 62 and provides protection for the threaded member 62. The bush 69 internal diameter is larger than the outer diameter of the threaded member 62 such that there is a concentric space around the threaded member 62 when positioned within the bush 69. The concentric space may be used for accommodating the corresponding collar 79 of any connection member 70, 71 described elsewhere or prong connection member 471 described below.

As described elsewhere herein, the bracket 32 may be formed of a metal material, such as steel or aluminium. A strong, rigid material with a degree of ductility allows the bracket to be subjected to forces from the ground and tracked vehicle 200 without catastrophically failing.

The embodiments described in FIGS. 78 to 85 are particularly suited to metal tracks. The rigidity of the tracks do not require any compensation flexibility. Therefore, features, such as the mouth portion 40, may be sized to fit the required thickness of the track 202.

The bracket 32 and device 10 as described herein increases traction not only in the driving direction of the vehicle 200, but also in the sideways direction. This is assisted by the elongate member (chain) 80 be non-directional. Likewise, the gripping portions of the brackets 12, 32 are not directional. Therefore, grip is enhanced in all directions with the ground.

Preferred embodiments of the invention have been described by way of example only and modifications may be made thereto without departing from the scope of the invention.

The invention claimed is:

1. A device for use with a track of a continuous tracked vehicle for enhancing traction, the track having a width extending between a first edge and a second edge, the device comprising:
   a first bracket and a second bracket, each bracket comprising a body forming a mouth portion, the mouth portion of the first bracket being engageable with the first edge of the track and the mouth portion of the second bracket engageable with the second edge of the track; and
   a ground engaging feature comprising an elongate member, the elongate member extending between the first bracket and the second bracket,
   wherein the body of each bracket comprises a top flange and a bottom flange arrangeable proximal to a top surface and a bottom surface of the track respectively, the body further comprising a web extending between the top flange and the bottom flange, the mouth portion being formed within the top flange, bottom flange and web, a first end of the elongate member being removably connected to the first bracket, and a second end of the elongate member being connected to the second bracket, the first bracket comprising an adjustment mechanism to adjust a distance between the first end of the elongate member and the body of the first bracket, the adjustment mechanism comprising a first connection member positioned within the mouth portion, the first connection member removably connecting the elongate member to the adjustment mechanism, and the elongate member is a chain, wherein the chain comprises at least one chain link.

2. The device of claim 1, wherein the elongate member is configured to secure the device in position by tension between the first bracket and second bracket, the tension of the elongate member being adjustable by the adjustment mechanism.

3. The device of claim 1, wherein at least one of the first bracket or second bracket is U-shaped.

4. The device of claim 1, wherein the second bracket member comprises a second connection member positioned within the mouth portion.

5. The device of claim 4, wherein either the elongate member comprises a threaded bar connected to the first end of the portion of the elongate member or at least one of the first connection member or second connection member is connected to the threaded bar.

6. The device of claim 5, wherein the first connection member comprises a receiving member for receiving the threaded bar, the threaded bar being adjustable within the receiving member to increase or decrease the distance between the first end of the elongate member and the first bracket.

7. The device of claim 6, wherein the receiving member is internally threaded, the threaded bar being rotatable within the internal thread to increase or decrease the distance between the first end of the portion of the elongate member and the first bracket.

8. The device of claim 6, wherein the receiving member is a cylinder and/or wherein the cylinder is part of the at least one first end or second end of the portion.

9. The device of claim 1, wherein the elongate member is contactable with the track throughout a length of the elongate member when in use.

10. A device for use with a track of a continuous tracked vehicle for enhancing traction, the track having a width extending between a first edge and a second edge, the device comprising:

a. a chain having a first end for connecting to a first bracket and second end connected to a second bracket; and b. a tubular member attached to the chain first end, the tubular member having an internal thread for receiving a threaded bar.

11. The device of claim 10, wherein a chain link of the chain is cut and the tubular member is welded to chain link of the chain that is cut.

12. The device of claim 10, wherein the threaded bar is rotatable by a nut or bolt head such that as the threaded bar is rotated, the tubular member is moved along the threaded bar to adjust a tension in the chain.

13. The device of claim 10, wherein the first bracket comprises a top flange, a bottom flange, and a web.

14. The device of claim 13, wherein the web has a through-hole.

15. The device of claim 14, wherein the threaded bar is passable through the through-hole such that the nut or bolt head is positioned on one side of the web, and the tubular member is on the other side.

16. A device for use with a track of a continuous tracked vehicle for enhancing traction, the track having a width extending between a first edge and a second edge, the device comprising:

a first bracket and a second bracket, each bracket comprising a body forming a mouth portion, the mouth portion of the first bracket being engageable with the first edge of the track and the mouth portion of the second bracket engageable with the second edge of the track; and a ground engaging feature comprising an elongate member, the elongate member extending between the first bracket and the second bracket, the combined ground engaging feature and elongate member having a height less than a height of the first bracket and a height of the second bracket, a first end of said at least a portion of the elongate member being removably connected to the first bracket, and a second end of said at least the portion of the elongate member being connected to the second bracket, the first bracket comprising an adjustment mechanism to adjust a distance between the first end of said at least the portion of the elongate member and the body of the first bracket.

17. The device of claim 16, wherein the body of at least one of the first bracket or second bracket comprises a top flange and a bottom flange arrangeable proximal to a top surface and a bottom surface of a track respectively, the body further comprising a web extending between the top flange and the bottom flange, the mouth portion being formed within the top flange, bottom flange and web.

18. The device of claim 17, wherein a profile of the top flange of the first bracket and second bracket is less than a profile of the elongate member when viewed from a side perspective.

19. The device of claim 16, wherein the elongate member contactable with the track throughout a length of the elongate member when in use.

* * * * *